US012541009B2

(12) United States Patent
Asghari et al.

(10) Patent No.: US 12,541,009 B2
(45) Date of Patent: Feb. 3, 2026

(54) SCANNING MULTIPLE LIDAR SYSTEM OUTPUT SIGNALS

(71) Applicant: SiLC Technologies, Inc., Monrovia, CA (US)

(72) Inventors: Mehdi Asghari, La Canada Flintridge, CA (US); Nirmal Chindhu Warke, Saratoga, CA (US)

(73) Assignee: SiLC Technologies, Inc., Monrovia, CA (US)

( * ) Notice: Subject to any disclaimer, the term of this patent is extended or adjusted under 35 U.S.C. 154(b) by 1128 days.

(21) Appl. No.: 17/351,170

(22) Filed: Jun. 17, 2021

(65) Prior Publication Data

US 2022/0404470 A1 Dec. 22, 2022

(51) Int. Cl.
*G01S 7/481* (2006.01)
*G01S 7/4865* (2020.01)
*G01S 17/88* (2006.01)
*G02B 26/10* (2006.01)

(52) U.S. Cl.
CPC .......... *G01S 7/4817* (2013.01); *G01S 7/4865* (2013.01); *G01S 17/88* (2013.01); *G02B 26/105* (2013.01)

(58) Field of Classification Search
CPC ...... G01S 7/4817; G01S 7/4917; G01S 17/34; G02B 6/3548; B81B 2201/045
See application file for complete search history.

(56) References Cited

U.S. PATENT DOCUMENTS 4,262,993 A 4/1981 Burns et al.
4,523,803 A 6/1985 Arao et al.
4,786,132 A 11/1988 Gordon
4,845,703 A 7/1989 Suzuki
4,914,665 A 4/1990 Sorin
4,955,028 A 9/1990 Alfeness et al.
(Continued)

FOREIGN PATENT DOCUMENTS

CN 1668939 A 9/2005
CN 101356450 A 1/2009
(Continued)

OTHER PUBLICATIONS

"The Demultiplexer" accessed from "www.electronics-tutorials.ws/combination/comb_3.html" with WayBack Machine dated Feb. 9, 2008. (Year: 2008).*
(Continued)

*Primary Examiner* — Yuqing Xiao
*Assistant Examiner* — Zhengqing Qi
(74) *Attorney, Agent, or Firm* — Gavrilovich, Dodd & Lindsey LLP

(57) ABSTRACT

A LIDAR system has a switch configured to direct a switch signal to one of multiple different alternate waveguides. The switch signal carries multiple different channels. The system also includes one more redirection components that receive multiple different channel output signals. Each of the channel output signals carries a different one of the channels. The one more redirection components are configured to redirect the channel output signals such that a direction that each of the channel output signals travels away from the one more redirection components changes in response to a change in the alternate waveguide which receives the switch signal.

20 Claims, 17 Drawing Sheets

(56) References Cited

U.S. PATENT DOCUMENTS

| | | |
|---|---|---|
| 4,987,832 A | 1/1991 | Klink et al. |
| 4,995,720 A | 2/1991 | Amzajerdian |
| 5,041,832 A | 8/1991 | Gulczynski |
| 5,194,906 A | 3/1993 | Kimura et al. |
| 5,289,252 A | 2/1994 | Nourrcier |
| 5,305,412 A | 4/1994 | Paoli |
| 5,323,223 A | 6/1994 | Hayes |
| 5,396,328 A | 3/1995 | Jestel et al. |
| 5,847,816 A | 12/1998 | Zediker et al. |
| 5,889,490 A | 3/1999 | Wachter et al. |
| 5,953,468 A | 9/1999 | Finnila et al. |
| 5,977,538 A | 11/1999 | Unger et al. |
| 5,995,810 A | 11/1999 | Karasawa |
| 6,035,083 A | 3/2000 | Brennan, III et al. |
| 6,040,898 A | 3/2000 | Mrosik et al. |
| 6,108,472 A | 8/2000 | Rickman et al. |
| 6,400,500 B1 | 6/2002 | Tidmarsh et al. |
| 6,480,513 B1 | 11/2002 | Kapany et al. |
| 6,556,759 B2 | 4/2003 | Roberts et al. |
| 6,567,573 B1 | 5/2003 | Domash et al. |
| 6,687,010 B1 | 2/2004 | Horri et al. |
| 6,921,490 B1 | 7/2005 | Qian et al. |
| 6,970,621 B1 | 11/2005 | Fried |
| 6,977,502 B1 | 12/2005 | Hertz |
| 7,345,744 B2 | 3/2008 | Halmos et al. |
| 7,375,877 B1 | 5/2008 | Di Teodoro et al. |
| 7,535,390 B2 | 5/2009 | Hsu |
| 7,907,333 B2 | 3/2011 | Coyle |
| 8,165,433 B2 | 4/2012 | Jenkins et al. |
| 8,213,751 B1 | 7/2012 | Ho et al. |
| 8,311,374 B2 | 11/2012 | Hochberg et al. |
| 8,326,100 B2 | 12/2012 | Chen et al. |
| 8,410,566 B2 | 4/2013 | Qian et al. |
| 8,541,744 B1 | 9/2013 | Liu |
| 8,558,993 B2 | 10/2013 | Newbury et al. |
| 8,885,678 B1 | 11/2014 | Kupershmidt |
| 9,157,790 B2 | 10/2015 | Shpunt et al. |
| 9,176,282 B2 | 11/2015 | Pottier et al. |
| 9,217,831 B1 | 12/2015 | Asghari |
| 9,235,097 B2 | 1/2016 | Meade et al. |
| 9,310,471 B2 | 4/2016 | Sayyah et al. |
| 9,310,487 B2 | 4/2016 | Sakimura et al. |
| 9,519,052 B2 | 12/2016 | Gusev |
| 9,575,341 B2 | 2/2017 | Heck et al. |
| 9,606,234 B2 | 3/2017 | Major, Jr. et al. |
| 9,625,580 B2 | 4/2017 | Kotelnikov et al. |
| 9,735,885 B1 | 8/2017 | Sayyah et al. |
| 9,740,079 B1 | 8/2017 | Davids et al. |
| 9,748,726 B1 | 8/2017 | Morton et al. |
| 9,753,351 B2 | 9/2017 | Eldada |
| 9,778,363 B2 | 10/2017 | Kadambi et al. |
| 9,798,166 B1 | 10/2017 | Sharma et al. |
| 9,823,118 B2 | 11/2017 | Doylend et al. |
| 9,841,495 B2 | 12/2017 | Campbell et al. |
| 9,851,443 B2 | 12/2017 | Chen |
| 9,857,468 B1 | 1/2018 | Eichenholz et al. |
| 9,893,737 B1 | 2/2018 | Keramat et al. |
| 10,003,168 B1 | 6/2018 | Villeneuve |
| 10,007,060 B1 | 6/2018 | Qian et al. |
| 10,094,916 B1 | 10/2018 | Droz et al. |
| 10,137,903 B2 | 11/2018 | Tascione et al. |
| 10,222,474 B1 | 3/2019 | Raring et al. |
| 10,274,599 B2 | 4/2019 | Schmalenberg |
| 10,281,322 B2 | 5/2019 | Doylend et al. |
| 10,345,447 B1 | 7/2019 | Hicks |
| 10,397,019 B2 | 8/2019 | Hartung et al. |
| 10,564,268 B2 | 2/2020 | Turbide et al. |
| 10,605,901 B2 | 3/2020 | Lee et al. |
| 10,627,496 B2 | 4/2020 | Schmalenberg et al. |
| 10,649,306 B2 | 5/2020 | Skirlo et al. |
| 10,739,256 B1 | 8/2020 | Rickman et al. |
| 10,761,195 B2 | 9/2020 | Donovan |
| 10,782,782 B1 | 9/2020 | DeSalvo et al. |
| 10,788,582 B2 | 9/2020 | Feng et al. |
| 10,816,649 B1 | 10/2020 | Keyser et al. |
| 10,845,480 B1 | 11/2020 | Shah et al. |
| 10,901,074 B1 | 1/2021 | Pan et al. |
| 11,022,683 B1 | 6/2021 | Rezk |
| 11,067,668 B1 | 7/2021 | Bravo |
| 11,114,815 B1 | 9/2021 | Chen et al. |
| 11,119,219 B1 | 9/2021 | LaChapelle et al. |
| 11,162,789 B2 | 11/2021 | Lodin et al. |
| 11,170,476 B1 | 11/2021 | Toshiwal et al. |
| 11,175,388 B1 | 11/2021 | Wood et al. |
| 11,221,404 B1 | 1/2022 | DeSalvo et al. |
| 11,300,683 B2 | 4/2022 | Bao et al. |
| 11,378,691 B2 | 7/2022 | Boloorian et al. |
| 11,448,729 B2 | 9/2022 | Baba et al. |
| 11,454,724 B2 | 9/2022 | Michaels et al. |
| 11,486,975 B1 | 11/2022 | Xiao |
| 11,493,753 B1 | 11/2022 | Wood et al. |
| 11,525,916 B2 | 12/2022 | Avci et al. |
| 11,536,805 B2 | 12/2022 | Asghari et al. |
| 11,579,300 B1 | 2/2023 | Li |
| 11,635,491 B2 | 4/2023 | Asghari et al. |
| 11,714,167 B2 | 8/2023 | Feng et al. |
| 11,815,720 B1 | 11/2023 | Tavallaee et al. |
| 11,908,075 B2 | 2/2024 | Gorantla |
| 2002/0031304 A1 | 3/2002 | Roberts et al. |
| 2002/0105632 A1 | 8/2002 | Holton |
| 2002/0122398 A1 | 9/2002 | Jou |
| 2002/0159700 A1 | 10/2002 | Coroy et al. |
| 2003/0030582 A1 | 2/2003 | Vickers |
| 2003/0031407 A1 | 2/2003 | Weisberg et al. |
| 2003/0142943 A1 | 7/2003 | Yegnanarayanan et al. |
| 2003/0212520 A1 | 11/2003 | Campos et al. |
| 2003/0231686 A1 | 12/2003 | Liu |
| 2004/0081388 A1 | 4/2004 | Koyama |
| 2004/0085612 A1 | 5/2004 | Livingston et al. |
| 2004/0233964 A1 | 11/2004 | Yamanaka et al. |
| 2004/0249561 A1 | 12/2004 | Capozzi et al. |
| 2005/0123227 A1 | 6/2005 | Vonsovici et al. |
| 2005/0135730 A1 | 6/2005 | Welch et al. |
| 2005/0219068 A1 | 10/2005 | Jones et al. |
| 2005/0237617 A1 | 10/2005 | Carr et al. |
| 2005/0244103 A1 | 11/2005 | Kwakernaak |
| 2006/0114447 A1 | 6/2006 | Harris et al. |
| 2007/0024849 A1 | 2/2007 | Carrig et al. |
| 2007/0024956 A1 | 2/2007 | Coyle |
| 2007/0036486 A1 | 2/2007 | Miyadera et al. |
| 2007/0103362 A1 | 5/2007 | Arikan et al. |
| 2007/0171407 A1 | 7/2007 | Cole et al. |
| 2007/0223856 A1 | 9/2007 | Nunoya et al. |
| 2008/0088184 A1 | 4/2008 | Tung et al. |
| 2008/0123170 A1 | 5/2008 | Reichert et al. |
| 2008/0174461 A1 | 7/2008 | Hsu |
| 2008/0176681 A1 | 7/2008 | Donahoe |
| 2008/0181550 A1 | 7/2008 | Earnshaw |
| 2008/0205461 A1 | 8/2008 | Henrichs |
| 2009/0046746 A1 | 2/2009 | Munroe et al. |
| 2009/0128797 A1 | 5/2009 | Walsh |
| 2009/0195769 A1 | 8/2009 | Luo et al. |
| 2009/0279070 A1 | 11/2009 | Ueno |
| 2010/0027379 A1 | 2/2010 | Saulnier et al. |
| 2010/0085992 A1 | 4/2010 | Rakuljic et al. |
| 2010/0159858 A1 | 6/2010 | Dent et al. |
| 2010/0187442 A1 | 7/2010 | Hochberg et al. |
| 2010/0271614 A1 | 10/2010 | Albuquerque et al. |
| 2010/0277714 A1 | 11/2010 | Pedersen et al. |
| 2010/0280765 A1 | 11/2010 | Marquardt et al. |
| 2010/0296077 A1 | 11/2010 | Scott et al. |
| 2010/0309391 A1 | 12/2010 | Plut |
| 2011/0026643 A1 | 2/2011 | Ruelke et al. |
| 2011/0068425 A1 | 3/2011 | Liao et al. |
| 2011/0068426 A1 | 3/2011 | Zheng et al. |
| 2011/0091155 A1 | 4/2011 | Yilmaz et al. |
| 2011/0095167 A1 | 4/2011 | Feng et al. |
| 2011/0141471 A1 | 6/2011 | Schlotterbeck et al. |
| 2011/0164845 A1 | 7/2011 | Jenkins et al. |
| 2011/0241895 A1 | 10/2011 | Griffin |
| 2012/0038506 A1 | 2/2012 | Kanamoto et al. |
| 2012/0062230 A1 | 3/2012 | Vaughan, Jr. et al. |
| 2012/0081786 A1 | 4/2012 | Mizuyama et al. |
| 2012/0098935 A1 | 4/2012 | Schmidt et al. |

(56) References Cited

U.S. PATENT DOCUMENTS

| | | |
|---|---|---|
| 2012/0120382 A1 | 5/2012 | Silny et al. |
| 2012/0182544 A1 | 7/2012 | Asahara et al. |
| 2012/0206712 A1 | 8/2012 | Chang et al. |
| 2013/0044309 A1 | 2/2013 | Dakin et al. |
| 2013/0044311 A1 | 2/2013 | Rakuljic |
| 2013/0051655 A1 | 2/2013 | Collard et al. |
| 2013/0056623 A1 | 3/2013 | Lipson et al. |
| 2013/0083389 A1 | 4/2013 | Dakin et al. |
| 2013/0094074 A1 | 4/2013 | Asghari et al. |
| 2013/0162976 A1 | 6/2013 | Dakin et al. |
| 2013/0206967 A1 | 8/2013 | Shpunt et al. |
| 2013/0242400 A1 | 9/2013 | Chen |
| 2013/0321791 A1 | 12/2013 | Feldkhun et al. |
| 2014/0035776 A1 | 2/2014 | Sochen et al. |
| 2014/0036252 A1 | 2/2014 | Amzajerdian et al. |
| 2014/0054451 A1 | 2/2014 | Abedin et al. |
| 2014/0112357 A1 | 4/2014 | Abedin et al. |
| 2014/0133864 A1 | 5/2014 | Asghari et al. |
| 2014/0153931 A1 | 6/2014 | Doerr |
| 2014/0169392 A1 | 6/2014 | Kim |
| 2014/0211298 A1 | 7/2014 | Sayyah et al. |
| 2014/0269790 A1 | 9/2014 | Sebastian et al. |
| 2014/0332918 A1 | 11/2014 | Li et al. |
| 2014/0376000 A1 | 12/2014 | Swanson et al. |
| 2014/0376001 A1 | 12/2014 | Swanson |
| 2015/0055115 A1 | 2/2015 | Pedersen et al. |
| 2015/0056740 A1 | 2/2015 | Menezo |
| 2015/0109603 A1 | 4/2015 | Kim et al. |
| 2015/0171593 A1 | 6/2015 | Duan et al. |
| 2015/0177367 A1 | 6/2015 | Sebastian et al. |
| 2015/0177383 A1 | 6/2015 | Ruff et al. |
| 2015/0185244 A1 | 7/2015 | Inoue et al. |
| 2015/0207296 A1 | 7/2015 | Rickman et al. |
| 2015/0333480 A1 | 11/2015 | Santis et al. |
| 2015/0346340 A1 | 12/2015 | Yaacobi et al. |
| 2015/0378012 A1 | 12/2015 | Sayyah et al. |
| 2015/0378187 A1 | 12/2015 | Heck et al. |
| 2016/0084945 A1 | 3/2016 | Rodrigo et al. |
| 2016/0161600 A1 | 6/2016 | Eldada et al. |
| 2016/0170141 A1 | 6/2016 | Luo et al. |
| 2016/0209594 A1 | 7/2016 | Bahl |
| 2016/0223663 A1 | 8/2016 | Schmalenberg et al. |
| 2016/0261091 A1 | 9/2016 | Santis et al. |
| 2016/0274226 A1 | 9/2016 | Lewis |
| 2016/0290891 A1 | 10/2016 | Feng et al. |
| 2016/0291135 A1 | 10/2016 | Ando et al. |
| 2016/0299228 A1 | 10/2016 | Maleki et al. |
| 2016/0306043 A1 | 10/2016 | Moss et al. |
| 2016/0324438 A1 | 11/2016 | Halpern et al. |
| 2016/0341818 A1 | 11/2016 | Gilliland et al. |
| 2016/0373191 A1 | 12/2016 | Fathololoumi et al. |
| 2016/0377721 A1 | 12/2016 | Lardin et al. |
| 2017/0003451 A1 | 1/2017 | Ma et al. |
| 2017/0040775 A1 | 2/2017 | Takabayashi et al. |
| 2017/0059779 A1 | 3/2017 | Okayama |
| 2017/0067985 A1 | 3/2017 | Schwarz et al. |
| 2017/0098917 A1 | 4/2017 | Popovic et al. |
| 2017/0108649 A1 | 4/2017 | Dallessasse et al. |
| 2017/0139411 A1 | 5/2017 | Hartung et al. |
| 2017/0146639 A1 | 5/2017 | Carothers |
| 2017/0146641 A1 | 5/2017 | Walsh et al. |
| 2017/0153319 A1 | 6/2017 | Villeneuve et al. |
| 2017/0155225 A1 | 6/2017 | Villeneuve et al. |
| 2017/0184450 A1 | 6/2017 | Doylend et al. |
| 2017/0207600 A1 | 7/2017 | Klamkin et al. |
| 2017/0268866 A1 | 9/2017 | Berz |
| 2017/0269198 A1 | 9/2017 | Hall et al. |
| 2017/0269215 A1 | 9/2017 | Hall et al. |
| 2017/0299697 A1 | 10/2017 | Swanson |
| 2017/0307648 A1 | 10/2017 | Kotake et al. |
| 2017/0307736 A1 | 10/2017 | Donovan |
| 2017/0328988 A1 | 11/2017 | Magee et al. |
| 2017/0343652 A1 | 11/2017 | de Mersseman et al. |
| 2017/0343791 A1 | 11/2017 | Swanson |
| 2017/0350965 A1 | 12/2017 | Schmalenberg |
| 2017/0350983 A1 | 12/2017 | Hall et al. |
| 2017/0356983 A1 | 12/2017 | Jeong et al. |
| 2017/0371227 A1 | 12/2017 | Skirlo et al. |
| 2017/0372602 A1 | 12/2017 | Gilliland et al. |
| 2018/0003805 A1 | 1/2018 | Popovich et al. |
| 2018/0024232 A1 | 1/2018 | Gilliland et al. |
| 2018/0024246 A1 | 1/2018 | Jeong et al. |
| 2018/0031680 A1 | 2/2018 | Lee et al. |
| 2018/0039154 A1 | 2/2018 | Hashemi et al. |
| 2018/0050704 A1 | 2/2018 | Tascione et al. |
| 2018/0073932 A1 | 3/2018 | Minet et al. |
| 2018/0088211 A1 | 3/2018 | Gill et al. |
| 2018/0095284 A1 | 4/2018 | Welch et al. |
| 2018/0102442 A1 | 4/2018 | Wang et al. |
| 2018/0103431 A1 | 4/2018 | Suh et al. |
| 2018/0113216 A1 | 4/2018 | Kremer et al. |
| 2018/0120433 A1 | 5/2018 | Eichenholz et al. |
| 2018/0120436 A1 | 5/2018 | Smits |
| 2018/0136321 A1 | 5/2018 | Verghese et al. |
| 2018/0143322 A1 | 5/2018 | Rosenzweig et al. |
| 2018/0143374 A1 | 5/2018 | Coolbaugh et al. |
| 2018/0149752 A1 | 5/2018 | Tadano |
| 2018/0164408 A1 | 6/2018 | Hall et al. |
| 2018/0172918 A1 | 6/2018 | Lane et al. |
| 2018/0188371 A1 | 7/2018 | Bao et al. |
| 2018/0217471 A1 | 8/2018 | Lee et al. |
| 2018/0224547 A1 | 8/2018 | Crouch et al. |
| 2018/0231643 A1 | 8/2018 | Lee et al. |
| 2018/0269890 A1 | 9/2018 | Ojeda |
| 2018/0287343 A1 | 10/2018 | Morrison et al. |
| 2018/0306925 A1 | 10/2018 | Hosseini et al. |
| 2018/0329037 A1 | 11/2018 | Bozchalooi et al. |
| 2018/0351317 A1 | 12/2018 | Vermeulen |
| 2018/0356344 A1 | 12/2018 | Yi |
| 2018/0356522 A1 | 12/2018 | Kikuchi et al. |
| 2018/0359033 A1 | 12/2018 | Xu et al. |
| 2018/0364334 A1 | 12/2018 | Xiang et al. |
| 2018/0364336 A1 | 12/2018 | Hosseini et al. |
| 2018/0372517 A1 | 12/2018 | Yao et al. |
| 2018/0372530 A1 | 12/2018 | Welle et al. |
| 2018/0372870 A1 | 12/2018 | Puglia |
| 2018/0375284 A1 | 12/2018 | Permogorov |
| 2019/0004151 A1 | 1/2019 | Abediasl et al. |
| 2019/0011558 A1 | 1/2019 | Crouch et al. |
| 2019/0011559 A1 | 1/2019 | Desai et al. |
| 2019/0018110 A1 | 1/2019 | Kremer et al. |
| 2019/0018121 A1 | 1/2019 | Sayyah et al. |
| 2019/0018139 A1 | 1/2019 | Sayyah et al. |
| 2019/0018140 A1 | 1/2019 | Sarkissian et al. |
| 2019/0018144 A1* | 1/2019 | Imaki ................ G01S 7/486 |
| 2019/0018197 A1 | 1/2019 | Boutami et al. |
| 2019/0025094 A1 | 1/2019 | Lewis et al. |
| 2019/0025426 A1 | 1/2019 | Satyan et al. |
| 2019/0025431 A1 | 1/2019 | Satyan et al. |
| 2019/0027897 A1 | 1/2019 | Wei et al. |
| 2019/0033453 A1 | 1/2019 | Crouch et al. |
| 2019/0049569 A1 | 2/2019 | Kim et al. |
| 2019/0064329 A1 | 2/2019 | Liu et al. |
| 2019/0064332 A1 | 2/2019 | Schmalenberg et al. |
| 2019/0064358 A1 | 2/2019 | Desai et al. |
| 2019/0072651 A1 | 3/2019 | Halmos et al. |
| 2019/0072672 A1 | 3/2019 | Yao |
| 2019/0086514 A1 | 3/2019 | Dussan et al. |
| 2019/0086518 A1 | 3/2019 | Halstig et al. |
| 2019/0086550 A1 | 3/2019 | Dussan et al. |
| 2019/0096259 A1 | 3/2019 | McQuillen et al. |
| 2019/0101647 A1 | 4/2019 | Feshali et al. |
| 2019/0107623 A1 | 4/2019 | Campbell et al. |
| 2019/0120939 A1 | 4/2019 | O'Keeffe |
| 2019/0146074 A1 | 5/2019 | Hjelmstad |
| 2019/0154816 A1 | 5/2019 | Hughes et al. |
| 2019/0154832 A1 | 5/2019 | Maleki et al. |
| 2019/0154835 A1 | 5/2019 | Maleki et al. |
| 2019/0179012 A1 | 6/2019 | Heo |
| 2019/0187269 A1 | 6/2019 | Tong et al. |
| 2019/0204419 A1 | 7/2019 | Baba et al. |
| 2019/0204441 A1 | 7/2019 | Feneyrou et al. |
| 2019/0204443 A1 | 7/2019 | Yao et al. |
| 2019/0250253 A1 | 8/2019 | Hung et al. |

(56) References Cited

U.S. PATENT DOCUMENTS

| | | |
|---|---|---|
| 2019/0250396 A1 | 8/2019 | Blanche et al. |
| 2019/0257924 A1 | 8/2019 | Li et al. |
| 2019/0257927 A1* | 8/2019 | Yao ..................... G01S 7/4815 |
| 2019/0280453 A1 | 9/2019 | Gopinath et al. |
| 2019/0293794 A1 | 9/2019 | Zhang et al. |
| 2019/0302262 A1 | 10/2019 | Singer |
| 2019/0302268 A1 | 10/2019 | Singer et al. |
| 2019/0310372 A1 | 10/2019 | Crouch et al. |
| 2019/0310377 A1 | 10/2019 | Lodin et al. |
| 2019/0317195 A1 | 10/2019 | Sun et al. |
| 2019/0331797 A1 | 10/2019 | Singer et al. |
| 2019/0339388 A1 | 11/2019 | Crouch et al. |
| 2019/0339389 A1 | 11/2019 | Russo et al. |
| 2019/0341739 A1 | 11/2019 | Loh et al. |
| 2019/0346056 A1 | 11/2019 | Staiger et al. |
| 2019/0346568 A1 | 11/2019 | Feng et al. |
| 2019/0353787 A1 | 11/2019 | Petit |
| 2019/0353789 A1 | 11/2019 | Boloorian et al. |
| 2019/0353977 A1 | 11/2019 | Hung |
| 2019/0361122 A1 | 11/2019 | Crouch et al. |
| 2019/0369244 A1 | 12/2019 | Asghari et al. |
| 2019/0369251 A1 | 12/2019 | Feng et al. |
| 2019/0372307 A1 | 12/2019 | Morton |
| 2019/0383907 A1 | 12/2019 | Belsley et al. |
| 2019/0391242 A1 | 12/2019 | Asghari et al. |
| 2019/0391243 A1 | 12/2019 | Nicolaescu |
| 2020/0018857 A1 | 1/2020 | Feng et al. |
| 2020/0021082 A1 | 1/2020 | Rakuljic |
| 2020/0025898 A1 | 1/2020 | Ain-Kedem et al. |
| 2020/0025926 A1 | 1/2020 | Asghari et al. |
| 2020/0043176 A1 | 2/2020 | Maila et al. |
| 2020/0049799 A1 | 2/2020 | Ando et al. |
| 2020/0057143 A1 | 2/2020 | Asghari et al. |
| 2020/0064116 A1 | 2/2020 | Salvade et al. |
| 2020/0072978 A1 | 3/2020 | Boloorian et al. |
| 2020/0072979 A1 | 3/2020 | Boloorian et al. |
| 2020/0076152 A1 | 3/2020 | Eichenholz et al. |
| 2020/0088876 A1 | 3/2020 | Tanemura et al. |
| 2020/0103501 A1 | 4/2020 | Kotelnikov et al. |
| 2020/0104647 A1 | 4/2020 | Pirim |
| 2020/0110179 A1 | 4/2020 | Talty et al. |
| 2020/0116837 A1 | 4/2020 | Asghari et al. |
| 2020/0116842 A1 | 4/2020 | Asghari et al. |
| 2020/0142065 A1 | 5/2020 | Boloorian et al. |
| 2020/0142066 A1 | 5/2020 | Sandborn et al. |
| 2020/0142068 A1 | 5/2020 | Crouch et al. |
| 2020/0150241 A1 | 5/2020 | Byrnes et al. |
| 2020/0158830 A1 | 5/2020 | Asghari et al. |
| 2020/0158833 A1 | 5/2020 | Baba et al. |
| 2020/0158839 A1 | 5/2020 | Lin et al. |
| 2020/0166617 A1 | 5/2020 | Crouch et al. |
| 2020/0166647 A1 | 5/2020 | Crouch et al. |
| 2020/0174095 A1 | 6/2020 | Altintas et al. |
| 2020/0182973 A1 | 6/2020 | Luff et al. |
| 2020/0182978 A1 | 6/2020 | Maleki et al. |
| 2020/0200879 A1 | 6/2020 | Halstig et al. |
| 2020/0209366 A1 | 7/2020 | Maleki |
| 2020/0225332 A1 | 7/2020 | Wagner et al. |
| 2020/0241119 A1 | 7/2020 | Asghari et al. |
| 2020/0249324 A1 | 8/2020 | Steinberg et al. |
| 2020/0249350 A1 | 8/2020 | Schmalenberg |
| 2020/0256956 A1 | 8/2020 | Luff et al. |
| 2020/0278432 A1 | 9/2020 | Thorpe et al. |
| 2020/0284879 A1 | 9/2020 | Asghari et al. |
| 2020/0284883 A1 | 9/2020 | Ferreira et al. |
| 2020/0284913 A1 | 9/2020 | Amelot et al. |
| 2020/0292706 A1 | 9/2020 | Hexsel et al. |
| 2020/0300980 A1 | 9/2020 | Behzadi et al. |
| 2020/0300993 A1 | 9/2020 | Behzadi et al. |
| 2020/0301070 A1 | 9/2020 | Nagarajan |
| 2020/0309949 A1 | 10/2020 | Feng et al. |
| 2020/0309952 A1 | 10/2020 | Imaki et al. |
| 2020/0319409 A1 | 10/2020 | Su et al. |
| 2020/0326476 A1 | 10/2020 | Hiratani |
| 2020/0333441 A1 | 10/2020 | Diaz |
| 2020/0333443 A1 | 10/2020 | Boloorian et al. |
| 2020/0333533 A1 | 10/2020 | Rogers et al. |
| 2020/0363515 A1 | 11/2020 | Luff et al. |
| 2020/0400821 A1 | 12/2020 | Baker et al. |
| 2020/0400822 A1 | 12/2020 | Ando et al. |
| 2020/0408911 A1 | 12/2020 | Boloorian et al. |
| 2020/0408912 A1 | 12/2020 | Boloorian et al. |
| 2021/0010802 A1 | 1/2021 | Onohara et al. |
| 2021/0033732 A1 | 2/2021 | Boloorian et al. |
| 2021/0055388 A1* | 2/2021 | Feng ..................... G01S 7/4812 |
| 2021/0063541 A1 | 3/2021 | Zheng et al. |
| 2021/0063542 A1 | 3/2021 | Zheng et al. |
| 2021/0072385 A1 | 3/2021 | Sandborn et al. |
| 2021/0072389 A1 | 3/2021 | Boloorian et al. |
| 2021/0072445 A1 | 3/2021 | Kurokawa et al. |
| 2021/0096228 A1* | 4/2021 | Behzadi ................. G01S 7/4815 |
| 2021/0109195 A1 | 4/2021 | Feng et al. |
| 2021/0116778 A1* | 4/2021 | Zhang ..................... E06B 9/34 |
| 2021/0132232 A1* | 5/2021 | Asghari ................. G01S 7/4816 |
| 2021/0141058 A1* | 5/2021 | Piggott .................. G01S 7/4817 |
| 2021/0149056 A1 | 5/2021 | Luff et al. |
| 2021/0156999 A1 | 5/2021 | Nishino et al. |
| 2021/0159659 A1 | 5/2021 | Bandyopadhyay et al. |
| 2021/0159664 A1 | 5/2021 | Liu et al. |
| 2021/0165102 A1 | 6/2021 | Crouch et al. |
| 2021/0173058 A1 | 6/2021 | Viswanatha et al. |
| 2021/0181320 A1 | 6/2021 | Oza et al. |
| 2021/0190907 A1 | 6/2021 | Sahara |
| 2021/0190921 A1* | 6/2021 | Golikov ................. G01S 17/931 |
| 2021/0190925 A1 | 6/2021 | Asghari et al. |
| 2021/0199797 A1 | 7/2021 | Choi et al. |
| 2021/0239811 A1 | 8/2021 | Asghari et al. |
| 2021/0255324 A1 | 8/2021 | Dunn et al. |
| 2021/0278540 A1 | 9/2021 | Maayan et al. |
| 2021/0293923 A1 | 9/2021 | Arkind et al. |
| 2021/0318436 A1 | 10/2021 | Boloorian et al. |
| 2021/0325520 A1 | 10/2021 | Cai et al. |
| 2021/0333386 A1 | 10/2021 | Park et al. |
| 2021/0349196 A1 | 11/2021 | Wang et al. |
| 2021/0349216 A1 | 11/2021 | Behroozpour et al. |
| 2021/0356592 A1 | 11/2021 | Behroozpour |
| 2021/0373162 A1* | 12/2021 | Wu ........................ G01S 7/4818 |
| 2021/0389244 A1 | 12/2021 | Bowman et al. |
| 2021/0396879 A1 | 12/2021 | Sun et al. |
| 2021/0405194 A1 | 12/2021 | Tsuchida |
| 2022/0003842 A1* | 1/2022 | Wang ..................... G01S 17/42 |
| 2022/0050187 A1 | 2/2022 | Yao |
| 2022/0065999 A1 | 3/2022 | Phare et al. |
| 2022/0075121 A1 | 3/2022 | Lowder et al. |
| 2022/0085567 A1 | 3/2022 | Lowder et al. |
| 2022/0099837 A1 | 3/2022 | Crouch et al. |
| 2022/0107411 A1 | 4/2022 | Koonath et al. |
| 2022/0113422 A1 | 4/2022 | Hillard et al. |
| 2022/0121080 A1 | 4/2022 | Yao |
| 2022/0179055 A1 | 6/2022 | Ferrara et al. |
| 2022/0187457 A1 | 6/2022 | Daami et al. |
| 2022/0187458 A1 | 6/2022 | Piggott et al. |
| 2022/0187463 A1 | 6/2022 | Maheshwari et al. |
| 2022/0196814 A1 | 6/2022 | Lin et al. |
| 2022/0206164 A1 | 6/2022 | Takada |
| 2022/0244360 A1 | 8/2022 | Phare et al. |
| 2022/0291361 A1 | 9/2022 | Asghari et al. |
| 2022/0308192 A1 | 9/2022 | John et al. |
| 2022/0334225 A1 | 10/2022 | Davydenko et al. |
| 2022/0342048 A1 | 10/2022 | Asghari et al. |
| 2022/0365214 A1 | 11/2022 | Sandborn et al. |
| 2022/0373667 A1 | 11/2022 | Khatana et al. |
| 2022/0373739 A1* | 11/2022 | Abril ................... G02B 6/29382 |
| 2022/0404470 A1 | 12/2022 | Asghari et al. |
| 2022/0413100 A1 | 12/2022 | Jain |
| 2022/0413143 A1 | 12/2022 | Parsa et al. |
| 2023/0027271 A1 | 1/2023 | Jin et al. |
| 2023/0069201 A1 | 3/2023 | Asghari et al. |
| 2023/0104453 A1 | 4/2023 | Asghari et al. |
| 2023/0194952 A1 | 6/2023 | Muranaka et al. |
| 2023/0228878 A1 | 7/2023 | Asghari et al. |
| 2023/0258861 A1 | 8/2023 | Vercruysse et al. |
| 2023/0288566 A1 | 9/2023 | Nadkarni et al. |

(56) References Cited

U.S. PATENT DOCUMENTS

| | | |
|---|---|---|
| 2023/0296732 A1 | 9/2023 | Xiao |
| 2025/0085401 A1 | 3/2025 | Zhou et al. |
| 2025/0094380 A1 | 3/2025 | Mazed |

FOREIGN PATENT DOCUMENTS

| | | | |
|---|---|---|---|
| CN | 103874945 A | 6/2014 | |
| CN | 104459881 A | 3/2015 | |
| CN | 204479750 U | 7/2015 | |
| CN | 105589074 A | 5/2016 | |
| CN | 105680320 A | 6/2016 | |
| CN | 105917257 A | 8/2016 | |
| CN | 106154248 A | 11/2016 | |
| CN | 106410607 A | 2/2017 | |
| CN | 106773028 A | 5/2017 | |
| CN | 106842232 A | 6/2017 | |
| CN | 106959439 A | 7/2017 | |
| CN | 107144847 A | 9/2017 | |
| CN | 107305184 A | 10/2017 | |
| CN | 107367734 A | 11/2017 | |
| CN | 107976666 A | 5/2018 | |
| CN | 108139465 A | 6/2018 | |
| CN | 108291970 A | 7/2018 | |
| CN | 108603758 A | 9/2018 | |
| CN | 109642952 A | 4/2019 | |
| CN | 110036276 A | 7/2019 | |
| CN | 107192355 B | 8/2019 | |
| CN | 110161516 A | 8/2019 | |
| CN | 110187350 A | 8/2019 | |
| CN | 110412685 A | 11/2019 | |
| CN | 111338025 A | 6/2020 | |
| CN | 112241014 A | 1/2021 | |
| CN | 114419152 A | 4/2022 | |
| DE | 10 2015 222061 A1 | 5/2017 | |
| DE | 10 2017 200795 A1 | 7/2018 | |
| DE | 10 2017 106 226 A1 | 9/2018 | |
| DE | 102019124598 A1 | 3/2020 | |
| EP | 0 523 921 A1 | 1/1993 | |
| EP | 2796890 A1 | 10/2014 | |
| EP | 2955542 B1 | 4/2017 | |
| EP | 3276371 A1 | 1/2018 | |
| EP | 3339924 A1 | 6/2018 | |
| EP | 3259615 B1 | 11/2019 | |
| EP | 3889644 A1 | 10/2021 | |
| GB | 1 585 053 A | 2/1981 | |
| GB | 2173664 A | 10/1986 | |
| GB | 2586499 A * | 4/2021 | ............ G01S 17/58 |
| JP | H1010227 A | 1/1998 | |
| JP | 2003224321 A | 8/2003 | |
| JP | 2004-151022 A | 5/2004 | |
| JP | 2007184511 A | 7/2007 | |
| JP | 2008160130 A | 7/2008 | |
| JP | 2008292370 A | 12/2008 | |
| JP | 2009-115696 A | 5/2009 | |
| JP | 2010151806 A | 7/2010 | |
| JP | 2010271624 A | 12/2010 | |
| JP | 2012146787 A | 8/2012 | |
| JP | 201316540 A | 8/2013 | |
| JP | 2014202716 A | 10/2014 | |
| JP | 2015-018640 A | 1/2015 | |
| JP | 2015092184 A | 5/2015 | |
| JP | 2015172540 A | 10/2015 | |
| JP | 2015180735 A | 10/2015 | |
| JP | 2015230259 A | 12/2015 | |
| JP | 2016111087 A | 6/2016 | |
| JP | 2016-525209 A | 8/2016 | |
| JP | 5975203 B2 | 8/2016 | |
| JP | 2017502315 A | 1/2017 | |
| JP | 2017097340 A | 6/2017 | |
| JP | 2017106897 A | 6/2017 | |
| JP | 2017524918 A | 8/2017 | |
| JP | 2017161484 A | 9/2017 | |
| JP | 2017-198514 A | 11/2017 | |
| JP | 2017-211348 A | 11/2017 | |
| JP | 2018511054 A | 4/2018 | |
| JP | 2018-512600 A | 5/2018 | |
| JP | 2018520346 A | 7/2018 | |
| JP | 2018529955 A | 10/2018 | |
| JP | 2018188284 A | 11/2018 | |
| JP | 2018200273 A | 12/2018 | |
| JP | 2019502925 A | 1/2019 | |
| JP | 2019095218 A | 6/2019 | |
| JP | 2019525195 A | 9/2019 | |
| JP | 2019-537012 A | 12/2019 | |
| JP | 2020-16639 A | 1/2020 | |
| JP | 2020-34546 A | 3/2020 | |
| JP | 2002090457 A | 3/2020 | |
| JP | 2020085723 A | 6/2020 | |
| JP | 2021004800 A | 1/2021 | |
| JP | 2021032848 A | 3/2021 | |
| JP | 7397009 A | 12/2023 | |
| KR | 20060086182 A | 7/2006 | |
| KR | 10-2015-0045735 A | 4/2015 | |
| KR | 20180013598 A | 2/2018 | |
| KR | 101 931 022 B1 | 12/2018 | |
| WO | 97/11396 A1 | 3/1997 | |
| WO | 2010123182 A1 | 10/2010 | |
| WO | 2010127151 A1 | 11/2010 | |
| WO | 2012123668 A1 | 9/2012 | |
| WO | 2012153309 A2 | 11/2012 | |
| WO | 2013/049579 A1 | 4/2013 | |
| WO | 2014/203654 A1 | 12/2014 | |
| WO | 2014/206630 A1 | 12/2014 | |
| WO | 2015/044370 A1 | 4/2015 | |
| WO | 2015/058209 A1 | 4/2015 | |
| WO | 2015/098027 A1 | 7/2015 | |
| WO | 2015/200800 A1 | 12/2015 | |
| WO | 2016/097409 A2 | 6/2016 | |
| WO | 2017/023107 A1 | 2/2017 | |
| WO | 2017/083597 A1 | 5/2017 | |
| WO | 2017/095817 A1 | 6/2017 | |
| WO | 2017/102156 A1 | 6/2017 | |
| WO | 2017/187510 A1 | 11/2017 | |
| WO | 2017/216581 A1 | 12/2017 | |
| WO | 2018/003852 A1 | 1/2018 | |
| WO | 2018/036946 A1 | 3/2018 | |
| WO | 2018/060318 A1 | 4/2018 | |
| WO | 2018/116412 A1 | 6/2018 | |
| WO | 2018/160240 A2 | 9/2018 | |
| WO | 2018/230474 A1 | 12/2018 | |
| WO | 2019/010320 A1 | 1/2019 | |
| WO | 2019/018894 A1 | 1/2019 | |
| WO | 2019/121069 A1 | 6/2019 | |
| WO | 2019/130472 A1 | 7/2019 | |
| WO | 2019/149815 A1 | 8/2019 | |
| WO | 2019/196135 A1 | 10/2019 | |
| WO | 2019/217761 A1 | 11/2019 | |
| WO | 2019/217857 A1 | 11/2019 | |
| WO | 2019/236430 A1 | 12/2019 | |
| WO | 2019/236464 A1 | 12/2019 | |
| WO | 2020/005537 A1 | 1/2020 | |
| WO | 2020/033161 A1 | 2/2020 | |
| WO | 2020/046513 A1 | 3/2020 | |
| WO | 2020/076566 A1 | 4/2020 | |
| WO | 2020/110779 A1 | 6/2020 | |
| WO | 2020/129284 A1 | 6/2020 | |
| WO | 2020/234797 A1 | 11/2020 | |
| WO | 2020/251633 A1 | 12/2020 | |
| WO | 2021/024038 A1 | 2/2021 | |
| WO | 2021/252894 A1 | 12/2021 | |
| WO | 2022/013422 A1 | 1/2022 | |
| WO | 2022/233503 A1 | 11/2022 | |
| WO | 2023/118295 A1 | 6/2023 | |

OTHER PUBLICATIONS

Chatel, Cecile, International Preliminary Report on Patentability and Written Opinion, PCT/US2022/029347, IThe International Bureau of WIPO, Dec. 28, 2023.

Matos, Taina, International Search Report and Written Opinion, PCT/US2022/029347, International Searching Authority, United States Patent and Trademark office, Oct. 5, 2022.

(56) References Cited

OTHER PUBLICATIONS

Aalto, Timo Eta L., "VTT's Micron-Scale Silicon Rib+Strip Waveguide Platform", pp. 1-8, May 13, 2016, Conference Proceedings of SPIE Photonics Europe Conference, Proc. SPIE 9891, Silicon Photonics and Photonic Integrated Circuits V, 98911G, doi: 10.1117/12.2234588.
Anderson et al., "ladar: Frequency-Modulated Continuous Wave Laser Detection and Ranging", Photogrammetric Engineering & Remote Sensing, vol. 83, No. 11, Nov. 2017.
Baghmisheh, B. B., "Chip-scale Lidar", Jan. 19, 2017, Electrical Engineering and Computer Sciences University of California, Berkeley.
Behroozpour et al., "Electronic-Photonic Integrated Circulator 3D Microimaging", IEEE Journal of Solid-State Circuits, Jan. 2017, vol. 52, No. 1, pp. 161-172.
Behroozpour, B. et al., "Lidar System Architectures and Circuits," IEEE Communications Magazine, Oct. 2017, pp. 135-142.
Carter et al., "Lidar 101: An Introduction to Lidar Technology, Data, and Applications", Nov. 2012, NOAA Coastal Services Center, 76 pages.
Chan, M.K, "Atmospheric transmission windows for high energy short pulse lasers", Thesis, Naval Postgraduate School, Dec. 2003.
Conditional Euclidean Clustering, retrieved on Jul. 9, 2022 from https://pcl.readthedocs.io/projects/tutorials/en/latest/cluster_extraction.html#cluster-extraction.
Cooksey, Catherine C. et al., "Reflectance measurements of human skin from the ultraviolet to the shortwave infrared (250 nm to 2500 nm)", May 23, 2013, SPIE Defense, Security, and Sensing Conference Proceedings Apr. 29-May 3, 2013, Baltimore, Maryland, vol. 8734, Active and Passive Signatures, 9 pages.
Day, I.E., et al. "Solid state absorption attenuator in silicon-on-insulator with MHz bandwidth.", Integrated Photonics Research 2002, Vancouver, Canada, Jul. 17-19, 2002 (Optica Publishing Group, 2002), paper IFA5, 3 pages.
Doylend, J. K., "Two-dimensional free-space beam steering with an optical phased array on silicon-on-insulator", Oct. 1, 2011, Optics Express, 19(22), 21595-2160.
Euclidean Cluster Extraction, retrieved on Jul. 9, 2022 from https://pcl.readthedocs.io/projects/tutorials/en/latest/conditional_euclidean_clustering.html.
Gao, S. and Hui, R., "4. Frequency-modulated continuous-wave lidar using I/Q modulator for simplified heterodyne detection", Optics Letter, vol. 37, No. 11, Jun. 1, 2012, pp. 2022-2024.
Gemfire Corporation, "8-Channel Cyclic (Colorless) Arrayed Waveguide Grating (AWG)", (2018). Retrieved from AMS Technologies: http://www.amstechnologies.com/products/optical-technologies/components/fiberoptics/multiplexers/awg-multiplexers/view/8-channel-cyclic-arrayed-waveguide-grating-awg/.
Goodman, J., "Speckle Phenomena in Optics Theory and Applications", Roberts and Company, Sep. 28, 2007, 130(2), pp. 413-414.
Gulati, et al., "A Low-Power Reconfigurable Analog-to-Digital Converter", IEEE Journal of Solid-State Circuits, Dec. 2001, vol. 36, No. 12, pp. 1900-1911.
Guo et al., "Beat-frequency adjustable Er3+-doped DBR fiber laser for ultrasound detection", Optics Express, Jan. 31, 2011, vol. 19, No. 3, pp. 2485-2492.
Haran, T., "Short-wave infrared diffuse reflectance of Textile Materials", Thesis, Georgia State University, 2008.
Heck et al., "Hybrid Silicon Photonic Integrated Circuit Technology", IEEE Journal of Selected Topics in Quantum Electronics, IEEE, USA, vol. 19, No. 4, Jul. 1, 2013, p. 6100117, 17 pages.
Hsu et al., "Free-Space Applications of Silicon Photonics: A Review, Micromachines 2022", 13, 990, Jun. 24, 2022 [Retrieved from: <URL: https://mdpi.com/2072-66X/13/7/990>.
Issakov, V. "Radar Systems, Ch. 2. In Microwave Circuits for 24GHz Automotive Radar in Silicon-based Technologies", Jan. 1, 2010, Berlin Heidelberg: Springer-Verlag, pp. 5-18.
Kaasalainen, S., "The multispectral journey of Lidar", Retrieved from GIM International: https://www.gim-international.com/content/article/the-multispectral-journey-of-lidar, Jan. 24, 2019.
Kelly et al., "Discrete mode laser diodes with ultra narrow linewidthe emission" Feb. 2007, Electronics Letters, vol. 43, 2 pgs.
Klumperink, Eric A.M. et al., "N-path filters and Mixer-First Receivers: A review", 2017 IEEE Custom Integrated Circuits Conference (CICC), Austin, TX, USA, Apr. 30, 2017, pp. 1-8.
Komljenovic et al., "Widely-Tunable Ring-Resonator Semiconductor Lasers", Review, Jul. 17, 2017, 21 pages.
Kotthaus, S., et al., "Derivation of an urban materials spectral library through emittance and reflectance spectroscopy", ISPRS Journal of Photogrammetry and Remote Sensing, Aug. 2014, vol. 94, 194-212.
Kumar et al., "Intra-data center interconnects, networking, and architectures", Coherent Detection, Optical Fiber Telecommunications VII, Oct. 25, 2019, Science Direct, pp. 627-672.
Li, L., "Time-of-Flight Camera—An Introduction", 2014, TI Technical White Paper, SLOA190B.
Li et al., "Photon-Counting Chirped Amplitude Modulation Lidar with 1.5-GHz Gated InGaAs/InP APD", IEEE Photonics Technology Letters, Mar. 15, 2015, vol. 27, No. 6, pp. 616-719.
Lu, Z., "Silicon Photonic Switches for Optical Communication Applications", PhD Thesis. University of British Columbia, Sep. 29, 2017, 165 pages.
PDB450C—Switchable Gain Balanced Amp. Photodetector, InGaAs. (n.d.). Retrieved from Thorlabs: https://www.thorlabs.com/thorproduct.cfm?partnumber=PDB450C.
Pfennigbauer, M. et al., "Multi-Wavelength Airborne Laser Scanning", ILMF 2011. New Orleans, Feb. 7-9, 2011.
PI Motion/Positioning, 2018, Retrieved from PI USA: http://www.pi-usa.us/products/PDF_Data/Q-522_Mini_Positioning_Stage_20150203.pdf.
PI USA: Fast Tip/Tilt Platform, 2018, Retrieved from PI USA Active Optics: http://www.pi-usa.us/products/PDF_Data/S335_Fast_Tip-Tilt_Platform.pdf.
Pierrottet et al., "Linear FMCW Laser Radar for Precision Range and Vector Velocity Measurements", MRS Online Proceeding Library Archive, Jan. 2008, pp. 1-9.
Pilot Photonics, Lyra OCS 1000, Optical comb laser module, Retrieved on Nov. 20, 2019 from Pilot Photonics: http://www.pilotphotonics.com/optical-frequency-comb-source/.
Poulton, C. V. MSC Thesis, "Integrated LIDAR with Optical Phased Arrays in Silicon Photonics", Massachusetts Institute of Technology, Sep. 2016, pp. 95-101.
Poulton, Christopher V. et al., "Coherent Solid-State LIDAR with Silicon Photonic Optical Phased Arrays", pp. 4091-4094, Oct. 15, 2017, Optics Letters, vol. 42, No. 20.
Rablau, "LIDAR—A new (self-driving) vehicle for introducing optics to broader engineering and non-engineering audiences", in Fifteenth Conference on Education and Training in Optics and Photonics 2019, May 21-24, 2019, Quebec City, Quebec, Optica Publishing Group 2019, Paper 11143_138 (14 pages).
Royo et al., "An Overview of LIDAR Imaging Systems for Autonomous Vehicles", Appl. Sci., Sep. 30, 2019, 9(19):4093, 37 pages. https://doi.org/10.3390/app9194093.
Rusu, Radu Bogdan Dissertation, Semantic 3D Object Maps for Everyday Manipulation in Human Living Environments, retrieved on Jul. 9, 2022 from http://mediatum.ub.tum.de/doc/800632/941254.pdf.
Sandborn, Phillip Alan McGinnis, "FMCW Lidar: Scaling to the Chip-Level and Improving Phase-Noise-Limited Performance", Fall 2017, 18 pages.
Satyan, N. et al., "Precise control of broadband frequency chirps using optoelectronic feedback," Optics Express, Aug. 31, 2009, vol. 17, No. 18, pp. 15991-15999.
Schulmeister, Karl, "White Paper The new edition of the international laser product safety standard", IEC 60825-1, 2014.
Self, "Focusing of spherical Gaussian beams", Applied Optics, Mar. 1, 1983, vol. 22, No. 5, pp. 658-661.
Singh, Jaswant, "Spectral Reflectance of Land Covers", Retrieved from Department of Geology, Aligharh Muslim University: http://www.geol-amu.org/notes/m1r-1-8.htm, Aug. 15, 2016, 11 pages.
Smit, Meint K. C. v., "Phasar-Based WDM-Devices: Principles, Design and Applications", IEEE Journal of Selected Topics in Quantum Electronics, Jan. 1, 1996, 2(2), 236-250.

(56) References Cited

OTHER PUBLICATIONS

Soref, Richard A. et al. "Electrooptical Effects in Silicon", IEEE Journal of Quantum Electronics, vol. QE-23, No. 1, Jan. 1987, pp. 123-129.

Stephens et al., "Demonstration of an Interferometric Laser Ranging System for a Follow-On Gravity Mission to Grace", IEEE International Symposium on Geoscience and Remote Sensing, Jul. 31, 2006 to Aug. 4, 2006, pp. 1115-1118.

Sun, J., et al., "Large-scale silicon photonic circuits for optical phased arrays," vol. 20, No. 4, Jul./Aug. 2014. IEEE Journal of Selected Topics in Quantum Electronics.

Van Acoleyen et al., "Off-chip beam steering with a one-dimensional optical phased array on silicon-on-insulator", Apr. 2009, Opt. Lett., 34(9) 1477-1479.

Van Acoleyen et al., "Two-Dimensional Dispersive Off-Chip Beam Scanner Fabricated on Silicon-On-Insulator", Jun. 16, 2011, IEEE Photon. Technol. Lett., 23(17), 1270-1272.

Vasilyev, A. et al., "The Optoelectronic Swept-Frequency Laser and Its Applications in Ranging, Three-Dimensional Imaging, and Coherent Beam Combining of Chirped-Seed Amplifiers," CaltechThesis, May 20, 2013, 177 pages.

Velodyne, "HDL-64E S2 Datasheet. Retrieved from http://velodynelidar.com/lidar/products/brochure/HDL-64E%20S2%20datasheet_2010_lowres.pdf", 2017.

Wang et al., "Automotive FMCW Radar-enhanced Range Estimation via a Local Resampling Fourier Transform", International Journal of Advanced Robotic Systems, May 15, 2016, pp. 1-8.

Wikipedia, Optical Attenuator, 2022, 3 pages.

Wojtanowski, J. et al., "Comparison of 905 nm and 1550 nm semiconductor laser rangefinders' performance deterioration due to adverse environmental conditions", Opto-Electronics Review, 22(3), 183-190, Jun. 13, 2014.

Wojtkiewicz et al., "Two-dimensional signal processing in FMCW radars", National Conference on Circuit Theory and Electronic Networks, vol. 2, Oct. 1997, pp. 1-6.

Zhu et al., "Dual-Comb Ranging", Engineering, 4, Oct. 16, 2018, pp. 772-778.

Auinger, Florian, European Search Report, European Patent Office, Application No. 22825509.7, Jun. 6, 2025.

\* cited by examiner

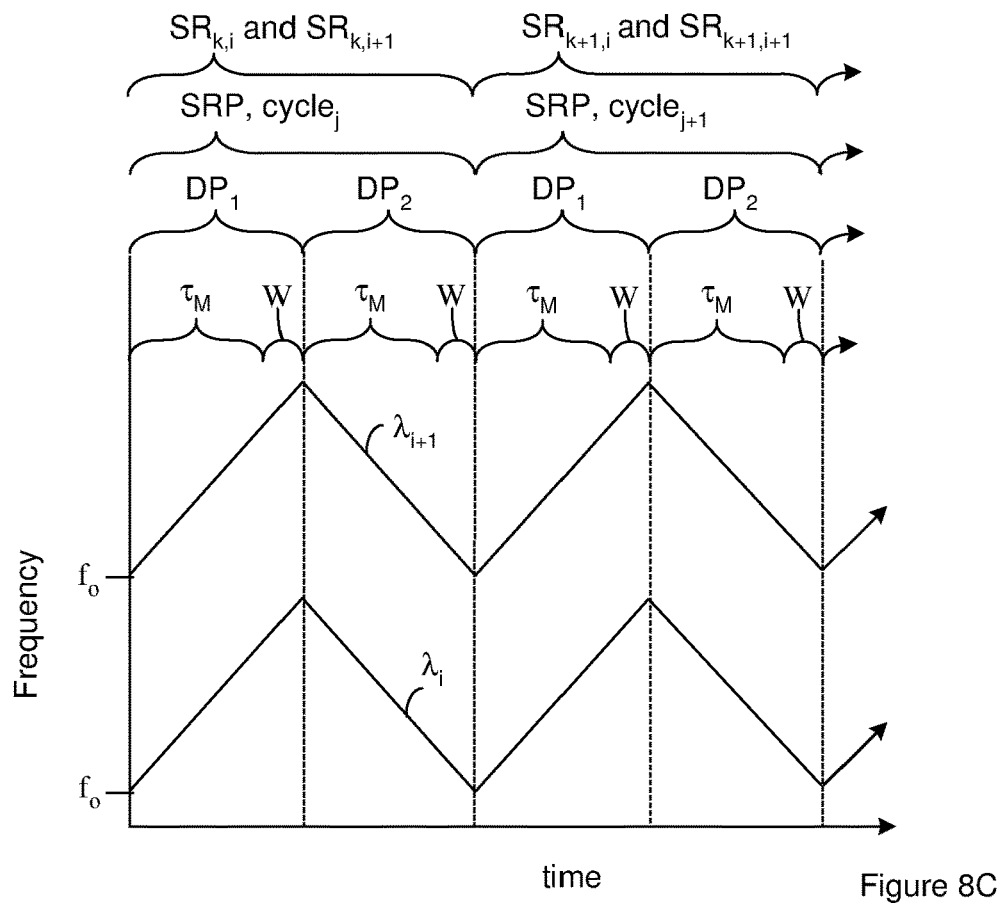
Figure 8C
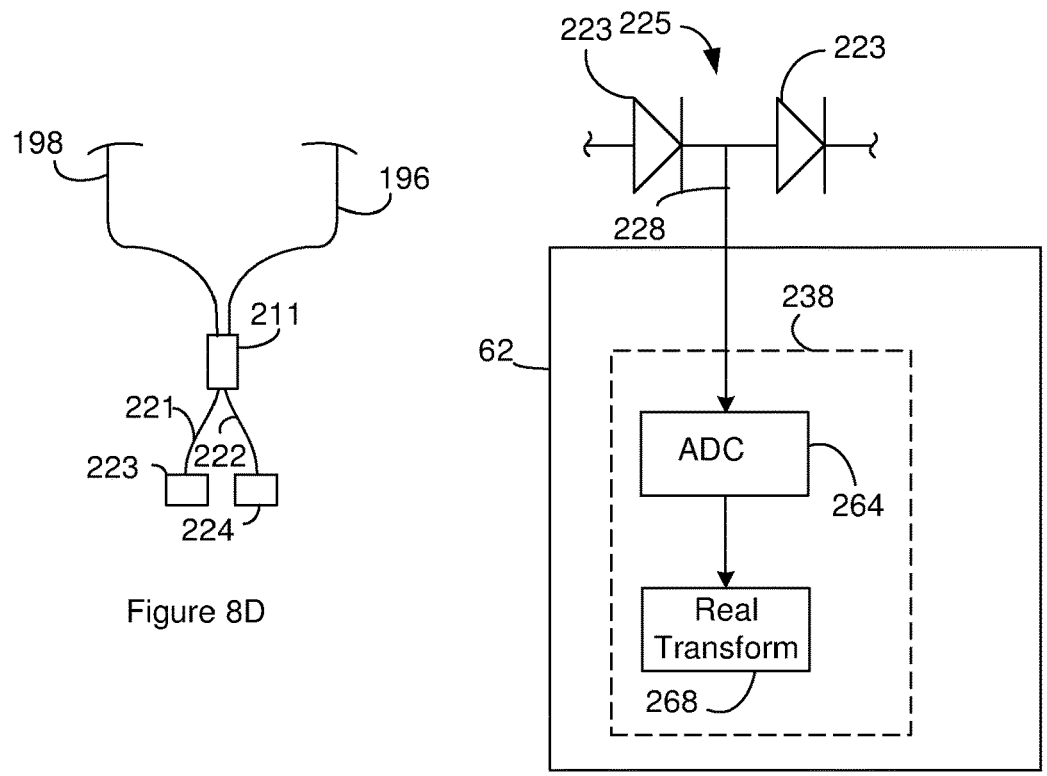
Figure 8D
Figure 8E

SCANNING MULTIPLE LIDAR SYSTEM OUTPUT SIGNALS

FIELD

The invention relates to optical devices. In particular, the invention relates to LIDAR systems.

BACKGROUND

There is an increasing commercial demand for LIDAR systems that can be deployed in applications such as ADAS (Advanced Driver Assistance Systems) and AR (Augmented Reality). However, LIDAR systems typically use moving mirrors to scan a system output signal from one location to another location in a field of view. Time is needed to stop and start movement of these mirrors as a result of inertia. Since rapid scanning of a field of view by a system output signal is needed for most LIDAR applications, it is desirable to avoid the time delays associated with movement of a mirror. As a result, the system output signal is typically scanned continuously within the field of view. The continuous movement of the system output signal during the generation of LIDAR data (radial velocity and/or distance between a LIDAR system and an object external to the LIDAR system) can introduce errors and/or complexity into the LIDAR system. As a result, there is a need for an improved LIDAR system.

SUMMARY

A LIDAR system has a switch configured to direct a switch signal to one of multiple different alternate waveguides. The switch signal carries multiple different channels. The system also includes one more redirection components that receive multiple different channel output signals. Each of the channel output signals carries a different one of the channels. The one more redirection components are configured to redirect the channel output signals such that a direction that each of the channel output signals travels away from the one more redirection components changes in response to a change in the alternate waveguide which receives the switch signal.

Another embodiment of a LIDAR system includes a scanning chip configured steer a direction that system output signals travel away from the LIDAR system to multiple different sample regions in a field of view. Each of the system output signals carries a different channel. The system also includes a LIDAR chip that is separate from the scanning chip and is configured to generate composite signals that are each beating at a beat frequency. Generating each of the composite signals includes combining a comparative signal and a reference signal that carry the same channel. The comparative signals each includes light from one of multiple different system return signals that each carries a different one of the channels. Each of the system return signals including light from one of the system output signals after reflection of the system output signal by an object in the field of view. Each of the reference signals includes light that was not reflected by the object. The system also includes an adapter configured to separate an output signal from a return signal. The output signal including light that was not reflected by the object in the field of view. The return signal includes light from the output signal and from each of the system return signals. Each of the system output signals includes light from the output signal. The system also includes electronics configured to use the beat frequencies to generate LIDAR data that indicates one or more items selected from a group consisting of a radial velocity between the LIDAR system and the object and a distance between the LIDAR system and the object.

BRIEF DESCRIPTION OF THE FIGURES

FIG. 8C is a graph of frequency versus time for a system output signal with triangular frequency tuning.

FIG. 8D illustrates another example of a processing component suitable for use with the LIDAR systems.

FIG. 8E provides a schematic of electronics that are suitable for use with a processing component constructed according to FIG. 7D.

FIG. 9A illustrates an interface between optical components and light sensors that can be positioned on a LIDAR chip.

FIG. 9B is a schematic of a relationship between the electronics and light sensors that can be included on a LIDAR chip.

FIG. 11B is a topview of a portion of a LIDAR chip that has the return device.

FIG. 11C is a cross section of the return device taken along the line labeled C in FIG. 11B.

FIG. 11D is a cross section of the return device taken along the line labeled C in FIG. 11B.

DESCRIPTION

A LIDAR system is configured to concurrently output multiple system output signals. In some instances, the system output signals each carries a different channel. The LIDAR system includes a scanning chip that exchanges light signals with a LIDAR assembly. The LIDAR system can include electronics that operate the scanning chip so as to scan the direction that the different system output signals travel away from the LIDAR system such that the different system output signals are each scanned to multiple different sample regions in a field of view. The electronics can use light that returns to the LIDAR system from the system output signal to generate LIDAR data that indicates a radial velocity and/or a distance between the LIDAR system and an object located in the field of view. The scanning chip can be a solid state chip that includes an integrated photonic circuit. The ability to scan multiple system output signals using a solid state device increase the reliability of the LIDAR data and the speed at which the LIDAR data can be generated.

Figure 1A:
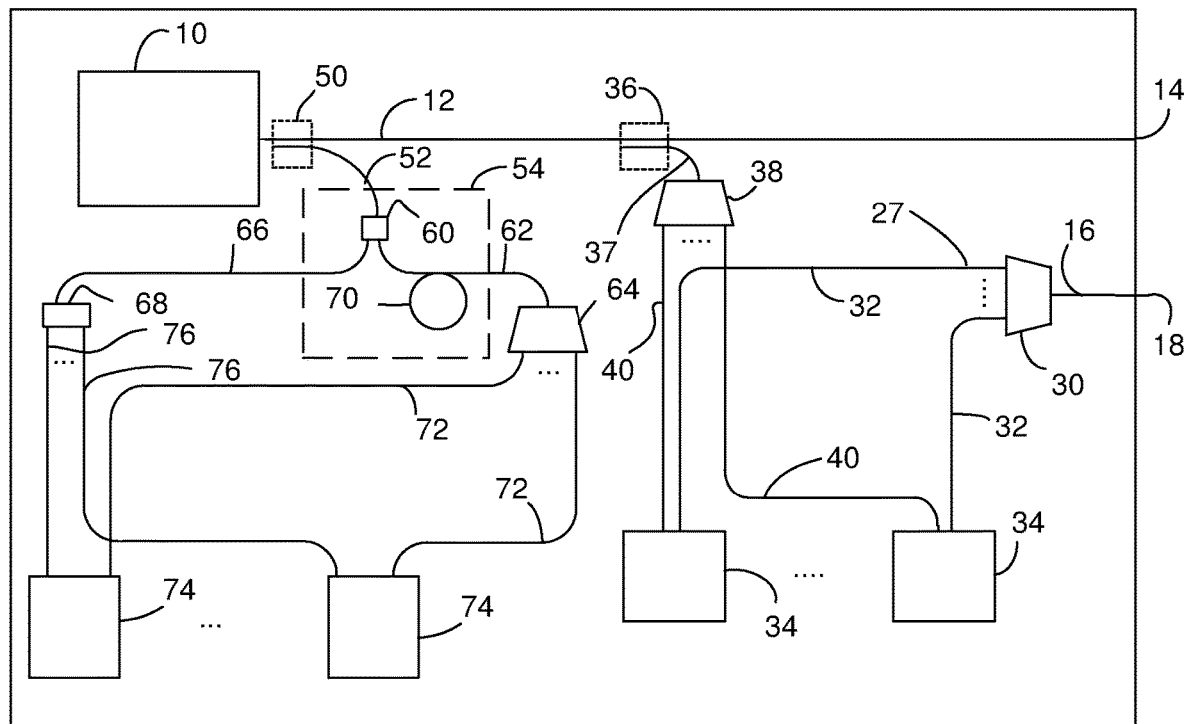
FIG. 1A is a top view of a LIDAR chip.

FIG. 1A is a topview of a LIDAR chip configured to generate composite signals that are each beating at a beat frequency that can be used by electronics to generate LIDAR data. The LIDAR chip includes a photonic integrated circuit. The photonic circuit can include a light source 10 that outputs an outgoing LIDAR signal. The outgoing LIDAR signal includes one or more different channels that are each at a different wavelength. The wavelengths of the channels can be periodically spaced in that the wavelength increase from one channel to the next channel (the channel spacing) is constant or substantially constant. In some instances, the channels spacing is constant and greater than 0.5 nm, 1 nm, 3 nm, or 5 nm, and/or less than 10 nm, 15 nm, or 20 nm. In some instances, the number of channels, N, is greater than 2, 4 or 8 and/or less than 16, 32, or 64. A suitable light source 10 for generating multiple channels with periodically spaced wavelengths includes, but is not limited to, comb lasers and one or more single wavelength and/or one or more multiple wavelength lasers with outputs multiplexed into an outgoing LIDAR signal.

The LIDAR chip also includes a utility waveguide 12 that receives the outgoing LIDAR signal from the light source 10. The utility waveguide 12 terminates at a facet 14 and carries the outgoing LIDAR signal to the facet 14. The facet 14 can be positioned such that the outgoing LIDAR signal traveling through the facet 14 exits the chip and serves as a LIDAR output signal. For instance, the facet 14 can be positioned at an edge of the chip so the outgoing LIDAR signal traveling through the facet 14 exits the chip and serves as a LIDAR output signal.

The LIDAR output signal travels away from the chip and may be reflected by objects in the path of the LIDAR output signal. The reflected signal travels away from the objects. When the LIDAR output signal is reflected, at least a portion of the light from the reflected signal is returned to an input waveguide 16 on the LIDAR chip as a LIDAR input signal. The input waveguide 16 includes a facet 18 through which the LIDAR input signal can enter the input waveguide 16. The portion of the LIDAR input signal that enters the input waveguide 16 can be considered an incoming LIDAR signal. The input waveguide 16 carries the incoming LIDAR signal to comparative demultiplexer 30. When the incoming LIDAR signal includes multiple channels, the comparative demultiplexer 30 divides the incoming LIDAR signal into different comparative signals that each carries a different one of the channels. The comparative demultiplexer 30 outputs the comparative signals on different comparative waveguides 32. The comparative waveguides 32 each carry one of the comparative signals to a different processing component 34.

The LIDAR chip includes a splitter 36 that moves a portion of the outgoing LIDAR signal from the utility waveguide 12 onto a reference waveguide 37 as a reference signal. Suitable splitters 36 include, but are not limited to, optical couplers, y-junctions, and MMIs.

The reference waveguide 37 carries the reference light signal to a reference demultiplexer 38. When the reference light signal includes multiple channels, the reference demultiplexer 38 divides the reference light signal into different reference signals that each has a different wavelength. The reference demultiplexer 38 outputs the reference signals on different reference waveguides 40. The reference waveguides 40 each carry one of the reference signals to a different one of the processing components 34.

The comparative waveguides 32 and the reference waveguides 40 are configured such that a comparative signal and the corresponding reference signal are received at the same processing component 34. For instance, the comparative waveguides 32 and the reference waveguides 40 are configured such that the comparative signal and the reference signal of the same wavelength and/or carrying the same channel are received at the same processing component 34.

As will be described in more detail below, the processing components 34 each combines a comparative signal with the corresponding reference signal to form a composite signal that carries LIDAR data for a sample region on the field of view. Accordingly, the composite signal can be processed so as to extract LIDAR data (radial velocity and/or distance between a LIDAR system and an object external to the LIDAR system) for the sample region.

The LIDAR chip can include a control assembly for controlling operation of the light source 10 and/or one or more features of a system output signal. The control assembly includes a splitter 50 that moves a portion of the outgoing LIDAR signal from the utility waveguide 12 onto a control waveguide 52. The coupled portion of the outgoing LIDAR signal serves as a tapped signal. The splitter 50 can be a wavelength independent splitter such as a directional coupler, optical coupler, y-junction, tapered coupler, and Multi-Mode Interference (MMI) device.

The control waveguide 52 carries the tapped signal to a differential delay mechanism 54 that can be a primary source of a delay between a delayed pathway signal and an expedited pathway signal. The delay mechanism 54 includes a splitter 60 that receives the tapped signal and divides the tapped signal into a delayed signal and an expedited signal. The splitter 60 can be a wavelength independent splitter. For instance, the second splitter 60 can be configured such that the delayed signal and the expedited signal carry the same or substantially the same selection of wavelengths. Accordingly, the delayed signal and the expedited can each carry multiple channels. In some instances, the delayed signal and the expedited each carries each of the channels. Suitable second splitters 68 include, but are not limited to, directional couplers, optical couplers, y-junctions, tapered couplers, and Multi-Mode Interference (MMI) devices.

A delay waveguide 62 carries the delayed signal to a first splitter 64. An expedited waveguide 66 carries the expedited signal to a second splitter 68. The delay waveguide 62 can include a delay section 70 that can be used to increase the length of the delay waveguide beyond the length of the expedited waveguide 66. For instance, the delay section 70 shown in FIG. 1A can represent a spiral arrangement of the delay waveguide 62. The longer length of the delay waveguide 62 creates the delay between the delayed signal and the expedited signal.

The first splitter 64 divides the delayed signal into delayed channel signals that are each carried on a different delayed channel waveguide 72. The first splitter 64 can be a wavelength dependent splitter. For instance, the first splitter 64 can be configured such that each of the delayed channel signals carries a different selection of wavelengths. As an example, the first splitter 64 can be configured such that each of the delayed channel signals carries a different one of the channels. Each of the delayed channel waveguide 72 carries one of the delayed channel signals to a different control component 74. As a result, each of the control components 74 receives a delayed channel signal carrying a different channel. Accordingly, each of the control components 74 can be associated with a different channel. Suitable first splitters 64 include, but are not limited to, demultiplexers such as arrayed waveguide gratings, echelle gratings, and ring resonator based devices.

The second splitter 68 divides the expedited signal into expedited sub-signals that are each carried on a different expedited sub-waveguide 76. The second splitter 68 can be a wavelength dependent splitter. For instance, the second splitter 68 can be configured such that each of the expedited sub-signals carries the same or substantially the same selection of wavelengths. Accordingly, each of the expedited sub-signals can carry multiple channels. In some instances, each of the expedited sub-signals carries each of the channels. Each of the expedited sub-waveguide 76 carries one of the expedited sub-signals to a different one of the control component 74. As a result, each of the control components 74 can receive an expedited sub-signal that carries the channel associated with that control component 74 and also carries one or more other channels. Accordingly, each of the control components 74 can receive an expedited sub-signal and a delayed channel signal that carry that same channel. Suitable second splitters 68 include, but are not limited to, directional couplers, optical couplers, y-junctions, tapered couplers, and Multi-Mode Interference (MMI) devices.

In some instances, the second splitter 68 is a wavelength dependent splitter. A wavelength dependent splitter that serves as the second splitter 68 can be configured such that the expedited sub-signals each carries a different one of the channels. Additionally, the expedited sub-waveguides 76 can be configured such that the expedited sub-signal that is received by each control component 74 carries the channel that is associated with that control component 74. As a result, each control component 74 can receive the expedited sub-signal that carries the same channel as the delayed channel signal that is received by the control component 74.

As is evident from the above description, light from the tapped signal travels on one of several different delay pathways from a splitter 60 to a combiner in one of the control components 74. Each of the delay pathways is primarily defined by the delay waveguide 62, the first splitter 64, and one of the delayed channel waveguides 72. Each of the delay pathways is traveled by a delay pathway signal that is a combination of the delay signal and one of the delayed channel signals. Light from the tapped signal also travels one of several different expedited pathways from the splitter 60 to a control component 74. The expedited pathways are each defined primarily by the expedited sub-waveguide 76, the second splitters 68, and one of the expedited sub-waveguides 76. Each of the expedited pathways is traveled by an expedited pathway signal that is a combination of the expedited signal and one of the expedited sub-signals.

Each of the delay pathways has a common portion and a separated portion. The common portion of each delay pathway is shared by the delay pathways. In contrast, the separated portion of a delay pathways is not shared with the other delay pathways. The light signals that travel through the common portion can carry multiple different channels. The light signals that travel through the separated portions can each carry a different channel. For instance, the delay waveguide 62 is common to each of the delay pathways and serves as the common portion. In contrast, the delayed channel waveguides 72 are each separated from the other delayed channel waveguides 72 and serve as a separated portion.

Each of the expedited pathways has a common portion and a separated portion. The common portion of each expedited pathway is shared by the expedited pathways. In contrast, the separated portion of an expedited pathways is not shared with the other expedited pathways. The light signals that travel through the common portion can carry multiple different channels. The light signals that travel through the separated portions can each carry a different channel. For instance, the expedited waveguide 66 is common to each of the delay pathways and serves as a common portion. In contrast, each of the expedited sub-waveguide 76 is separated from the other expedited sub-waveguide 76 and can serve as a separated portion.

The expedited pathways and the delayed pathways are configured such that each control component 74 receives a delayed pathway signal and an expedited pathway signal that carry the same channel (the common channel). The expedited pathways and the delayed pathways can configured such that each of the different control components 74 receives a delayed pathway signal and an expedited pathway signal that carry a different common channel. Additionally, the delay pathways and the expedited pathways can be configured such that the delay pathway signal and/or the expedited pathway signal received at each of the control components 74 carries only one of the channels or carries essentially only one of the channels.

The components that define the delay pathways and the expedited pathways are configured such that an expedited pathway signal and a delayed pathway signal that arrive at the same the control component 74 have the arrival of the delayed pathway signal at the control component 74 delayed relative to the arrival of the expedited pathway signal at the control component 74.

Because the delayed pathway signal and the expedited pathway signal include different portions of the tapped signal, each control component 74 receives a delayed portion of the tapped signal and also receives an expedited portion of the tapped signal with the delayed portion being delayed relative to the tapped portion. The components that define the delayed pathway and the expedited pathway can be configured to provide the delay between the tapped portion and the expedited portion arriving at the control component 74. For instance, the waveguides that define the delayed pathways and the waveguides that define the expedited pathways can be configured such that the delayed pathway is longer than the expedited pathway by a length that provides the delays desired at each control component 84. The length of the delay section 70 can be the primary source of the length difference between the delay pathway and the expedited pathway that lead to the same control component 74. As is evident from FIG. 1A, a delay signal that carries the different channels travels through the same delay section 70. As a result, the same delay section 70 is common to each of the delay pathways and each of the channels.

Additional details about the configuration and operation of the control assembly can be found in U.S. patent application Ser. No. 17/244,869, filed on Apr. 29, 2021, entitled "Reducing Signal of LIDAR System Control Assemblies," and incorporated herein in its entirety.

Figure 1A:
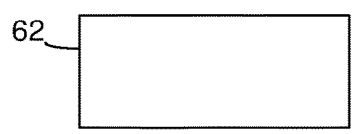
Figure 1B:
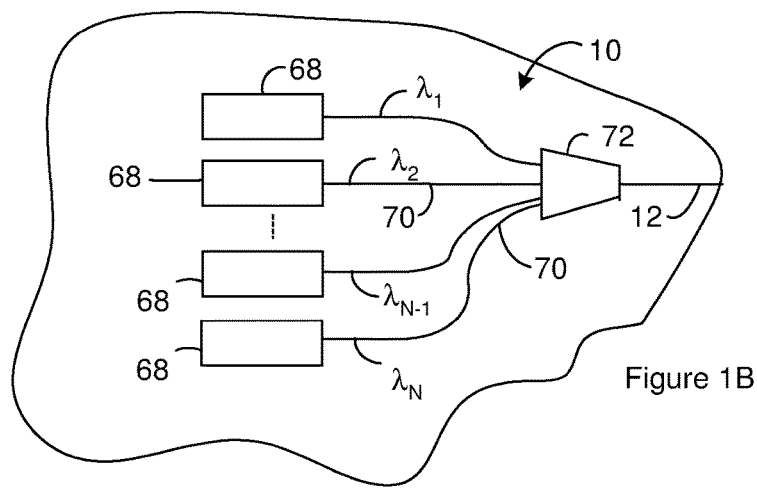
FIG. 1B illustrates a light source that includes multiple laser sources.

Although the light source 10 is shown as being positioned on the LIDAR chip, all or a portion of the light source 10 can be located off the LIDAR chip. FIG. 1B illustrates an example of a light source 10 that includes multiple laser sources 68. The light source of FIG. 1B can be located off the LIDAR chip, positioned on the LIDAR chip, or integrated on the LIDAR chip. In some instances, each of the laser sources 68 outputs a channel signal on a source waveguide 70. Each channel signal can carry one or more of the channels. For instance, FIG. 1B illustrates one possible arrangement where the source waveguide 70 that guides the channel signal that carries channel i is labeled $\lambda_i$ where i represents a channel index and the channel(s) are each associated with channel a channel index i=1 through i=N.

Each of the source waveguides 70 carries a channel signals to a laser multiplexer 72 that combines the channel signals so as to form a light signal that is received on a channel waveguide or the utility waveguide 12. Suitable laser multiplexers 72 include, but are not limited to, Arrayed Waveguide Grating (AWG) multiplexers, echelle grating multiplexers, and star couplers. The electronics can operate the laser sources 68 so the laser sources 68 concurrently output each of the channels. The electronics can operate the laser sources 68 so the laser sources 68 concurrently output each of the channels.

In some instances, each of the laser sources 68 outputs one of the channels on a source waveguide 70. The total number of laser sources 68 included in the light source 10 can be greater than or equal to the number of LIDAR output signals that are concurrently directed to a sample region. In some instances, total number of laser sources 68 included in the light source 10 is equal to the number of LIDAR output signals that are concurrently directed to a sample region. As a result, each laser sources 68 can be the source of a different one of the LIDAR output signals that are concurrently directed to a sample region.

The electronics 62 can operate the laser sources 68 independently. For instance, the electronics can operate the laser sources 68 so as to provide particular LIDAR output signal(s) with a particular frequency versus time waveform. Since the electronics can operate the laser sources 68 independently and each laser sources 68 can be the source of a different one of the LIDAR output signals, the electronics can operate the laser sources 68 so different LIDAR output signals have different frequency versus time waveforms.

Figure 2:
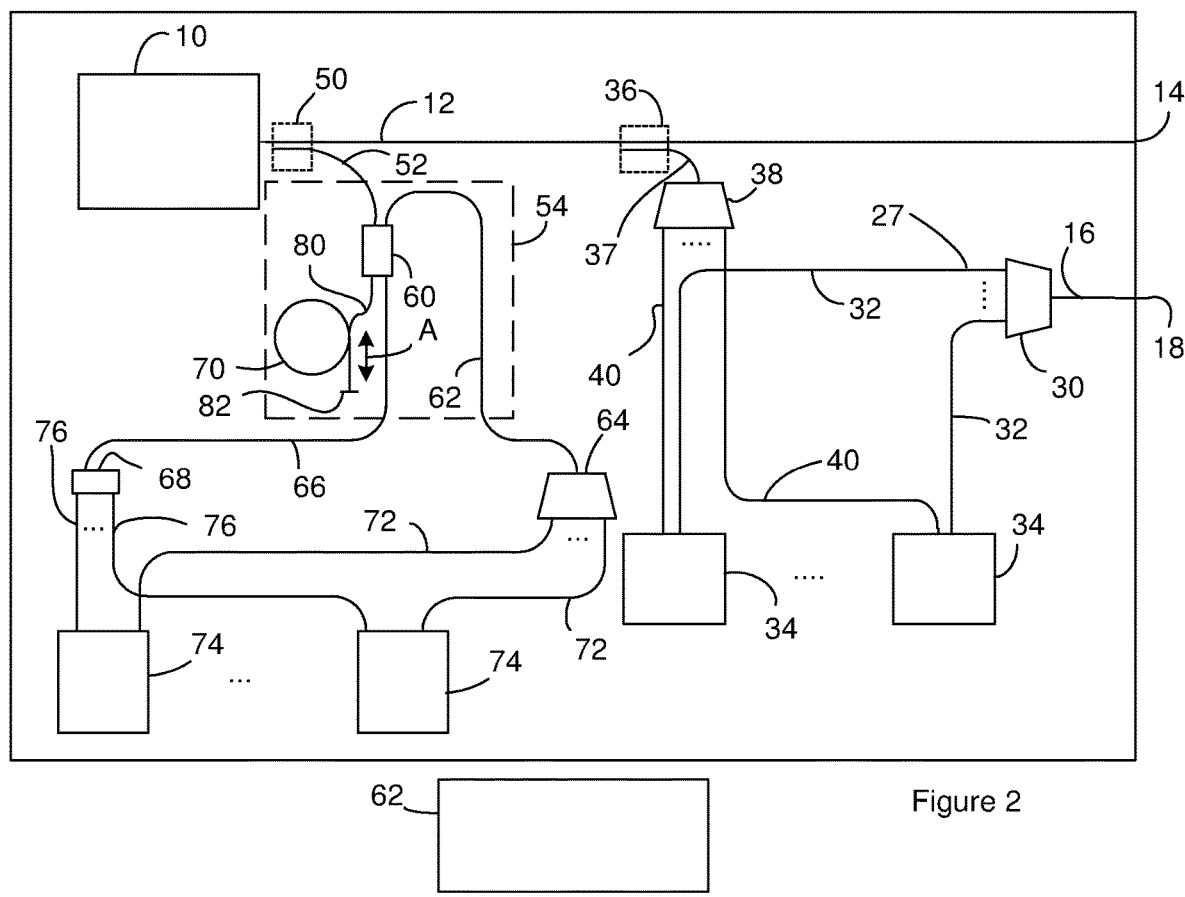
FIG. 2 is a top view of a LIDAR chip.

FIG. 2 illustrates the LIDAR chip of FIG. 1A and FIG. 1B modified to reduce the length of the delay section 70. The splitter 60 receives the tapped signal from the control waveguide 52 and divides the tapped signal into the expedited signal and a first delayed signal. The expedited signal is received on the expedited waveguide 66 as disclosed in the context of FIG. 1. Suitable splitters 60 include, but are not limited to, Multi-Mode Interference couplers (MMIs), and directional couplers.

A first delay waveguide 80 receives the first delayed signal from the splitter 60. The first delay waveguide 80 carries the first delayed signal to a return device 82. The return device 82 is configured to return the first delayed signal to the first delay waveguide 80 such that the first delayed signal travels from the return device 82 back through the first delay waveguide 80 to the splitter 60. As a result, the first delayed signal travels through the first delay waveguide 80 twice. For instance, the first delayed signal travels through the first delay waveguide 80 once in each direction as illustrated by the arrow labeled A in FIG. 2. Suitable return devices 82 include, but are not limited to, mirrors, and reflective surfaces.

The splitter 60 receives the first delayed signal from the first delay waveguide 80 and outputs the first delay signal on the delay waveguide 62. The portion of the first delayed signal received on the delay waveguide 62 serves as a second delay signal carried on the delay waveguide 62. The delay waveguide 62 carries the second delay signal to the first splitter 64. Accordingly, light from the tapped signal travels from the splitter 60 through the first delay waveguide 80 twice and the delay waveguide 62 once before being received at the first splitter 64. As a result, the first delay signal and the second delay signal together effectively serve as the delay signal disclosed in the context of FIG. 1A.

The first delay waveguide 80 includes the delay section 70. The light traveling through the first delay waveguide 80 twice increases the effective pathlength that the delay signal travels between the splitter 60 and the first splitter 64. This increase in the effective pathlength allows the length of the delay section 70 to be reduced in order to provide the desired delay between the delay signal and the expedited signal.

As is evident from the above description of FIG. 2, light from the tapped signal travels on one of several different delay pathways from the splitter 60 to one of the control components 74. Each of the delay pathways is primarily defined by the first delay waveguide 80, the splitter 60, the delay waveguide 62, the first splitter 64, and one of the delayed channel waveguides 72. Each of the delay pathways is traveled by a delay pathway signal that is a combination of the first delayed signal, the second delayed signal, and one of the delayed channel signals. Light from the tapped signal also travels one of several different expedited pathways from the splitter 60 to a control component 74. The expedited pathways are each defined primarily by the expedited waveguide 66, the second splitter 68, and one of the expedited sub-waveguides 76.

Each of the delay pathways has a common portion and a separated portion. The common portion of each delay pathway is shared by the delay pathways. In contrast, the separated portion of a delay pathways is not shared with the other delay pathways. The light signals that travel through the common portion can carry multiple different channels. The light signals that travel through the separated portions can each carry a different channel. For instance, first delay waveguide 80 and the delay waveguide 62 is common to each of the delay pathways and serves as the common portion. In contrast, the delayed channel waveguides 72 are each separated from the other delayed channel waveguides 72 and serve as a separated portion.

Each of the expedited pathways has a common portion and a separated portion. The common portion of each expedited pathway is shared by the expedited pathways. In contrast, the separated portion of an expedited pathways is not shared with the other expedited pathways. The light signals that travel through the common portion can carry multiple different channels. The light signals that travel through the separated portions can each carry a different channel. For instance, the expedited waveguide 66 is common to each of the delay pathways and serves as a common portion. In contrast, each of the expedited sub-waveguide 76 is separated from the other expedited sub-waveguide 76 and can serve as a separated portion.

Each of the expedited pathways is traveled by an expedited pathway signal that is a combination of the expedited signal and one of the expedited sub-signals. The expedited pathways and the delayed pathways are configured such that each control component 74 receives a delayed pathway signal and an expedited pathway signal that carry the same channel (the common channel). The expedited pathways and the delayed pathways can be configured such that each of the different control components 74 receives a delayed pathway signal and an expedited pathway signal that carry a different one of the common channels. Additionally, the delay pathways and the expedited pathways can be configured such that the delay pathway signal and/or the expedited pathway signal received at each of the control components 74 carries only one of the channels or carries essentially only one of the channels.

The components that define the delay pathways and the expedited pathways are configured such that an expedited pathway signal and a delayed pathway signal that arrive at the same the control component 74 have the arrival of the delayed pathway signal at the control component 74 delayed relative to the arrival of the expedited pathway signal at the control component 74.

Because the delayed pathway signal and the expedited pathway signal represent different portions of the tapped signal, each control component 74 receives a delayed portion of the tapped signal and also receives an expedited portion of the tapped signal with the delayed portion being delayed relative to the tapped portion. The components that define the delayed pathway and the expedited pathway can be configured to provide the delay between the tapped portion and the expedited portion arriving at the control component 74. For instance, the waveguides that define the delayed pathways and the waveguides that define the expedited pathways can be configured such that the delayed pathway is longer than the expedited pathway by a length that provides the delays desired at each control component 84. The length of the delay section 70 can be the primary source of the length difference between the delay pathway and the expedited pathway that lead to the same control component 74. As is evident from FIG. 2, a first delay signals that carries the different channels travel through the same delay section 70. As a result, the same delay section 70 is common to each of the delay pathways.

Figure 3:
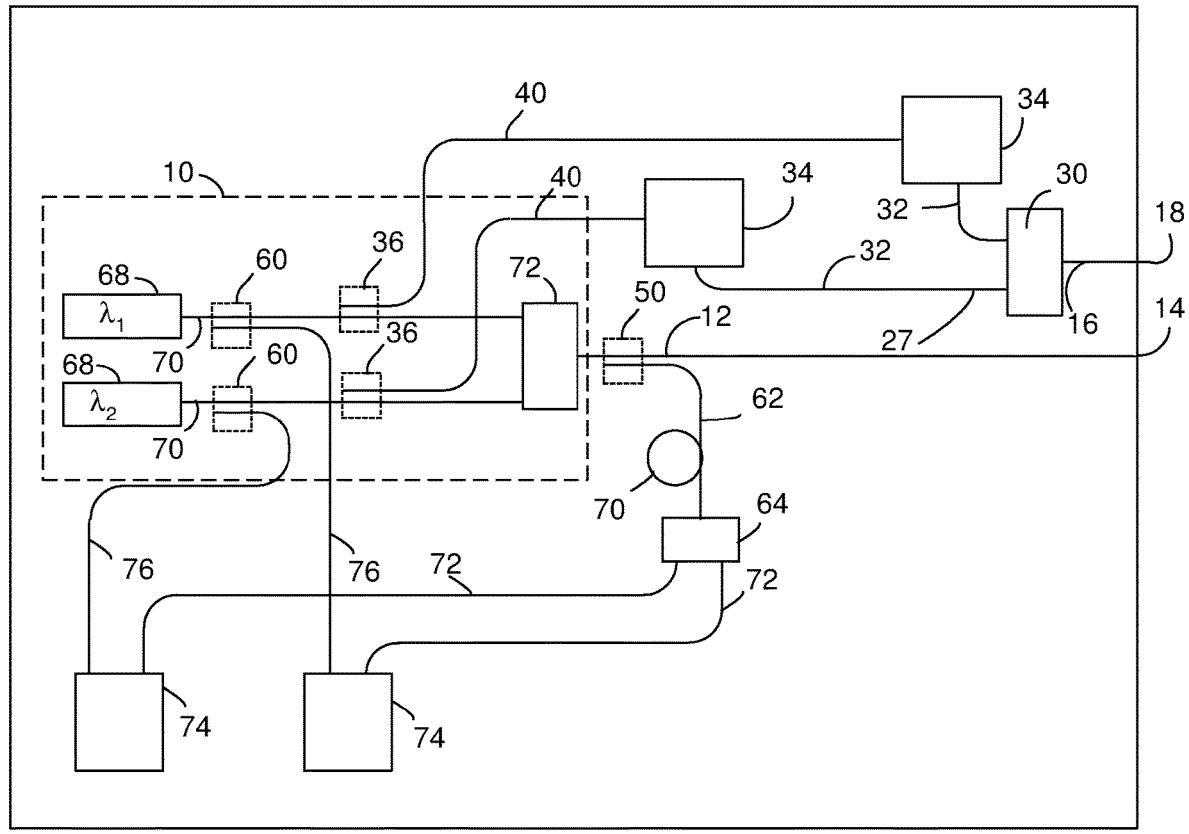
FIG. 3 is a top view of a LIDAR chip.
Figure 3:
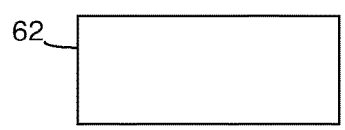

As noted above, in some instances, the second splitter 68 can be a wavelength dependent splitter configured such that the expedited sub-signals each carries a different one of the channels. Although FIG. 1A and FIG. 2 illustrate these expedited sub-signals being separated from a common signal (the expedited signal), expedited sub-signals that each carries a different one of the channels can be tapped from the source waveguides 70. For instance, FIG. 3 illustrates the LIDAR system of FIG. 1A modified to include a light source 10 constructed according to FIG. 1B. Each of the source waveguides 70 includes a splitter 60 configured to move a portion of the channel signal from a source waveguide 70 onto one of the expedited sub-waveguides 76. The portion of the channel signal received by an expedited sub-waveguide 76 serves as one of the expedited sub-signals. The expedited sub-signals each carries a different one of the channels. The expedited sub-waveguides 76 each carries one of the expedited sub-signals to one of the control components 74 as described above. Since the expedited sub-signal are not separated from the tapped signal, the delay waveguide 62 can receive the delay signal from the splitter 50 as shown in FIG. 3. For instance, the delay waveguide 62 can receive a portion of the outgoing LIDAR signal from the splitter 50. The portion of the outgoing LIDAR signal received by the delay waveguide 62 can serve as the delay signal. Suitable splitters 60 include, but are not limited to, wavelength independent splitters such as directional couplers, optical couplers, y-junctions, tapered couplers, and Multi-Mode Interference (MIMI) devices.

The expedited sub-signal and the delayed channel signal received by same control component 74 each include light from the same source waveguide 70 and accordingly from the same channel signal. Light from each of the channel signals travels on one of several different delay pathways from a splitter 60 on a source waveguide 70 to one of the control components 74. Each of the delay pathways is primarily defined by the portion of a source waveguide 70 after a splitter 60, the laser multiplexer 72, the portion of the utility waveguide 12 between the laser multiplexer 72 and the splitter 50, the splitter 50, the delay waveguide 62, the first splitter 64, and one of the delayed channel waveguides 72.

Each of the delay pathways has a common portion and multiple separated portions. The common portion of each delay pathway is shared by the delay pathways. In contrast, the separated portions of a delay pathways are not shared with the other delay pathways. The light signals that travel through the common portion can carry multiple different channels. The light signals that travel through the separated portions can each carry a different channel. For instance, the portion of the utility waveguide 12 between the laser multiplexer 72 and the splitter 50, and the delay waveguide 62 are common to each of the delay pathways and serves as the common portion. In contrast, the portion of a source waveguide 70 after a splitter 60, and the delayed channel waveguides 72 are each separated from the other delayed channel waveguides 72 and serve as a separated portion.

In the LIDAR system of FIG. 3, each of the delay pathways is traveled by a delay pathway signal that is a combination of a channel signal, the outgoing LIDAR signal, the delay signal and one of the delayed channel signals. Additionally, light from each of the channel signals travels a different expedited pathway from a splitter 60 on a source waveguide 70 to one of the control components 74. The expedited pathways exclude a common portion. The expedited pathways are each defined primarily by an expedited sub-waveguide 76. Each of the expedited sub-signals serves as an expedited pathway signal that travels one of the expedited pathways.

The expedited pathways and the delayed pathways are configured such that each control component 74 receives a delayed pathway signal and an expedited pathway signal that carry the same channel (the common channel). The expedited pathways and the delayed pathways can be configured such that each of the different control components 74 receives a delayed pathway signal and an expedited pathway signal that carry a different common channel. Additionally, the delay pathways and the expedited pathways can be configured such that the delay pathway signal and/or the expedited pathway signal received at each of the control components 74 carries only one of the channels or carries essentially only one of the channels.

The components that define the delay pathways and the expedited pathways are configured such that an expedited pathway signal and a delayed pathway signal that arrive at the same the control component 74 have the arrival of the delayed pathway signal at the control component 74 delayed relative to the arrival of the expedited pathway signal at the control component 74.

Because the delayed pathway signal and the expedited pathway signal include different portions of a common signal (the channel signal), each control component 74 receives a delayed portion of the common signal and also receives an expedited portion of the common signal with the delayed portion being delayed relative to the tapped portion. The components that define the delayed pathway and the expedited pathway can be configured to provide the delay between the tapped portion and the expedited portion arriving at the control component 74. For instance, the waveguides that define the delayed pathways and the waveguide(s) that define the expedited pathways can be configured such that the delayed pathway is longer than the expedited pathway by a length that provides the delays desired at each control component 84. The length of the delay section 70 can be the primary source of the length difference between the delay pathway and the expedited pathway that lead to the same control component 74. As is evident from FIG. 3, a delay signal that carries the different channels travels through the same delay section 70. As a result, the same delay section 70 is common to each of the delay pathways and each of the channels.

Figure 4:
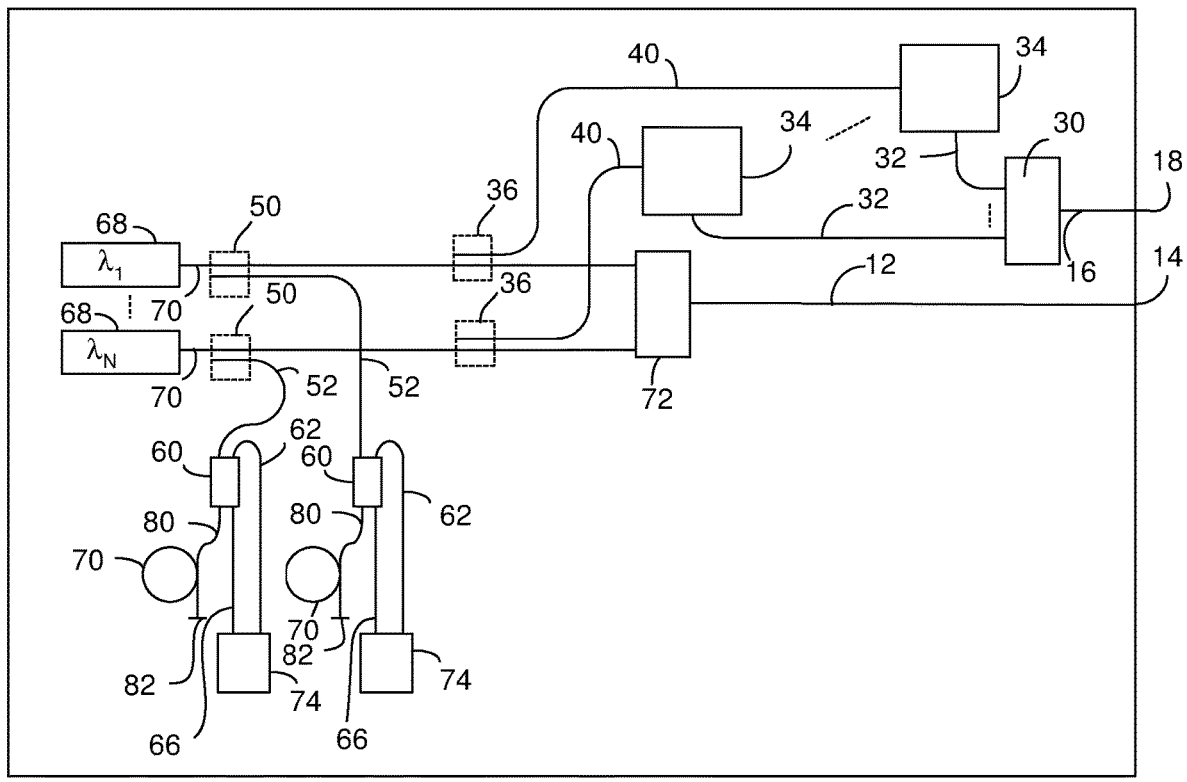
FIG. 4 is a top view of a LIDAR chip.

FIG. 3 illustrate a LIDAR system where the light in the expedited signals has not been separated from a common signal that carries multiple channels but the light in the delayed signals is separated from a common signal. However, the LIDAR system can be configured such that the light in the expedited signals has not been separated from a common signal and the light in the delayed signals has not been separated from a common signal. For instance, FIG. 4 illustrates the LIDAR system of FIG. 3 modified such that the light in the expedited signals and in the delayed signals has not been separated from a common signal. Each of the source waveguides 70 includes the splitter 50 and differential delay mechanism 54 disclosed in the context of FIG. 2. As a result, each of the splitter 50 is configured to move a portion of the channel signal from a source waveguide 70 onto a control waveguide 52. The portion of the channel signal received by a control waveguide 52 can serves as the tapped signal. Because each of the channel signals carries a different one of the channels, the light in each of the tapped signals carries a different one of the channels.

The tapped signals are each received at a different splitter 60. Each splitter 60 divides the tapped signal into the expedited signal and a first delayed signal. The expedited signals are each received on an expedited waveguide 66. Suitable splitters 60 include, but are not limited to, Multi-Mode Interference couplers (MMIs), and directional couplers.

Each of the first delay waveguides 80 receives the first delayed signal from the splitter 60. The first delay waveguide 80 carries the first delayed signal to a return device 82. The return device 82 is configured to return the first delayed signal to the first delay waveguide 80 such that the first delayed signal travels from the return device 82 back through the first delay waveguide 80 to the splitter 60. As a result, the first delayed signal travels through the first delay waveguide 80 twice. Each of the splitters 60 receives a first delayed signal from the first delay waveguide 80 and outputs the first delay signal on the delay waveguide 62. The portion of the first delayed signal received on the delay waveguide 62 serves as a second delay signal carried on the delay waveguide 62. A first delay signal and the associated second delay signal can effectively serve together as a delay signal.

When the channel signals each carries a single channel, the resulting first delay signal and the second delay signal also carry a single channel. As a result, the second delay signal is not a common signal and there is no need for the first splitter 64 disclosed in the context of FIG. 1A through FIG. 3. Further, since the second delay signals carry a single channel they can each effectively serve as one of the delayed channel signals disclosed in the context of FIG. 1A through FIG. 3. As a result, each of the delay waveguides 62 can serve as a delayed channel waveguides 72 from FIG. 1A through FIG. 3 by carrying a second delay signal that serves as a delayed channel signal to one of the control components 74.

When the channel signals each carries a single channel, the resulting expedited signals also carry a single channel. As a result, each of the resulting expedited signals is not a common signal and there is no need for the second splitter 68 disclosed in the context of FIG. 1A through FIG. 3. Further, since each of the expedited signals carries a single channel they can each effectively serve as one of the expedited sub-signals disclosed in the context of FIG. 1A through FIG. 3. As a result, each of the expedited waveguides 66 can serve as an expedited sub-waveguide 76 by carrying an expedited signal that serves as an expedited sub-signal to one of the control components 74.

The expedited sub-signal and the delayed channel signal received by same control component 74 each include light from the same source waveguide 70 and accordingly from the same channel signal. Light from each of the channel signals travels on one of several different delay pathways from a splitter 50 on a source waveguide 70 to one of the control components 74. Each of the delay pathways is primarily defined by a control waveguide 52, the splitter 60, a first delay waveguide 80, and a delay waveguide 62. Each of the expedited pathways and each of the delay pathways excludes a common portion.

In the LIDAR system of FIG. 4, each of the delay pathways is traveled by a delay pathway signal that is a combination of a control signal, a first delayed signal, and a second delayed signal. Additionally, light from each of the channel signals travels a different expedited pathway from a splitter 50 on a source waveguide 70 to one of the control components 74. The expedited pathways are each defined primarily by a control waveguide 52, the splitter 60, and an expedited waveguide 66. Each of the expedited pathways is traveled by an expedited pathway signal that is a combination of a control signal, the splitter 60, and an expedited sub-signal. The expedited pathways and the delayed pathways are configured such that each control component 74 receives a delayed pathway signal and an expedited pathway signal that carry the same channel. The components that define the delay pathways and the expedited pathways are configured such that an expedited pathway signal and a delayed pathway signal that arrive at the same the control component 74 have the arrival of the delayed pathway signal at the control component 74 delayed relative to the arrival of the expedited pathway signal at the control component 74.

Because the delayed pathway signal and the expedited pathway signal include different portions of a common signal (one of the channel signals), each control component 74 receives a delayed portion of the common signal and also receives an expedited portion of the common signal with the delayed portion being delayed relative to the tapped portion. The components that define the delayed pathway and the expedited pathway can be configured to provide the delay between the tapped portion and the expedited portion arriving at the control component 74. For instance, the waveguides that define the delayed pathways and the waveguide(s) that define the expedited pathways can be configured such that the delayed pathway is longer than the expedited pathway by a length that provides the delays desired at each control component 84. The length of the delay section 70 can be the primary source of the length difference between the delay pathway and the expedited pathway that lead to the same control component 74. As is evident from FIG. 4, the first delayed signals that carry the different channels travel through different delay sections 70.

In some instances, LIDAR assembly includes or consists of a LIDAR chip and a LIDAR adapter configured to separate output signals that carry light that will be exiting from the LIDAR system from return signals that have light that has already exited from the LIDAR system and returned to the LIDAR system. In some instances, the LIDAR adapter can be physically optically positioned between the LIDAR chip and the one or more reflecting objects and/or the field of view in that an optical path that the first LIDAR input signal(s) and/or the LIDAR output signal travels from the LIDAR chip to the field of view passes through the LIDAR adapter. Additionally, the LIDAR adapter can be configured to operate on the LIDAR input signal and the LIDAR output signal such that the LIDAR input signal and the LIDAR output signal travel on different optical pathways between the LIDAR adapter and the LIDAR chip but on the same optical pathway between the LIDAR adapter and a reflecting object in the field of view.

Figure 5:
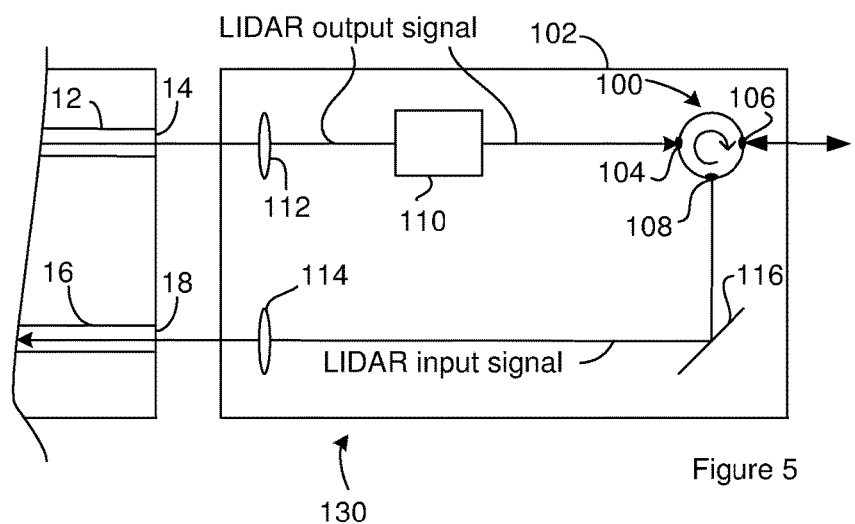
FIG. 5 is a top view of a LIDAR assembly that includes a LIDAR adapter in optical communication with an LIDAR chip.

An example of a LIDAR adapter that is suitable for use with the LIDAR chip of FIG. 1A through FIG. 4 is illustrated in FIG. 5. The LIDAR adapter includes multiple components positioned on a base. For instance, the LIDAR adapter includes a circulator 100 positioned on a base 102. The illustrated optical circulator 100 includes three ports and is configured such that light entering one port exits from the next port. For instance, the illustrated optical circulator includes a first port 104, a second port 106, and a third port 108. The LIDAR output signal enters the first port 104 from the utility waveguide 12 of the LIDAR chip and exits from the second port 106.

The LIDAR adapter can be configured such that the output of the LIDAR output signal from the second port 106 can also serve as the output of the LIDAR output signal from the LIDAR adapter and accordingly from the LIDAR assembly. As a result, the LIDAR output signal output from the LIDAR adapter can serve as an assembly output signal.

The assembly output signal includes, consists of, or consists essentially of light from the LIDAR output signal received from the LIDAR chip. Accordingly, the assembly output signal may be the same or substantially the same as the LIDAR output signal received from the LIDAR chip. However, there may be differences between the assembly output signal and the LIDAR output signal received from the LIDAR chip. For instance, the LIDAR output signal can experience optical loss as it travels through the LIDAR adapter and/or the LIDAR adapter can optionally include an amplifier configured to amplify the LIDAR output signal as it travels through the LIDAR adapter.

When one or more objects in the sample region reflect the assembly output signal, at least a portion of the reflected light travels back to the circulator 100 as an assembly return signal. The assembly return signal enters the circulator 100 through the second port 106. FIG. 5 illustrates the assembly output signal traveling away from the LIDAR assembly along the same pathway that the assembly return signal traveling returns to the LIDAR assembly.

The assembly return signal exits the circulator 100 through the third port 108 and is directed to the comparative waveguide 18 on the LIDAR chip. Accordingly, all or a portion of the assembly return signal can serve as the first LIDAR input signal and the first LIDAR input signal includes or consists of light from the assembly return signal. Accordingly, the LIDAR output signal and the first LIDAR input signal travel between the LIDAR adapter and the LIDAR chip along different optical paths.

As is evident from FIG. 5, the LIDAR adapter can include optical components in addition to the circulator 100. For instance, the LIDAR adapter can include components for directing and controlling the optical path of the LIDAR output signal and the assembly return signal. As an example, the adapter of FIG. 5 includes an optional amplifier 110 positioned so as to receive and amplify the LIDAR output signal before the LIDAR output signal enters the circulator 100. The amplifier 110 can be operated by the electronics 62 allowing the electronics 62 to control the power of the LIDAR output signal.

FIG. 5 also illustrates the LIDAR adapter including an optional first lens 112 and an optional second lens 114. The first lens 112 can be configured to couple the LIDAR output signal to a desired location. In some instances, the first lens 112 is configured to focus or collimate the LIDAR output signal at a desired location. In one example, the first lens 112 is configured to couple the LIDAR output signal on the first port 104 when the LIDAR adapter does not include an amplifier 110. As another example, when the LIDAR adapter includes an amplifier 110, the first lens 112 can be configured to couple the LIDAR output signal on the entry port to the amplifier 110. The second lens 114 can be configured to couple the LIDAR output signal at a desired location. In some instances, the second lens 114 is configured to focus or collimate the LIDAR output signal at a desired location. For instance, the second lens 114 can be configured to couple the LIDAR output signal the on the facet 35 of the comparative waveguide 18.

The LIDAR adapter can also include one or more direction changing components such as mirrors. FIG. 5 illustrates the LIDAR adapter including a mirror as a direction-changing component 116 that redirects the assembly return signal from the circulator 100 to the facet 20 of the comparative waveguide 18.

The LIDAR chips include one or more waveguides that constrains the optical path of one or more light signals. While the LIDAR adapter can include waveguides, the optical path that the assembly return signal and the LIDAR output signal travel between components on the LIDAR adapter and/or between the LIDAR chip and a component on the LIDAR adapter can be free space. For instance, the assembly return signal and/or the LIDAR output signal can travel through the atmosphere in which the LIDAR chip, the LIDAR adapter, and/or the base 102 is positioned when traveling between the different components on the LIDAR adapter and/or between a component on the LIDAR adapter and the LIDAR chip. As a result, optical components such as lenses and direction changing components can be employed to control the characteristics of the optical path traveled by the assembly return signal and the LIDAR output signal on, to, and from the LIDAR adapter.

Suitable bases 102 for the LIDAR adapter include, but are not limited to, substrates, platforms, and plates. Suitable substrates include, but are not limited to, glass, silicon, and ceramics. The components can be discrete components that are attached to the substrate. Suitable techniques for attaching discrete components to the base 102 include, but are not limited to, epoxy, solder, and mechanical clamping. In one example, one or more of the components are integrated components and the remaining components are discrete components. In another example, the LIDAR adapter includes one or more integrated amplifiers and the remaining components are discrete components.

Suitable circulators 100 for use with the adapter include, but are not limited to, the circulator disclosed in U.S. patent application Ser. No. 16/726,235, filed on Dec. 23, 2019, and entitled "LIDAR System with Separation of Signals by Polarization Angle;" and U.S. patent application Ser. No. 17/221,770, filed on Apr. 2, 2021, and entitled "Use of Circulator in LIDAR System;" each of which is incorporated herein in its entirety.

Figure 6:
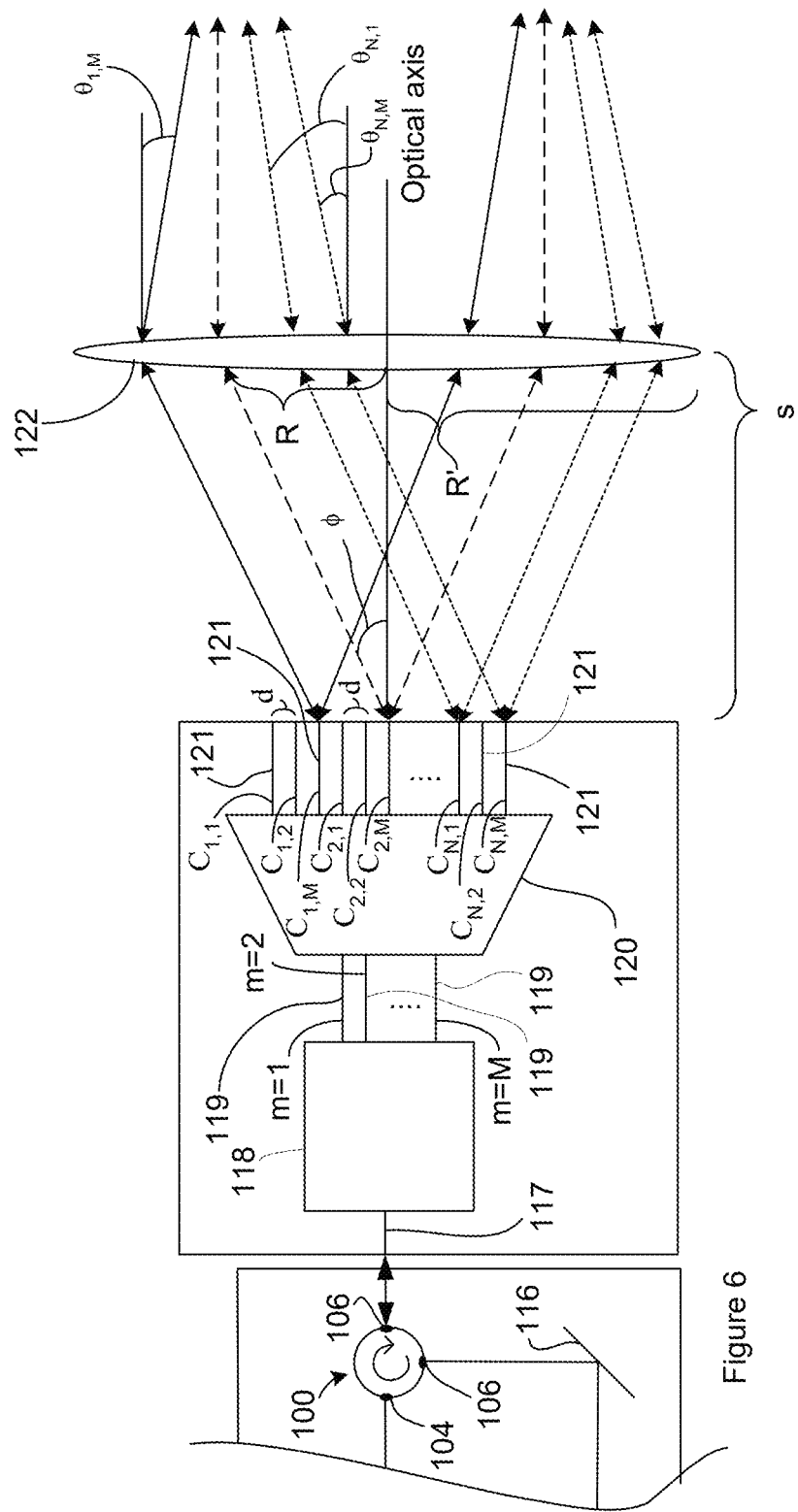
FIG. 6 is a topview of a scanning chip being used with an adapter constructed according to FIG. 5.

The LIDAR assembly can be used in conjunction with a scanning chip that the electronics can operate to steer a direction that system output signals travel away from the LIDAR system to multiple different sample regions in a field of view. FIG. 6 is a topview of an example of a scanning chip being used with an adapter constructed according to FIG. 5. The scanning chip includes a photonic integrated circuit. The photonic integrated circuit includes a common waveguide 117 that receives the assembly output signal from the adapter. The common waveguide 117 carries the assembly output signal to an optical switch 118. Although not illustrated in FIG. 6, other optical components, such as an amplifier, lens, or optical fiber can be positioned on the optical pathway between the circulator 106 and the optical switch 118. As a result, other optical components can operate on the assembly output signal before the assembly output signal is received at the optical switch 118. The portion of the assembly output signal received at the optical switch 118 can serve as a switch signal. The optical switch 118 directs the switch signal to a portion of multiple alternate waveguides 119. The optical switch 118 can be operated by the electronics 62. For instance, the electronics can operate the optical switch 118 so as to control which of the alternate waveguides 119 receives the switch signal. In some instances, the optical switch 118 directs the switch signal to one of multiple alternate waveguides 119. The alternate waveguides 119 are each associated with an alternate waveguide index m=1 through M.

The scanning chip includes a splitter 120 in optical communication with the alternate waveguides 119 and with multiple channel output waveguides 121. The alternate waveguides 119 can serve as first splitter waveguides and the channel output waveguides 121 can serve as first splitter waveguides. The alternate waveguide 119 that received the switch signal guides light from the switch signal to a splitter 120. The splitter 120 is configured to divide the light from the switch signal into multiple different channel output signals that are each received on a channel output waveguide 121. Since the switch signal includes or consists of light from the outgoing LIDAR signal, the switch signal can be a common signal that carries the multiple channels carried by the outgoing LIDAR signal. The splitter 120 can be a wavelength dependent splitter. As a result, each of the channel output signals can carry a different one of the channels. Suitable first splitters 120 include, but are not limited to, demultiplexers such as arrayed waveguide gratings, echelle gratings, and ring resonator based devices.

The splitter 120 is configured such that a portion of the channel output waveguides 121 each receives one of the channel output signals. The one or more output waveguides 121 that receive one of the channel output signals can change in response to a change in which of the alternate waveguides 119 receives the switch signal. For instance, the channel output waveguides 121 in FIG. 6 are labeled $C_{i,m}$ where i represents the channel index and m represents the alternate waveguide index. When the alternate waveguide 119 with alternate waveguide index m receives the switch signal, each of the channel output waveguides 121 labeled $C_{i,m}$ receives one of the channel output signals. As an example, when the alternate waveguide 119 with alternate waveguide index 2 receives the switch signal, each of the channel output waveguides 121 labeled $C_{i,2}$ receives one of the channel output signals. In this example, each of the channel output waveguides 121 labeled $C_{1,2}$, $C_{2,2}$, and $C_{N,2}$, receives one of the channel output signals while the channel output waveguides 121 labeled $C_{1,1}$, $C_{2,1}$, $C_{N,1}$, $C_{1,2}$, $C_{1,M}$, $C_{2,M}$, and $C_{N,M}$, do not receive one of the channel output signals. In comparison, when the alternate waveguide 119 with alternate waveguide index M receives the switch signal, each of the channel output waveguides 121 labeled $C_{i,M}$ receives one of the channel output signals.

Since the electronics can operate the optical switch 118 so as to control which of the alternate waveguides 119 receives the switch signal and the portion of the channel output waveguides 121 that receives one of the channel output signals changes in response to which of the alternate waveguides 119 receives the switch signal, the electronics can operate the optical switch 118 so as to control which of the channel output waveguides 121 receives one of the channel output signals.

The LIDAR system also includes a redirection component configured to receive the channel output signals from any one of the channel output waveguides 121 and to direct the received channel output signals such that different channel output signals travel away from the redirection component in different directions. Additionally, the redirection component directs the received channel output signals such that the direction that each of the outgoing LIDAR signal travels away from the redirection component is a function of the channel output waveguides 121 from which the redirection component receives the outgoing LIDAR signal.

The channel output signals travel away from LIDAR system in different directions as a result of the channel output signals traveling away from the redirection component in different directions.

The different directions of the channel output signals can be a function of the channel output waveguides 121 in that the direction that the each channel output signal travels away from the redirection component changes in responses to changes in the channel output waveguide 121 from which the redirection component receives the channel output signal. In some instances, the redirection component is configured such that none of the different directions is parallel to one another. For instance, the redirection component can be configured such that the different channel output signals travel away from the redirection component at different transmission angles and the transmission angles change when the redirection component receives the channel output signals from different channel output waveguides 121. The transmission angle is measured relative to the redirection component.

In FIG. 6, a lens serves as the redirection component 122. The lens is positioned to receive the channel output signals from the channel output waveguides 121. The lens and channel output waveguides 121 are arranged such that channel output signals from different channel output waveguides 121 are incident on different regions of an input side of the lens and/or have a different incident angle on the input side of the lens. As a result, channel output signals from different channel output waveguides 121 travel away from the lens in different directions. For instance, FIG. 6 labels the transmission angle of the channel output signal that the redirection component 122 received from the channel output waveguide 121 labeled $C_{i,m}$ as $\theta_{i,m}$ where i represents the channel index and m represents the alternate waveguide index.

FIG. 6 labels the transmission angle label ($\theta_{i,m}$) for the channel output signals that are output from the channel output waveguide 121 that are labeled $C_{1,M}$, and $C_{N,M}$. When the switch signal is directed to the alternate waveguide labeled m=M, the channel output signal output from the channel output waveguide 121 labeled $C_{1,M}$ has transmission angle $\theta_{1,M}$ and the channel output signal output from the channel output waveguide 121 labeled $C_{N,M}$ has transmission angle $\theta_{N,M}$. Because the transmission angle $\theta_{1,M}$ is different from the transmission angle $\theta_{N,M}$, the redirection component 122 can concurrently output channel output signals that carry different channels and travel away from the redirection components 122 in different directions.

FIG. 6 also labels the transmission angle label ($\theta_{i,m}$) for the channel output signals that are output from the channel output waveguide 121 that are labeled $C_{N,1}$, and $C_{N,M}$. When the switch signal is directed to the alternate waveguide labeled m=1, the channel output signal carrying channel N has transmission angle $\theta_{N,1}$. When the alternate waveguide that receives the switch signal is changed to the alternate waveguide labeled m=M, the transmission angle for the channel output signal carrying channel N changes to $\theta_{N,M}$. As is evident from FIG. 6, the transmission angle $\theta_{N,1}$ is different from the transmission angle $\theta_{N,M}$. As a result, the direction that a channel output signal travels away from the redirection component 122 changes in response to a change in the alternate waveguide that receives the switch signal.

The transmission angles are measured relative to the redirection component 122. For instance, the transmission angle can be measured between the optical axis of the lens and the LIDAR output signal. As is evident from FIG. 6, the angle $\theta_{i,m}$ is different for different channel output waveguides 121. Since the channel output signals from different channel output waveguides 121 travel away from the lens in different directions, the electronics can control the direction of the channel output signals by operating the switch so as to direct the switch signal to the alternate waveguide 119 that provides the channel output signals with the desired directions. The degree of change in directions from one alternate waveguide 119 to another alternate waveguide 119 can be a function of the lens construction. Accordingly, the lens construction can be altered to increase or decrease the degree of change in direction between alternate waveguides.

The LIDAR system is configured to output system output signals that each includes or consists of light from one of the channel output signals output from the redirection component 122. As a result, each of the system output signals can carry a different one of the channels. As will be discussed below, each of the channel output signals output from the redirection component 122 can serve as one of the system output signals. Each of the system output signals illuminates a sample region in a field of view. When an object is present in a sample region that is being illuminated by a system output signal, the object can reflect light from the system output signal. The reflected light returns to the LIDAR system in a system return signal. Each of the system returns signals can carry a different one of the channels.

As will be described below, the direction that each of the system output signals travels away from the LIDAR system changes in response to changes in the alternate waveguide 119 that receives the switch signal. As a result, the electronics can scan each of the system output signals through different sample regions in the field of view by changing the alternate waveguide 119 that receives the switch signal. The LIDAR system can be configured to generate the LIDAR data for each of the sample regions.

In some instances, the electronics delay switching the alternate waveguide 119 that receives the switch signal for a sample region illumination period with a sample region duration. As a result, the system output signals each illuminates a different sample region for the sample region duration. The sample region duration can be selected to provide the system output signals have been allowed at least enough time to travel from the LIDAR system to an object at a maximum operational distance from the LIDAR system and to return to the LIDAR system.

The scanning chip can receive channel return signals that each includes or consists of light from a different one of the system return signals. As will be explained below, in some instances, each of the system return signals serves as a different one of the channel return signals. The channel output waveguides 121 receive the channel return signal that carries the same channel as the channel output signal output from the channel output waveguide 121. For instance, during a sample region illumination period, the channel return signal carrying channel $\lambda_i$ returns to the channel output waveguide 121 that output the channel output signal carrying channel $\lambda_i$ during the sample region illumination period. Because a portion of the channel output waveguides 121 do not output a channel output signal during the sample region illumination period, a portion of the channel output waveguides 121 do not receive a channel return signal during sample region illumination period but may receive a channel return signal during a different sample region illumination period.

The channel output waveguides 121 carry the received channel return signal to the splitter 120. The splitter 120 can combines the channel return signals into an assembly return signal received on the common waveguide 117. Accordingly, the splitter 120 can operate as a demultiplexer/multiplexer. The common waveguide carries the assembly return signal to an exit port through which the assembly return signal can exit the scanning chip to be received by the LIDAR adapter as described above. In some instance, the exit port is a facet of the common waveguide 117.

In FIG. 6, R represents the radius of the channel output signal at the input side of the lens, R' represents the lens radius, and s represents the object distance from the lens. The value of R' can be selected to increase the amount of diverging light that is captured by the lens. The ratio of R/s can be used to approximate the value needed for R' and can be a function of the divergence angle of the light from the waveguide facet. To increase capture of the diverging light, twice the divergence half angle $\phi$ can be used. In that case, R/s can be at least equal to tan(2$\phi$). For example, for an alternative waveguide facet dimension of 10 μm in the lateral direction, the lateral divergence half angle ϕ is approximately 6°. In that case R/s can be at least equal to tan(12°)=1/5. R' represents the lens radius which can be larger than the half-width of the LIDAR output signal (R) to accommodate the change in position of the LIDAR output signal on the lens due to switching between the alternate waveguides. In some instances, the R' is greater than or equal to R, 1.3R, or 1.6R and/or less than or equal to 4R, or 6R where R is greater than or equal to s*tan(2ϕ).

The center-to-center distance between the facets of the channel output wavegudies 121 is labeled d in FIG. 6. The angular resolution can be improved by decreasing d. In some instances, the center-to-center distance is constant for each adjacent pair of facets. However, the center-to-center distance can be different for different pairs of facets. A suitable center-to-center distance between facets 18 includes, but is not limited to, distances greater than 5, 10, or 50 μm and/or less than 100, 1,000, or 10,000 μm.

The maximum value for N*M can be the nearest integer value to (1+2(R'−R)/d) where R is the diameter of the channel output signals at the input side of the lens and R' is the lens radius. Accordingly, the scanning chip can include a number of channel output waveguides 121 less than or equal to the nearest integer value of (1+2(R'−R)/d). In some instances, N*M is greater than or equal to 5, 10, or 50 and/or less than 100, 500, or 1000. The angular range that can be scanned ($2\theta_{N,M}$) by sequentially directing the LIDAR output signal to each of the alternate waveguides 119 can be increased by increasing N or M. Accordingly, an improved resolution can be obtained by decreasing d and an improved scan range obtained by increasing N or M within the limits of the optical system.

The lens can be configured such that the lens collimates the LIDAR output signals from different channel output waveguides 121. Additionally or alternatively, the lens can be positioned such that one or more of the facets is located at a focal point of the lens.

Although FIG. 6 illustrates the redirection component 122 positioned off the scanning chip, the redirection component 122 can be included on the scanning chip.

Figure 7A:
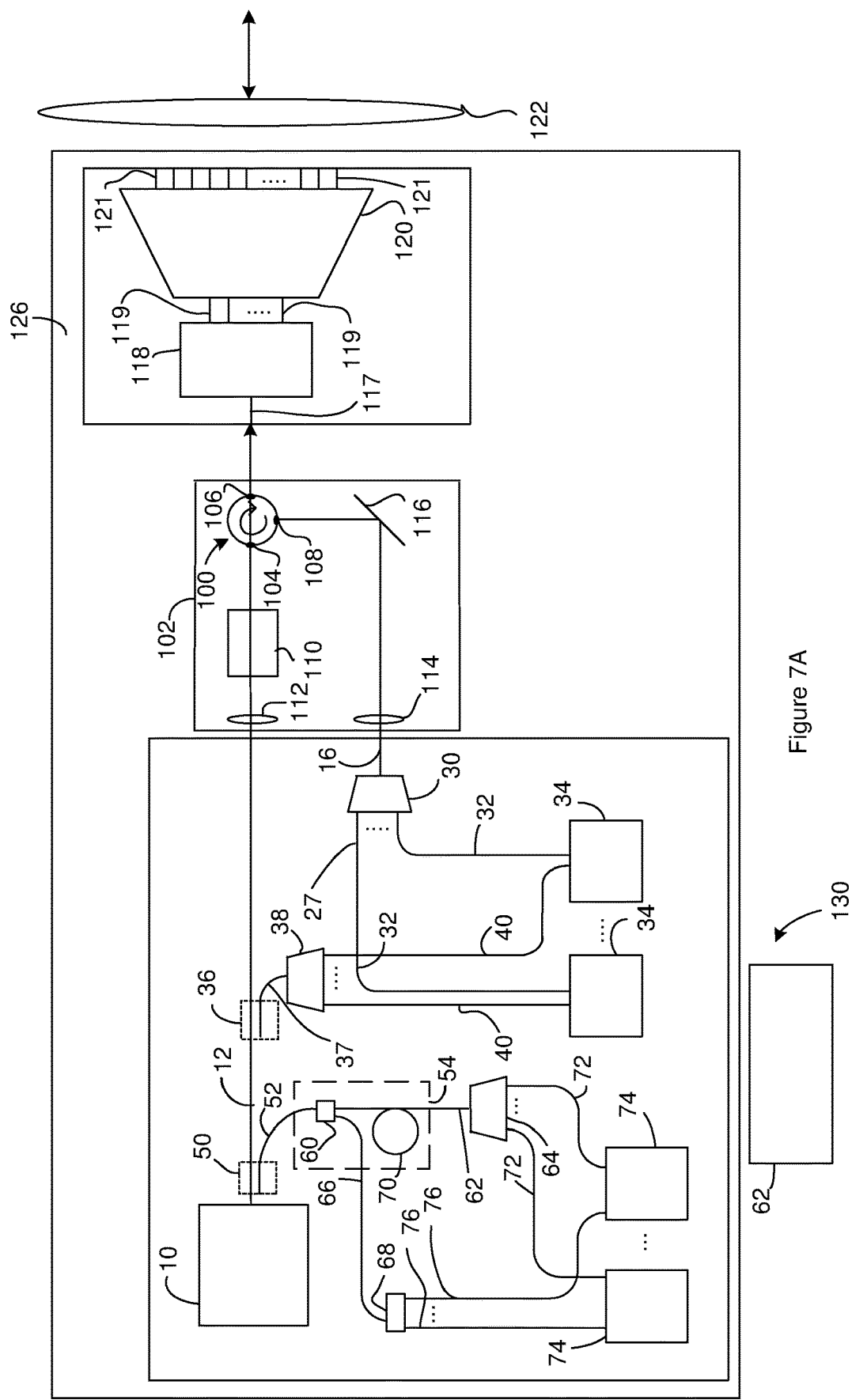
FIG. 7A is a topview of a LIDAR system that include the LIDAR chip disclosed in the context of FIG. 1A, the LIDAR adapter disclosed in the context of FIG. 5, and the scanning chip and redirection component disclosed in the context of FIG. 6.

A LIDAR system can include the electronics, LIDAR chip, LIDAR adapter, scanning chip and redirection component. For instance, FIG. 7A is a topview of a LIDAR system 130 that include the LIDAR chip disclosed in the context of FIG. 1A, the LIDAR adapter disclosed in the context of FIG. 5, and the scanning chip and redirection component disclosed in the context of FIG. 6. The LIDAR chip, LIDAR adapter, scanning chip and redirection component can be solid state to provide a solid state LIDAR system.

The channel output signals output from the redirection component 122 travel away from the LIDAR system and accordingly serve as system output signals that each carry a different one of the channels. As a result, each of the system output signals includes or consists of light from a channel output signal.

As noted above, the direction that the each channel output signal travels away from the redirection component 122 changes in responses to changes in the channel output waveguide 121 from which the redirection component receives the channel output signal. As a result, the direction that each of the system output signals travels away from the LIDAR system changes in response to changes in the alternate waveguide 119 that receives the switch signal. As a result, the electronics can scan each of the system output signals through different sample regions in the field of view by changing the alternate waveguide 119 that receives the switch signal.

Light from the system return signals can be reflected by an object that is illuminated by a system output signal. The reflected light can travel back toward the LIDAR system as system return signals. The different system return signals each carries a different one of the channels. The system return signals received by the LIDAR system can each serve as the channel return signals. For instance, each of the system returns signal received by a channel output signal can return as one of the channel return signals.

Figure 7B:
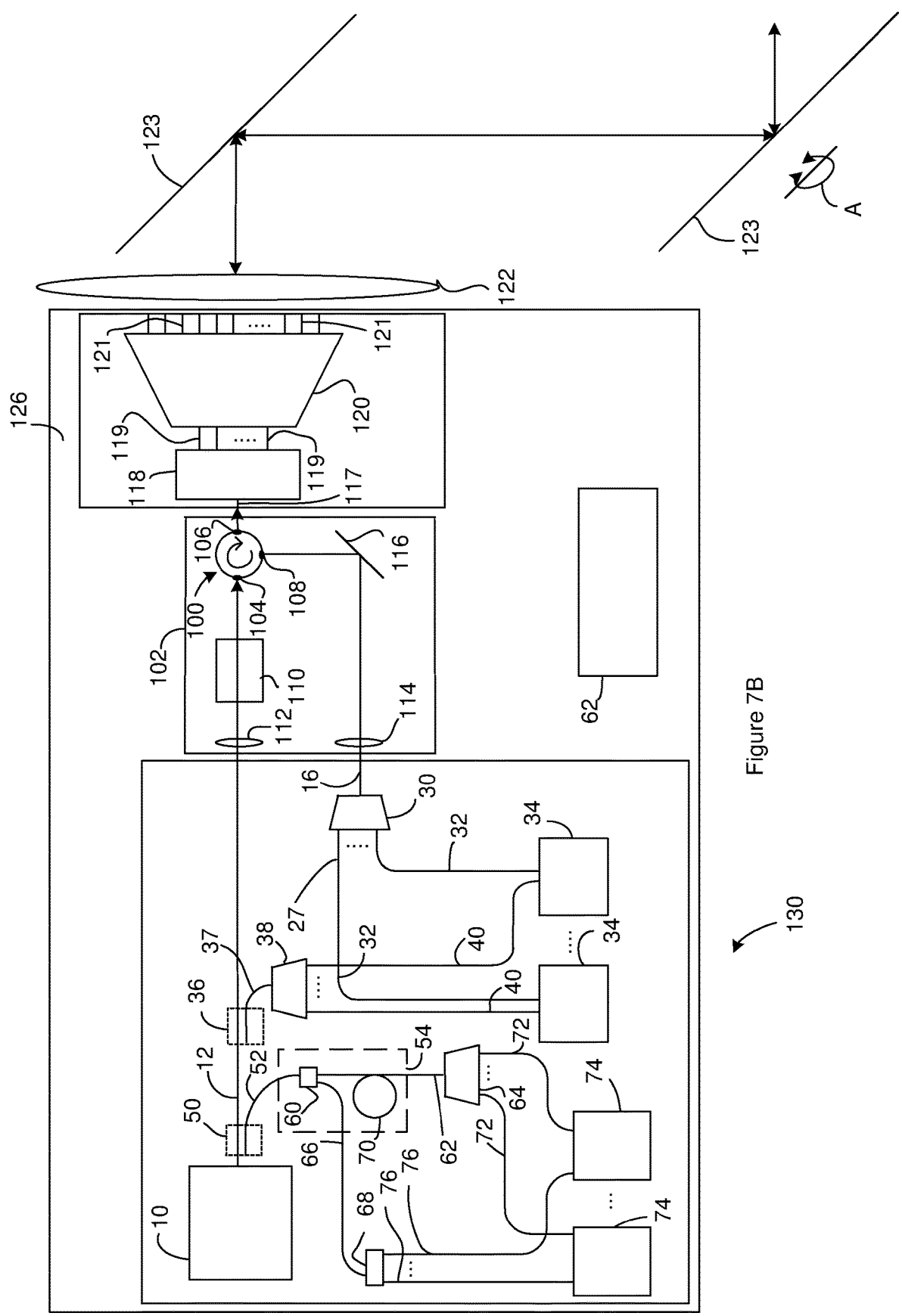
FIG. 7B is a topview of another embodiment of a LIDAR system that include the LIDAR system of FIG. 7A in combination with multiple steering components.

In the LIDAR system of FIG. 7A, the channel output signals serve as system output signals; however, the LIDAR system can include one or more other components that operate on the channel output signals output from the redirection component. Examples of components that can operate on the channel output signals output from the redirection component include steering components. For instance, FIG. 7B is a topview of a LIDAR system that includes steering components 123 that receives the channel output signals output from the redirection component 122 in the LIDAR system of FIG. 7A. One or more of the steering components can be operated by the electronics so as to steer the channel output signals and one or more of the steering components can be stationary. The one or more steering components 123 shown in FIG. 7B are mirrors that receive and reflect the channel output signals. The channel output signals that travel away from the one or more steering components 123 travel away from the LIDAR system and can serve as the system output signals. However, other suitable steering components include, but are not limited to stationary and/or steerable optical gratings and solid-state steering devices.

In FIG. 7B, one of the steering components 123 is stationary and one of the steering components 123 is movable. The movable steering component can be operated by the electronics so as to steer the channel output signals within the field of view. For instance, as illustrated by the arrows labeled A in FIG. 7B, the electronics can control movement of one or more of the steering components 123 so as to steer the system output signals within the field of view. The electronics can operate the one or more of the steering components 123 so as to steer the system output signals outside of the field of view provided only by operation of the optical switch. For instance, the operation of the optical switch can steer movement of the system output signals in what is substantially a two-dimensional or planar field of view. In contrast, the electronics can operate the one or more steering components 123 so as to steer channel output signals outside of the substantially two-dimensional steering provided by the optical switch 118. As a result, the electronics can operate the optical switch 118 and one or more steering components 123 so as to steer the system output signals to sample regions in a three-dimensional field of view.

The rate of scanning provided by operation of the scanning switch can be higher than the rate of scanning provided by the one or more steering components 123. For instance, the rate of scanning provided by operation of the scanning switch can at least 5, 10, or 100 times higher than the rate of scanning provided by the one or more steering components 123. The rate of scanning can be the angular rate of change of all or a portion of the system output signals. For instance, the rate of scanning provided by operation of the scanning switch can be the average rate of change of the transmission angle of all or a portion of the system output signals that results from operation of the scanning switch.

Light can be reflected by an object that is illuminated by a system output signal. The reflected light can travel back toward the LIDAR system and can accordingly serve as a system return signal. The different system return signals each carry a different one of the channels. The system return signals received by the LIDAR system can serve as the channel return signals. For instance, each of the system returns signal received by the one or more steering components 123 can serve as one of the channel return signals.

The LIDAR systems of FIG. 7A and FIG. 7B show the LIDAR chip, electronics, LIDAR adapter, and scanning chip positioned on a common support 126. Although the electronics 62 are illustrated as being located on the common support 126, all or a portion of the electronics can be located off the common support 126. FIG. 7B show the redirection component 122 and the one or more steering components 123 positioned off of the common support 126; however, one or more components selected from the group consisting of the redirection component 122 and the one or more steering components 123 can be positioned on the common support 126. Suitable approaches for mounting components such as the LIDAR chip, electronics, scanning chip, LIDAR adapter, redirection component and the one or more steering components on a common support include, but are not limited to, epoxy, solder, and mechanical clamping.

Although FIG. 7A and FIG. 7B illustrate the components of the LIDAR adapter positioned on a base 102 and the base positioned on the common support 126, all or a portion of the components for the LIDAR adapter can be positioned on the common support 126. As a result, the base 102 is optional.

Figure 8A:
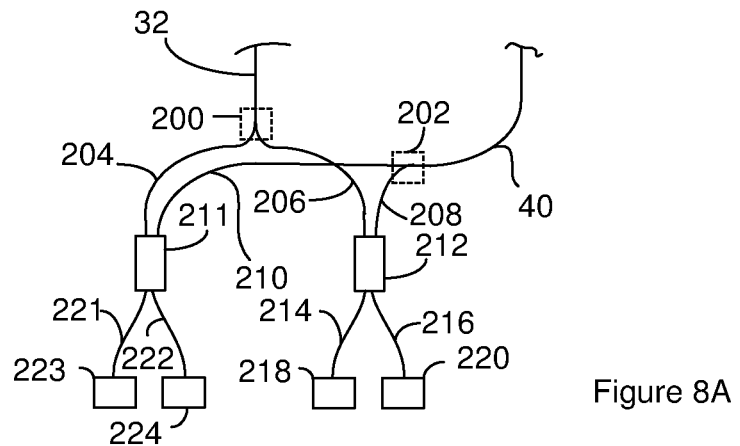
FIG. 8A illustrates an example of a processing component suitable for use with the LIDAR systems.
Figure 8B:
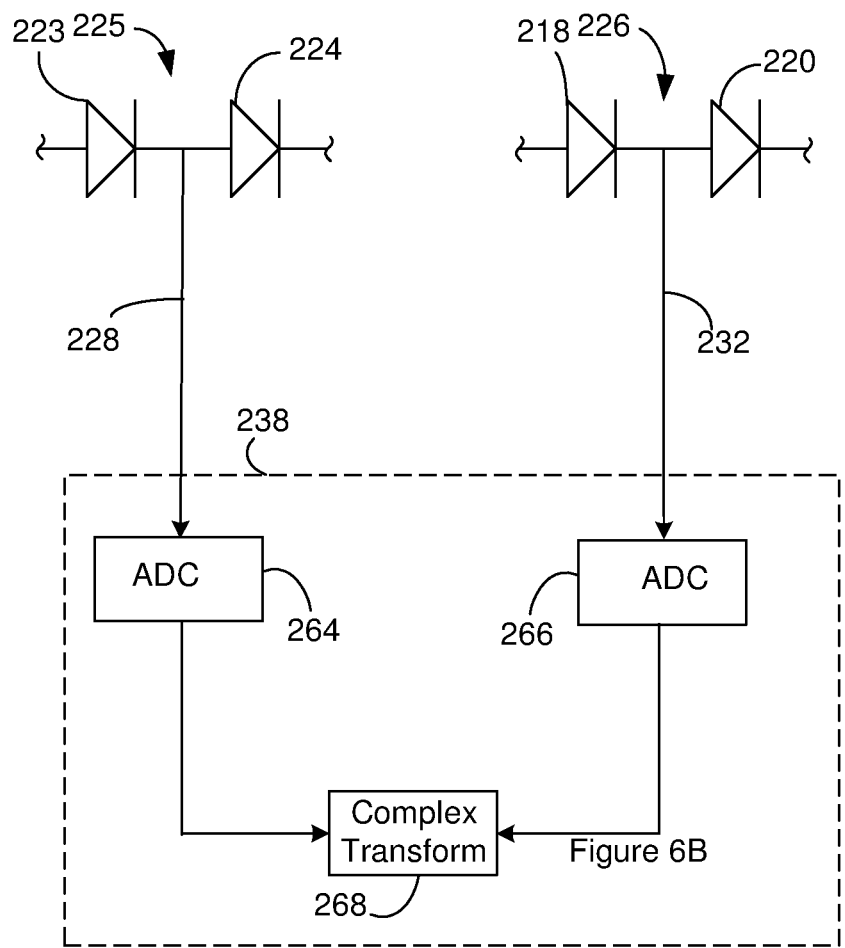
FIG. 8B provides a schematic of electronics that are suitable for use with a processing component constructed according to FIG. 7A.

FIG. 8A through FIG. 8C illustrate an example of a suitable processing component for use as all or a fraction of the processing components 34. The processing component 34 receives a comparative signal from one of the comparative waveguide 32 and a reference signal from one of the reference waveguides 40. The processing component includes a second splitter 200 that divides the comparative signal carried on the comparative waveguide 32 onto a first comparative waveguide 204 and a second comparative waveguide 206. The first comparative waveguide 204 carries a first portion of the comparative signal to the light-combining component 211. The second comparative waveguide 208 carries a second portion of the comparative signal to the second light-combining component 212.

The processing component includes a first splitter 202 that divides the reference signal carried on the reference waveguide 40 onto a first reference waveguide 204 and a second reference waveguide 206. The first reference waveguide 204 carries a first portion of the reference signal to the light-combining component 211. The second reference waveguide 208 carries a second portion of the reference signal to the second light-combining component 212.

The second light-combining component 212 combines the second portion of the comparative signal and the second portion of the reference signal into a second composite signal. Due to the difference in frequencies between the second portion of the comparative signal and the second portion of the reference signal, the second composite signal is beating between the second portion of the comparative signal and the second portion of the reference signal.

The second light-combining component 212 also splits the resulting second composite signal onto a first auxiliary detector waveguide 214 and a second auxiliary detector waveguide 216. The first auxiliary detector waveguide 214 carries a first portion of the second composite signal to a first auxiliary light sensor 218 that converts the first portion of the second composite signal to a first auxiliary electrical signal. The second auxiliary detector waveguide 216 carries a second portion of the second composite signal to a second auxiliary light sensor 220 that converts the second portion of the second composite signal to a second auxiliary electrical signal. Examples of suitable light sensors include germanium photodiodes (PDs), and avalanche photodiodes (APDs).

In some instances, the second light-combining component 212 splits the second composite signal such that the portion of the comparative signal (i.e. the portion of the second portion of the comparative signal) included in the first portion of the second composite signal is phase shifted by 180° relative to the portion of the comparative signal (i.e. the portion of the second portion of the comparative signal) in the second portion of the second composite signal but the portion of the reference signal (i.e. the portion of the second portion of the reference signal) in the second portion of the second composite signal is not phase shifted relative to the portion of the reference signal (i.e. the portion of the second portion of the reference signal) in the first portion of the second composite signal. Alternately, the second light-combining component 212 splits the second composite signal such that the portion of the reference signal (i.e. the portion of the second portion of the reference signal) in the first portion of the second composite signal is phase shifted by 180° relative to the portion of the reference signal (i.e. the portion of the second portion of the reference signal) in the second portion of the second composite signal but the portion of the comparative signal (i.e. the portion of the second portion of the comparative signal) in the first portion of the second composite signal is not phase shifted relative to the portion of the comparative signal (i.e. the portion of the second portion of the comparative signal) in the second portion of the second composite signal. Examples of suitable light sensors include germanium photodiodes (PDs), and avalanche photodiodes (APDs).

The first light-combining component 211 combines the first portion of the comparative signal and the first portion of the reference signal into a first composite signal. Due to the difference in frequencies between the first portion of the comparative signal and the first portion of the reference signal, the first composite signal is beating between the first portion of the comparative signal and the first portion of the reference signal.

The first light-combining component 211 also splits the first composite signal onto a first detector waveguide 221 and a second detector waveguide 222. The first detector waveguide 221 carries a first portion of the first composite signal to a first light sensor 223 that converts the first portion of the second composite signal to a first electrical signal. The second detector waveguide 222 carries a second portion of the second composite signal to a second light sensor 224 that converts the second portion of the second composite signal to a second electrical signal. Examples of suitable light sensors include germanium photodiodes (PDs), and avalanche photodiodes (APDs).

In some instances, the light-combining component 211 splits the first composite signal such that the portion of the comparative signal (i.e. the portion of the first portion of the comparative signal) included in the first portion of the composite signal is phase shifted by 180° relative to the portion of the comparative signal (i.e. the portion of the first portion of the comparative signal) in the second portion of the composite signal but the portion of the reference signal (i.e. the portion of the first portion of the reference signal) in the first portion of the composite signal is not phase shifted relative to the portion of the reference signal (i.e. the portion of the first portion of the reference signal) in the second portion of the composite signal. Alternately, the light-combining component 211 splits the composite signal such that the portion of the reference signal (i.e. the portion of the first portion of the reference signal) in the first portion of the composite signal is phase shifted by 180° relative to the portion of the reference signal (i.e. the portion of the first portion of the reference signal) in the second portion of the composite signal but the portion of the comparative signal (i.e. the portion of the first portion of the comparative signal) in the first portion of the composite signal is not phase shifted relative to the portion of the comparative signal (i.e. the portion of the first portion of the comparative signal) in the second portion of the composite signal.

When the second light-combining component 212 splits the second composite signal such that the portion of the comparative signal in the first portion of the second composite signal is phase shifted by 180° relative to the portion of the comparative signal in the second portion of the second composite signal, the light-combining component 211 also splits the composite signal such that the portion of the comparative signal in the first portion of the composite signal is phase shifted by 180° relative to the portion of the comparative signal in the second portion of the composite signal. When the second light-combining component 212 splits the second composite signal such that the portion of the reference signal in the first portion of the second composite signal is phase shifted by 180° relative to the portion of the reference signal in the second portion of the second composite signal, the light-combining component 211 also splits the composite signal such that the portion of the reference signal in the first portion of the composite signal is phase shifted by 180° relative to the portion of the reference signal in the second portion of the composite signal.

Suitable light-combining components 211 and second light-combining components 212 include, but are not limited to, Multi-Mode Interference couplers, directional couplers, and tapered couplers.

The first reference waveguide 210 and the second reference waveguide 208 are constructed to provide a phase shift between the first portion of the reference signal and the second portion of the reference signal. For instance, the first reference waveguide 210 and the second reference waveguide 208 can be constructed so as to provide a 90 degree phase shift between the first portion of the reference signal and the second portion of the reference signal. As an example, one reference signal portion can be an in-phase component and the other a quadrature component. Accordingly, one of the reference signal portions can be a sinusoidal function and the other reference signal portion can be a cosine function. In one example, the first reference waveguide 210 and the second reference waveguide 208 are constructed such that the first reference signal portion is a cosine function and the second reference signal portion is a sine function. Accordingly, the portion of the reference signal in the second composite signal is phase shifted relative to the portion of the reference signal in the first composite signal, however, the portion of the comparative signal in the first composite signal is not phase shifted relative to the portion of the comparative signal in the second composite signal.

The first light sensor 223 and the second light sensor 224 can be connected as a balanced detector and the first auxiliary light sensor 218 and the second auxiliary light sensor 220 can also be connected as a balanced detector. For instance, FIG. 8B provides a schematic of the relationship between the electronics, the first light sensor 223, the second light sensor 224, the first auxiliary light sensor 218, and the second auxiliary light sensor 220. The symbol for a photodiode is used to represent the first light sensor 223, the second light sensor 224, the first auxiliary light sensor 218, and the second auxiliary light sensor 220 but one or more of these sensors can have other constructions. In some instances, all of the components illustrated in the schematic of FIG. 8B are included on the LIDAR chip. In some instances, the components illustrated in the schematic of FIG. 8B are distributed between the LIDAR chip and electronics located off of the LIDAR chip.

The electronics 62 connect the first light sensor 223 and the second light sensor 224 as a first balanced detector 225 and the first auxiliary light sensor 218 and the second auxiliary light sensor 220 as a second balanced detector 226. In particular, the first light sensor 223 and the second light sensor 224 are connected in series. Additionally, the first auxiliary light sensor 218 and the second auxiliary light sensor 220 are connected in series. The serial connection in the first balanced detector is in communication with a first data line 228 that carries the output from the first balanced detector as a first data signal. The serial connection in the second balanced detector is in communication with a second data line 232 that carries the output from the second balanced detector as a second data signal. The first data signal is an electrical representation of the first composite signal and the second data signal is an electrical representation of the second composite signal. Accordingly, the first data signal includes a contribution from a first waveform and a second waveform and the second data signal is a composite of the first waveform and the second waveform. The portion of the first waveform in the first data signal is phase-shifted relative to the portion of the first waveform in the first data signal but the portion of the second waveform in the first data signal being in-phase relative to the portion of the second waveform in the first data signal. For instance, the second data signal includes a portion of the reference signal that is phase shifted relative to a different portion of the reference signal that is included the first data signal. Additionally, the second data signal includes a portion of the comparative signal that is in-phase with a different portion of the comparative signal that is included in the first data signal. The first data signal and the second data signal are beating as a result of the beating between the comparative signal and the reference signal, i.e. the beating in the first composite signal and in the second composite signal.

The electronics 62 includes a transform mechanism 238 configured to perform a mathematical transform on the first data signal and the second data signal. For instance, the mathematical transform can be a complex Fourier transform with the first data signal and the second data signal as inputs. Since the first data signal is an in-phase component and the second data signal its quadrature component, the first data signal and the second data signal together act as a complex data signal where the first data signal is the real component and the second data signal is the imaginary component of the input.

The transform mechanism 238 includes a first Analog-to-Digital Converter (ADC) 264 that receives the first data signal from the first data line 228. The first Analog-to-Digital Converter (ADC) 264 converts the first data signal from an analog form to a digital form and outputs a first digital data signal. The transform mechanism 238 includes a second Analog-to-Digital Converter (ADC) 266 that receives the second data signal from the second data line 232. The second Analog-to-Digital Converter (ADC) 266 converts the second data signal from an analog form to a digital form and outputs a second digital data signal. The first digital data signal is a digital representation of the first data signal and the second digital data signal is a digital representation of the second data signal. Accordingly, the first digital data signal and the second digital data signal act together as a complex signal where the first digital data signal acts as the real component of the complex signal and the second digital data signal acts as the imaginary component of the complex data signal.

The transform mechanism 238 includes a transform component 268 that receives the complex data signal. For instance, the transform component 268 receives the first digital data signal from the first Analog-to-Digital Converter (ADC) 264 as an input and also receives the second digital data signal from the second Analog-to-Digital Converter (ADC) 266 as an input. The transform component 268 can be configured to perform a mathematical transform on the complex signal so as to convert from the time domain to the frequency domain. The mathematical transform can be a complex transform such as a complex Fast Fourier Transform (FFT). A complex transform such as a complex Fast Fourier Transform (FFT) provides an unambiguous solution for the shift in frequency of LIDAR input signal relative to the LIDAR output signal that is caused by the radial velocity between the reflecting object and the LIDAR chip. The electronics use the one or more frequency peaks output from the transform component 268 for further processing to generate the LIDAR data (distance and/or radial velocity between the reflecting object and the LIDAR chip or LIDAR system). The transform component 268 can execute the attributed functions using firmware, hardware or software or a combination thereof.

FIG. 8C shows an example of a relationship between the frequency of the system output signal(s), time, cycles and data periods. The frequency versus time pattern is shown for two of the system output signals carrying different channels. The system output signal carrying channel i is labeled $\lambda_i$ where i represents the channel index. The base frequency of the system output signal ($f_o$) can be the lowest frequency of the system output signal during a cycle.

The frequency versus time patterns are shown for a sequence of two cycles labeled $cycle_j$ and $cycle_{j+1}$. In some instances, the frequency versus time pattern is repeated in each cycle as shown in FIG. 8C.

Each cycle includes K data periods that are each associated with a period index k and are labeled $DP_k$. In the example of FIG. 8C, each cycle includes two data periods labeled $DP_k$ with k=1 and 2. In some instances, the frequency versus time pattern is the same for the data periods that correspond to each other in different cycles as is shown in FIG. 8C. Corresponding data periods are data periods with the same period index. As a result, each data period $DP_1$ can be considered corresponding data periods and the associated frequency versus time patterns are the same in FIG. 8C. At the end of a cycle, the electronics return the frequency to the same frequency level at which it started the previous cycle.

During the data period $DP_1$, and the data period $DP_2$, the electronics operate the light source that generates the channel signal carrying channel $\lambda_i$ such that the frequency of the system output signal changes at a linear rate $\alpha_i$ where i represents the channel index. The direction of the frequency change during the data period $DP_1$ is the opposite of the direction of the frequency change during the data period $DP_2$.

During each cycle, the system output signal that carries channel i illuminates a sample region labeled $SR_{k,i}$ where k represents a sample region index and i represents the channel index. For instance, during the cycle labeled j in FIG. 8C, the sample region $SR_{k,i}$ is illuminated by the system output signal carrying channel $\lambda_i$ and the sample region $SR_{k,i+1}$ is illuminated by the system output signal carrying channel $\lambda_{i+1}$. The sample region indices k can be assigned relative to time. For instance, the samples regions can be illuminated by the system output signal in the sequence indicated by the index k. As a result, the sample region $SR_{10,1}$ can be illuminated after sample region $SR_{9,1}$ and before $SR_{11,1}$.

The sample region illumination periods are labeled SRP and can be the same as the time of each cycle. As a result, the sample region duration can be the same as the duration of each cycle. In some instances, the electronics do not switch the alternate waveguide 119 that receives the switch signal during the sample region illumination period. As a result, during each sample region illumination period, the system output signals do not move in response changes to the alternate waveguide 119 that receives the switch signal.

In some instances, moving the system output signals to different sample regions includes changing the alternate waveguide 119 that receives the switch signal. The change in the alternate waveguide 119 that receives the switch signal can be done in between cycles. In some instances, there may be a delay associated with changing the alternate waveguide 119 that receives the switch signal. Although that delay may be present, that delay is not illustrated in FIG. 8C.

When the electronics operate one or more steering components 123 to steer the system output signals in the field of view, the steering of the system output signals by the one or more steering components 123 can be continuous. This continuous movement is a contrast to the stop-and-go movement provided by changing the alternate waveguide 119 that receives the switch signal.

The LIDAR system is typically configured to provide reliable LIDAR data when the object is within an operational distance range from the LIDAR system. The operational distance range can extend from a minimum operational distance to the maximum operational distance. A maximum roundtrip time can be the time required for a system output signal to exit the LIDAR system, travel the maximum operational distance to the object, and to return to the LIDAR system and is labeled $\tau_M$ in FIG. 8C.

Since there is a delay between the system output signal being transmitted and returning to the LIDAR system, the composite signals do not include a contribution from the LIDAR signal until after the system return signal has returned to the LIDAR system. Since the composite signal needs the contribution from the system return signal for there to be a beat frequency, the electronics measure the beat frequency that results from system return signal that return to the LIDAR system during a data window in the data period. The data window is labeled "W" in FIG. 8C. The contribution from the LIDAR signal to the composite signals will be present at times larger than the maximum operational time delay ($\tau_M$). As a result, the data window is shown extending from the maximum operational time delay ($\tau_M$) to the end of the data period.

FIG. 8C illustrates the frequency versus time pattern for two channels, however, the frequency versus time pattern disclosed in the context of FIG. 8C can be applied to each of the channels.

As is evident from the above discussion, each processing component 34 receives a comparative signal and a reference signal carrying the same channel. As a result, the frequency output from the Complex Fourier transform associated with a processing component 34 represents the beat frequency of a composite signal that includes a comparative signal beating against a reference signal where the comparative signal and the reference signal carry the same channel. The beat frequencies from the same processing component 34 and from two or more different data periods can be combined to generate the LIDAR data for one of the sample regions. For instance, the processing component 34 that receives the comparative signal and reference signal carrying channel $\lambda_i$ can combine the beat frequency generated from $DP_1$ in cycle j with the beat frequency generated from $DP_2$ in cycle j to generate the LIDAR data for the sample region $SR_{k,i}$. As an example, the following equation applies during a data period where electronics increase the frequency of the outgoing LIDAR signal during the data period such as occurs in data period $DP_1$ of FIG. 8C: $f_{ub}=-f_d+\alpha_i\tau$ where $f_{ub}$ is the frequency provided by the transform component 268, $f_d$ represents the Doppler shift ($f_d=2vf_c/c$) where $f_c$ represents the base frequency ($f_o$), c represents the speed of light, v is the radial velocity between the reflecting object and the LIDAR system where the direction from the reflecting object toward the LIDAR system is assumed to be the positive direction, c is the speed of light, and $\tau$ represents the time for the system output signal to exit from the LIDAR system, be reflected by an object located outside of the LIDAR system and the reflected light to return the LIDAR system in a system return signal (the roundtrip time). The following equation applies during a data period where electronics decrease the frequency of the outgoing LIDAR signal such as occurs in data period $DP_2$ of FIG. 8C: $f_{db}=-f_d-\alpha_i*\tau$ where $f_{db}$ is a frequency provided by the transform component 268. In these two equations, $f_d$ and $\tau$ are unknowns. The electronics solve these two equations for the two unknowns. The radial velocity for the sample region illuminated by the system output signal carrying channel $\lambda_i$ can then be quantified from the Doppler shift ($v=c*f_d/(2f_c)$) and/or the separation distance for that sample region can be quantified from $S=c*\tau/2$. The resulting LIDAR data (S and/or v) represent the LIDAR data for the sample region illuminated by the system output signal carrying channel $\lambda_i$. Since multiple different sample regions can be concurrently illuminated by system output signal carrying different channels, the LIDAR data can be generated for each of the different sample regions that are concurrently illuminated by one of the system output signals. Additionally, the different LIDAR data results can be generated in parallel using different processing component 34. Alternately, the different LIDAR data results can be generated in series using different processing component 34 depending on the configuration of the electronics.

In some instances, more than one object is present in a sample region. In some instances when more than one object is present in a sample region, the transform may output more than one frequency where each frequency is associated with a different object. The frequencies that result from the same object in different data periods of the same cycle can be considered corresponding frequency pairs. LIDAR data can be generated for each corresponding frequency pair output by the transform. As a result separate LIDAR data can be generated for each of the objects in a sample region.

Although FIG. 8A through FIG. 8B illustrate light-combining components that combine a portion of the reference signal with a portion of the comparative signal, the processing component can include a single light-combining component that combines the reference signal with the comparative signal so as to form a composite signal. As a result, at least a portion of the reference signal and at least a portion of the comparative signal can be combined to form a composite signal. The combined portion of the reference signal can be the entire reference signal or a fraction of the reference signal and the combined portion of the comparative signal can be the entire comparative signal or a fraction of the comparative signal.

As an example of a processing component that combines the reference signal and the comparative signal so as to form a composite signal, FIG. 8D through FIG. 8E illustrate the processing component of FIG. 8A through FIG. 8B modified to include a single light-combining component. The comparative waveguide 196 carries the comparative signal directly to the first light-combining component 211 and the reference waveguide 198 carries the reference signal directly to the first light-combining component 211.

The first light-combining component 211 combines the comparative signal and the reference signal into a composite signal. Due to the difference in frequencies between the comparative signal and the reference signal, the first composite signal is beating between the comparative signal and the reference signal. The first light-combining component 211 also splits the composite signal onto the first detector waveguide 221 and the second detector waveguide 222. The first detector waveguide 221 carries a first portion of the composite signal to the first light sensor 223 that converts the first portion of the second composite signal to a first electrical signal. The second detector waveguide 222 carries a second portion of the composite signal to the second light sensor 224 that converts the second portion of the second composite signal to a second electrical signal.

FIG. 8E provides a schematic of the relationship between the electronics, the first light sensor 223, and the second light sensor 224. The symbol for a photodiode is used to represent the first light sensor 223, and the second light sensor 224 but one or more of these sensors can have other constructions. In some instances, all of the components illustrated in the schematic of FIG. 8E are included on the LIDAR chip. In some instances, the components illustrated in the schematic of FIG. 8E are distributed between the LIDAR chip and electronics located off of the LIDAR chip.

The electronics connect the first light sensor 223 and the second light sensor 224 as a first balanced detector 225. In particular, the first light sensor 223 and the second light sensor 224 are connected in series. The serial connection in the first balanced detector is in communication with a first data line 228 that carries the output from the first balanced detector as a first data signal. The first data signal is an electrical representation of the composite signal.

The electronics 62 include a transform mechanism 238 configured to perform a mathematical transform on the first data signal. The mathematical transform can be a real Fourier transform with the first data signal as an input. The electronics can use the frequency output from the transform as described above to extract the LIDAR data.

Each of the balanced detectors disclosed in the context of FIG. 8A through FIG. 8E can be replaced with a single light sensor. As a result, the processing component can include one or more light sensors that each receives at least a portion of a composite signal in that the received portion of the composite signal can be the entire composite signal or a fraction of the composite signal.

As discussed in the context of FIG. 8C, the electronics 62 tune the frequency of the system output signal. One method to produce this frequency chirp is to modulate the electrical current applied to the light source by the electronics. In semiconductor lasers that can be used as the light source in the LIDAR system, current modulation results in frequency modulation via strong nonlinear carrier/photon coupling.

Figure 9A:
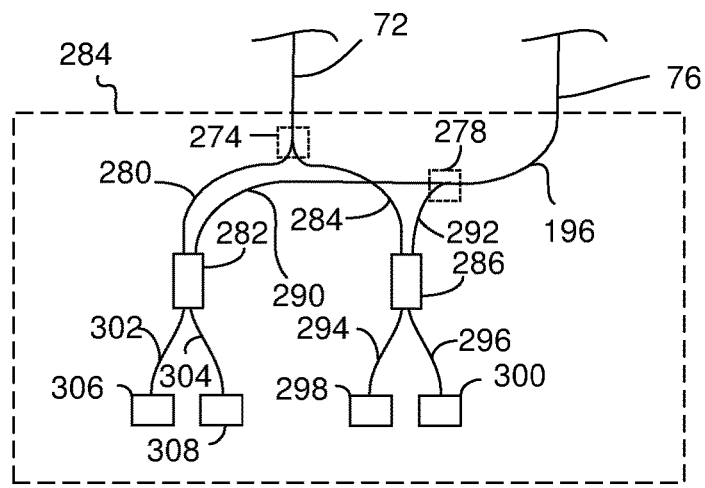
FIG. 9A and FIG. 9B illustrate an example of a suitable control component for use as all or a fraction of the control components disclosed in the context of FIG. 1A through FIG. 4.
Figure 9B:
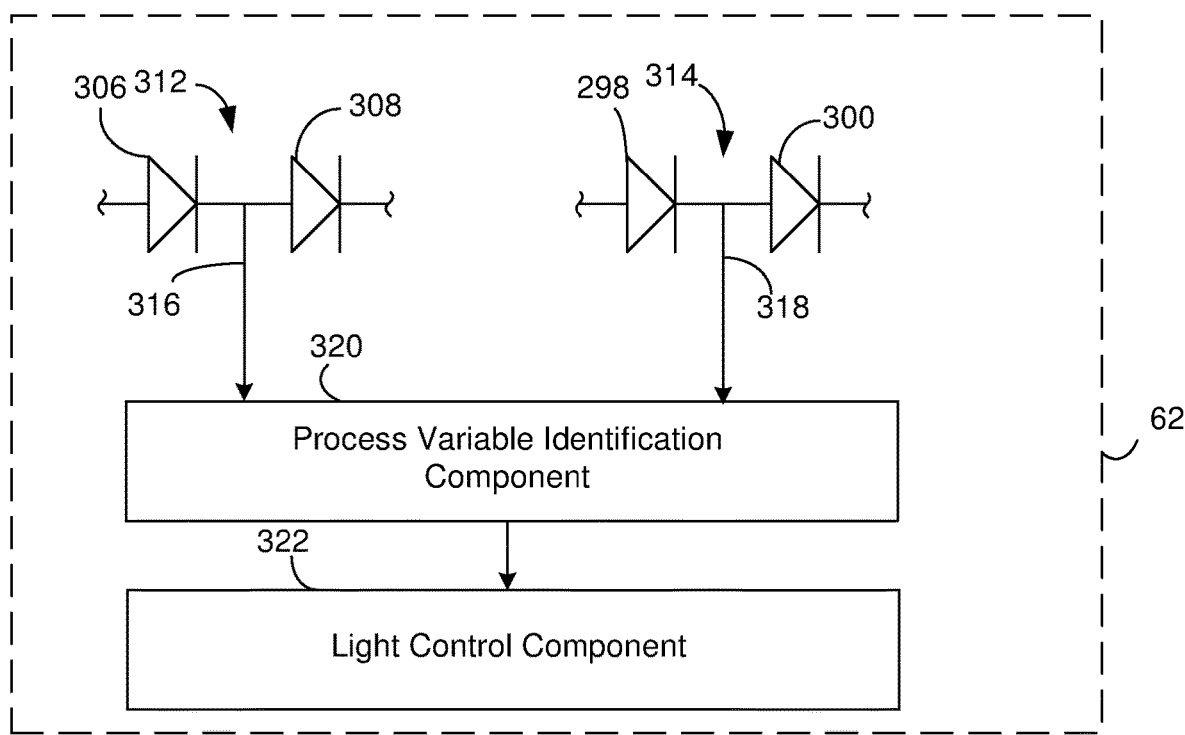

FIG. 9A and FIG. 9B illustrate an example of a suitable control component for use as all or a fraction of the control component 74 disclosed in the context of FIG. 1A through FIG. 4. As discussed above, each of the control component 74 receives a delay pathway signal from a delayed channel waveguide 72 and a delay pathway signal from a delayed channel waveguide 72 and an expedited pathway signal from an expedited sub-waveguide 76. The delay pathway signal and the expedited pathway signal received at a control component 74 carry the same channel labeled $\lambda_i$.

The delayed channel waveguide 72 carries the delayed pathway signal to a first splitter 274. The expedited sub-waveguide 76 carries the expedited pathway signal to a second splitter 278. Suitable splitters for uses as the first splitter 274 and the second splitter 278 include, but are not limited to, wavelength independent splitters such as directional couplers, optical couplers, y-junctions, tapered couplers, and Multi-Mode Interference (MMI) devices.

The first splitter 274 divides the delayed pathway signal into a first portion of a delayed signal and a second portion of a delayed signal. A first delayed waveguide 280 carries the first portion of the delayed signal to a first light-combining component 282. A second delayed waveguide 284 carries the second portion of the delayed signal to a second light-combining component 286.

The second splitter 278 divides the expedited signal into a first portion of an expedited signal and a second portion of an expedited signal. A first expedited waveguide 290 carries the first portion of the expedited signal to the first light-combining component 282. A second expedited waveguide 292 carries the second portion of the expedited signal to the second light-combining component 286.

The first light-combining component 282 combines the first portion of the expedited signal and the first portion of the delayed signal into a first beating signal. Additionally, the second light-combining component 286 combines the second portion of the expedited signal and the second portion of the delayed signal into a second beating signal. As a result, each of the delayed pathways extends from a splitter to a light-combiner that combines light from one of the delayed pathway signals with light from one of the expedited pathway signals.

As noted above, the length of the delay pathway exceeds the length of the expedited pathway. As a result, the second portion of the delayed signal is delayed relative to the second portion of the expedited signal. Because the electronics can tune the frequency of the outgoing LIDAR signal, the delay causes the second portion of the delayed signal to have a different frequency than the second portion of the expedited signal. Due to the difference in frequencies between the second portion of the expedited signal and the second portion of the delayed signal, the second beating signal is beating between the second portion of the expedited signal and the second portion of the delayed signal.

The second light-combining component 286 also splits the second beating signal onto a first auxiliary detector waveguide 294 and a second auxiliary detector waveguide 296. The first auxiliary detector waveguide 294 carries a first portion of the second beating signal to a first auxiliary light sensor 298 that converts the first portion of the second beating signal to a first auxiliary electrical signal. The second auxiliary detector waveguide 296 carries a second portion of the second beating signal to a second auxiliary light sensor 300 that converts the second portion of the second beating signal to a second auxiliary electrical signal. Examples of suitable light sensors include germanium photodiodes (PDs), and avalanche photodiodes (APDs).

In some instances, the second light-combining component 286 splits the second beating signal such that the portion of the expedited signal (i.e. the portion of the second portion of the expedited signal) included in the first portion of the second beating signal is phase shifted by 180° relative to the portion of the expedited signal (i.e. the portion of the second portion of the expedited signal) in the second portion of the second beating signal but the portion of the delayed signal (i.e. the portion of the second portion of the delayed signal) in the second portion of the second beating signal is not phase shifted relative to the portion of the delayed signal (i.e. the portion of the second portion of the delayed signal) in the first portion of the second beating signal.

As noted above, the length of the delay pathway exceeds the length of the expedited pathway. As a result, the first portion of the delayed signal is delayed relative to the first portion of the expedited signal. The delay causes the first portion of the delayed signal to have a different frequency than the first portion of the expedited signal. Due to the difference in frequencies between the first portion of the expedited signal and the first portion of the delayed signal, the first beating signal is beating between the second portion of the expedited signal and the second portion of the delayed signal.

The first light-combining component 282 also splits the first beating signal onto a first detector waveguide 302 and a second detector waveguide 304. The first detector waveguide 302 carries a first portion of the first beating signal to a first light sensor 306 that converts the first portion of the second beating signal to a first electrical signal. The second detector waveguide 304 carries a second portion of the second beating signal to a second light sensor 308 that converts the second portion of the second beating signal to a second electrical signal. Examples of suitable light sensors include germanium photodiodes (PDs), and avalanche photodiodes (APDs).

In some instances, the first light-combining component 282 splits the first beating signal such that the portion of the expedited signal (i.e. the portion of the first portion of the expedited signal) included in the first portion of the beating signal is phase shifted by 180° relative to the portion of the expedited signal (i.e. the portion of the first portion of the expedited signal) in the second portion of the beating signal but the portion of the delayed signal (i.e. the portion of the first portion of the delayed signal) in the first portion of the beating signal is not phase shifted relative to the portion of the delayed signal (i.e. the portion of the first portion of the delayed signal) in the second portion of the beating signal.

When the second light-combining component 286 splits the second beating signal such that the portion of the expedited signal in the first portion of the second beating signal is phase shifted by 180° relative to the portion of the expedited signal in the second portion of the second beating signal, the first light-combining component 282 also splits the beating signal such that the portion of the expedited signal in the first portion of the beating signal is phase shifted by 180° relative to the portion of the expedited signal in the second portion of the beating signal.

The first delayed waveguide 280, the second delayed waveguide 284, the first expedited waveguide 80, and the second expedited waveguide 292 can be configured such that the first beating signal and the second beating signal together act as an in-phase component and quadrature component of an optical process variable signal where the first beating signal is the in-phase component of the optical process variable signal and the second beating signal is the quadrature component of the optical process variable signal or such that the second beating signal is the in-phase component of the optical process variable signal and the first beating signal is the quadrature component of the optical process variable signal. For instance, the first delayed waveguide 280 and the second delayed waveguide 284 can be constructed to provide a phase shift between the first portion of the delayed signal and the second portion of the delayed signal while the first expedited waveguide 80 and the second expedited waveguide 292 are constructed such that the first portion of the expedited signal and the second portion of the expedited signal are in phase. As an example, the first delayed waveguide 280 and the second delayed waveguide 284 can be constructed so as to provide a 90° phase shift between the first portion of the delayed signal and the second portion of the delayed signal. Accordingly, one of the delayed signal portions can be a sinusoidal function and the other delayed signal portion can be a cosine function operating on the same argument as the sinusoidal function. In one example, the first delayed waveguide 280 and the second delayed waveguide 284 are constructed such that the first portion of the delayed signal is a cosine function and the second portion of the delayed signal is a sine function. In this example, the portion of the delayed signal in the second beating signal is phase shifted relative to the portion of the delayed signal in the first beating signal, however, the portion of the expedited signal in the first beating signal is not phase shifted relative to the portion of the expedited signal in the second beating signal.

In another example, the first delayed waveguide 280 and the second delayed waveguide 284 are constructed such that the first portion of the delayed signal and the second portion of the delayed signal are in phase while the first expedited waveguide 80 and the second expedited waveguide 292 are constructed to provide a phase shift between the first portion of the expedited signal and the second portion of the expedited signal. As an example, the first expedited waveguide 80 and the second expedited waveguide 292 can be constructed so as to provide a 90° phase shift between the first portion of the expedited signal and the second portion of the expedited signal. Accordingly, one of the expedited signal portions can be a sinusoidal function and the other expedited signal portion can be a cosine function operating on the same argument as the sinusoidal function. In one example, the first expedited waveguide 80 and the second expedited waveguide 292 are constructed such that the first portion of the expedited signal is a cosine function and the second portion of the expedited signal is a sine function operating on the same argument as the cosine function. In this example, the portion of the expedited signal in the second beating signal is phase shifted relative to the portion of the expedited signal in the first beating signal, however, the portion of the delayed signal in the first beating signal is not phase shifted relative to the portion of the delayed signal in the second beating signal.

The first light sensor 306 and the second light sensor 308 can be connected as a balanced detector and the first auxiliary light sensor 298 and the second auxiliary light sensor 300 can also be connected as a balanced detector. For instance, FIG. 9B provides a schematic of the relationship between the electronics 62, the first light sensor 306, the second light sensor 308, the first auxiliary light sensor 298, and the second auxiliary light sensor 300. The symbol for a photodiode is used to represent the first light sensor 306, the second light sensor 308, the first auxiliary light sensor 298, and the second auxiliary light sensor 300 but one or more of these sensors can have other constructions. In some instances, all of the components illustrated in the schematic of FIG. 9B are included on the LIDAR chip. In some instances, the components illustrated in the schematic of FIG. 9B are distributed between the LIDAR chip and electronics located off of the LIDAR chip.

The electronics 62 connect the first light sensor 306 and the second light sensor 308 as a first balanced detector 312 and the first auxiliary light sensor 298 and the second auxiliary light sensor 300 as a second balanced detector 314. In particular, the first light sensor 306 and the second light sensor 308 are connected in series. Additionally, the first auxiliary light sensor 298 and the second auxiliary light sensor 300 are connected in series. The serial connection in the first balanced detector is in communication with a first data line 316 that carries the output from the first balanced detector as a first process variable signal. The serial connection in the second balanced detector is in communication with a second data line 318 that carries the output from the second balanced detector as a second process variable signal.

The first process variable signal is an electrical representation of the first beating signal and the second process variable signal is an electrical representation of the second beating signal. Accordingly, the first process variable signal is beating and the second process variable signal is beating. Additionally, the first process variable signal and the second process variable signal can each carry a different one of the components selected from a group consisting of the in-phase component of a process variable signal and the quadrature component of the process variable signal. For instance, the first process variable signal can include a contribution from a first waveform and a second waveform and the second process variable signal can include a contribution from the first waveform and the second waveform. The portion of the first waveform in the first process variable signal is phase-shifted relative to the portion of the first waveform in the second process variable signal but the portion of the second waveform in the first process variable signal is in-phase relative to the portion of the second waveform in the second process variable signal. For instance, the second process variable signal can include a portion of the delayed signal that is phase shifted relative to a different portion of the delayed signal that is included the first process variable signal. Additionally, the second process variable signal can include a portion of the expedited signal that is in-phase with a different portion of the expedited signal that is included in the first process variable signal. The first process variable signal and the second process variable signal are each beating as a result of the beating between the expedited signal and the delayed signal, i.e. the beating in the first beating signal and in the second beating signal.

The electronics 62 include a process variable identification component 320 that receives the process variable signal. The process variable identification component 320 uses the process variable signal to output an indicator signal that indicates, is a function of, and/or can be used to determine the frequency of the channel signal ($f_{CS}$) that carries the channel received by the control component 74 that includes the process variable identification component 320. In some instances, the indicator signal is an analog signal with one or more characteristics that are related to the frequency of the channel signal ($f_{CS}$). In some instances, the indicator signal is a digital signal that quantifies the frequency of the channel signal ($f_{CS}$), is related to the frequency of the channel signal ($f_{CS}$), or can be used to quantify the frequency of the channel signal ($f_{CS}$). Because a system output signal carrying channel $\lambda_i$ is a portion of the channel LIDAR signal carrying channel $\lambda_i$, the frequency of the channel signal can represent the value of the frequency for the outgoing LIDAR signal and/or for the system output signal carrying channel $\lambda_i$.

The electronics can include a light control component 322 that receives the indicator signal. The light control component 322 can control the laser source 68 (FIG. 1B) that is the source of the channel received by the control component 74 in response to the indicator signal. For instance, the laser source 68 can be controlled in a control architecture where the frequency of the channel signal output by the laser source 68 serves as a control process variable. When the control process variable is the frequency of the channel signal, the desired frequency for the system output signal serves as the reference variable. Because the frequency for the system output signal is modulated, the desired frequency for the system output signal changes as a function of time. For triangular modulation, FIG. 8C can represent an example of the desired waveform. FIG. 8C illustrates the desired frequency of the channel signal, and accordingly the resulting system output signal, as a linear function of time. Accordingly, the control component 74, process variable identification component 320, and light control component 322 that receive channel $\lambda_i$ can be part of a control mechanism that controls the laser source 68 that is the source of channel $\lambda_i$ such that the frequency of the channel signal output from the laser source 68 substantially maintains the desired waveform. Suitable control mechanisms include, but are not limited to, control architectures that make use of feedback control and/or feed forward control. Accordingly, the control mechanism can be a feedback control loop and/or can include a control loop.

The light control component 322 can control the characteristics of the channel signal and/or system output signal, in response to the value of an error signal determined from the value of the control process variable at a particular point in time and the value of the reference variable at the same point in time. For instance, the light control component 322 can control the characteristics of the channel signal so as to reduce the value of the error signal. As an example, the light control component 322 can control the characteristics of the channel signal such that the value of the control process variable moves toward to the value of the reference variable. In some instances, the control mechanism is a control loop such as a feedback control loop. When the control mechanism is a feedback control loop, the error signal for the control mechanism can be equal to the difference between the value of the control process variable and the value of the reference variable at a particular point in time.

When the process variable is the frequency of the channel signal, the light control component 322 can transmit a light control signal that tunes the frequency of the channel signal. For instance, the light control component 322 can tune the frequency of the channel signal by transmitting a light control signal that changes the level of electrical current through the laser source that outputs the channel signal. Other light control signals are possible. For instance, when the laser source is an electrostatic MEMS tunable laser, the light control component 322 can tune the frequency of the channel signal by transmitting a light control signal that changes the level of voltage that moves the MEMS facet of the MEMS tunable laser.

In some instances, the light control component 322 and/or the process variable identification component 320 actually quantify the frequency of the channel signal ($f_{CS}$); however, this quantification is not necessary. For instance, when the indicator signal is an analog signal that includes a characteristic that is related to the frequency of the channel signal ($f_{CS}$), the light control signal can be derived directly from the indicator signal without actually quantifying the frequency of the channel signal ($f_{CS}$). For instance, the control signal may be a one-to-one function of the indicator signal and/or of a transformed signal discussed below. As an example, the control signal may be a one-to-one function of the instantaneous frequency.

Figure 9C:
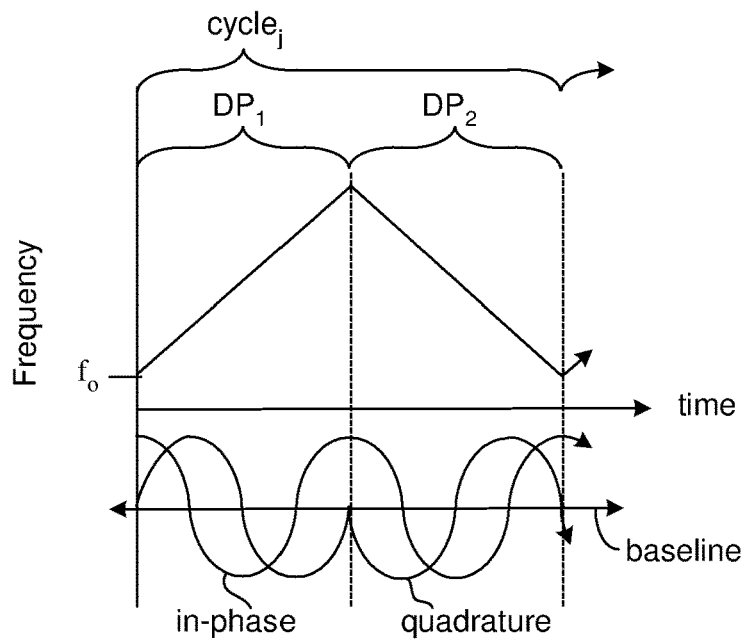
FIG. 9C is a graph showing an amplitude for an in-phase and quadrature components of a signal on the same time axis with the frequency of the system output signal.

FIG. 9C illustrates the amplitude for the in-phase and quadrature components of the optical process variable signal and/or the process variable signal on the same time axis with the frequency of the system output signal. For instance, FIG. 9C can compare the frequency of the system output signal during the first two data periods shown in FIG. 8C compared against the variation of the in-phase and quadrature components of the optical process variable signal and/or the process variable signal. Although FIG. 9C illustrates the optical process variable signal and/or the process variable signal having only one period per data period, the optical process variable signal and/or the process variable signal can have more than one period per data period.

Figure 9D:
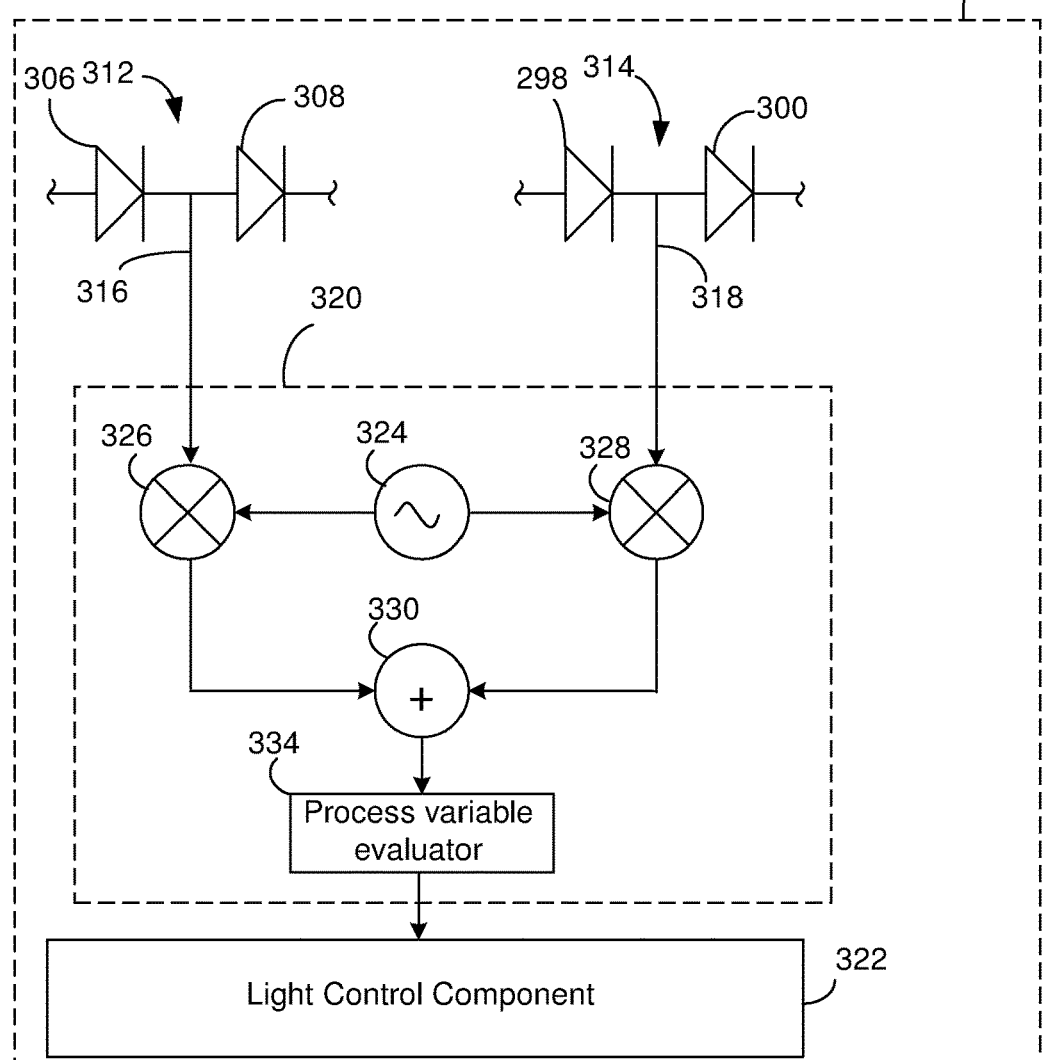
FIG. 9D illustrates one example of a process variable identification component suitable for use in the electronics of a LIDAR system.

A variety of process variable identification components 320 can be used to determine a value for the process variable indicator. FIG. 9D illustrates one example of a process variable identification component 320 that is suitable for use when the process variable is the frequency of a channel signal and/or a system output signal. The illustrated process variable identification component 320 includes a local oscillator 324 that outputs a local signal that includes first local signal and a second local signal. The first local signal and the second local signal each carries a different one of the components selected from the group consisting of an in-phase component of the local signal and a quadrature component of the local signal.

The process variable identification component 320 also includes a first multiplier 326 that receives the first process variable signal and the first local signal. The first multiplier 326 multiplies the first process variable signal and the first local signal. When the first process variable signal carries the in-phase component of the process variable signal, the first local signal carries the quadrature component of the local signal. When the first process variable signal carries the quadrature component of the process variable signal, the first local signal carries the in-phase component of the local signal. The first multiplier 326 outputs a first multiplied signal.

The process variable identification component 320 also includes a second multiplier 328 that receives the second process variable signal and the second local signal. The second multiplier 328 multiplies the second process variable signal and the second local signal. When the second process variable signal carries the in-phase component of the process variable signal, the second local signal carries the quadrature component of the local signal. When the second process variable signal carries the quadrature component of the process variable signal, the second local signal carries the in-phase component of the local signal. The second multiplier 326 outputs a second multiplied signal.

The process variable identification component 320 includes an adder 330 that receives the first multiplied signal and the second multiplied signal. The adder 330 adds the first multiplied signal and the second multiplied signal and outputs a control signal.

The control signal is received at a process variable evaluator 334. The process variable evaluator 334 uses the control signal to output an indicator signal with one or more characteristics that are related to the frequency of the channel signal ($f_{CS}$). For instance, the process variable evaluator 334 can be a Time-to-Digital Converter (TDC) that outputs an indicator signal with a voltage that is related to the frequency of the channel signal ($f_{CS}$). In some instances, the Time-to-Digital Converter (TDC) outputs an indicator signal with a voltage that is proportional to the frequency of the channel signal ($f_{CS}$). The indicator signal can be received by the light control component 322 for use in controlling the frequency of the laser source.

Another example of a suitable process variable evaluator 334 is a frequency counter that outputs an indicator signal that indicates a time between baseline crossings (dn) of the control signal. The frequency determined for the channel signal ($f_{CS}$) can be related to the time between baseline crossings (dn) by Equation 1: $f_{TS}=f_{LO}-1/(2*dn)$ where $f_{LO}$ represents the frequency of the local oscillator. The process variable evaluator 334 can output an indicator signal that carries data indicating a value of the frequency determined for the channel signal ($f_{CS}$). The indicator signal can be received by the light control component 322 for use in controlling the frequency of the laser source.

The local signal is selected such that the frequency of the control signal is higher than the frequency of the process variable signal. The increased frequency of the control signal increases the frequency that the process variable can be accurately sampled. Increasing this sampling frequency provides more accurate control of the process variable by the control mechanism. As a result, the increased frequency of the control signal enhances the control of the process variable by the control mechanism. Suitable sampling frequencies include, but are not limited to, sampling frequencies greater than 100 times the modulation frequency, where the modulation frequency is 1/(duration of a cycle). In some instances, all or a portion of the data periods in each cycle have a sampling frequency greater than 30 or 100 times per duration of the data period. In some instances, the local signal is selected such that the frequency of the control signal is more than 100, and less than 10,000 times higher than the frequency of the process variable signal.

Figure 9E:
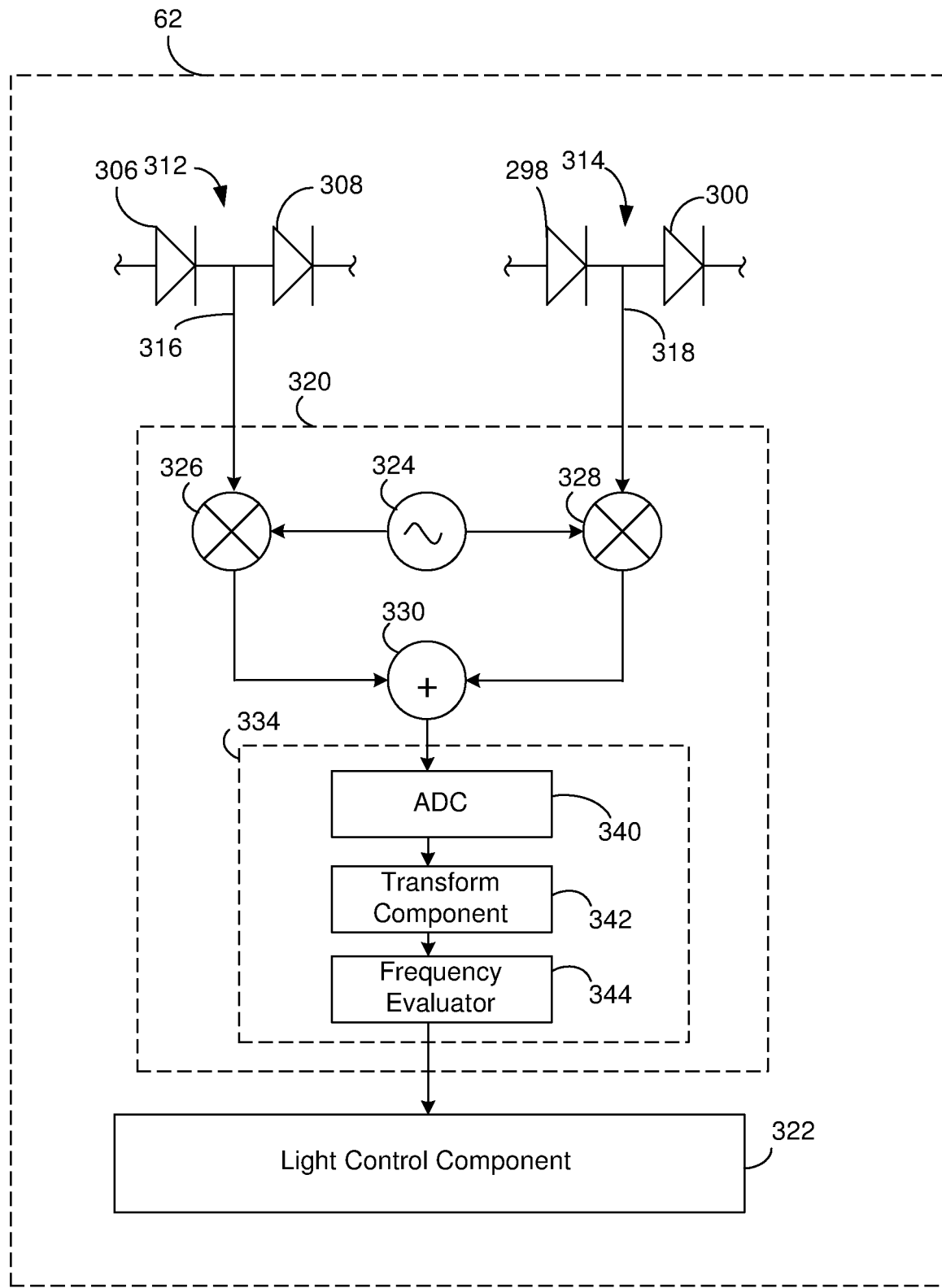
FIG. 9E illustrates another example of a process variable identification component suitable for use in the electronics of a LIDAR system.

FIG. 9E illustrates another example of a suitable process variable identification component 320 that is suitable for use when the process variable is the frequency of a channel signal and/or a system output signal. The process variable identification component 320 includes an Analog-to-Digital Converter (ADC) 340 that receives the control signal from the adder 330. The Analog-to-Digital Converter (ADC) 340 converts the first process variable signal from an analog form to a digital form and outputs a digital data signal. The digital data signal is a digital representation of the control signal.

The process variable identification component 320 includes a transform component 342 that receives the digital data signal. The transform component 342 performs a mathematical transform on the digital data signal. The mathematical transform is selected such that the transform component 342 outputs a transformed signal that is related to, includes or indicates the frequency of the LIDAR output signal. A suitable first mathematical transform includes, but is not limited to, a Hilbert transform. A Hilbert transform outputs a transformed signal that indicates the instantaneous phase and, consequently, frequency of the control signal.

The transformed signal is received by a frequency evaluator 344. The frequency evaluator can be configured to output an indicator signal that is related to, includes and/or indicates the frequency of the LIDAR output signal. For instance, the frequency evaluator can convert the instantaneous frequency to the frequency of the channel signal ($f_{CS}$) by $f_{CS}=(finst-f_{LO})*(T/\tau')$, where $f_{LO}$ is the frequency of the local oscillator, finst is the instantaneous frequency extracted from the Hilbert Transform, T is the duration of a data period in a triangular modulation scheme, and $\tau'$ is the delay resulting from the length differential between the delay waveguide 62 and the expedited waveguide 66. Accordingly, the indicator signal can be a digital signal that quantifies the frequency of the frequency of a channel signal ($f_{CS}$). The indicator signal can be received by the light control component 322 for use in controlling the frequency of the laser source.

Although the indicator signal is described in the context of a signal that carries data regarding the frequency of a channel signal, the indicator signal can carry data that is indirectly related to the frequency of the channel signal. For instance, the indicator signal can carry data that can be used to determine the frequency of a channel signal. As an example, the frequency of a channel signal ($f_{TS}$) can be determined from the rate of phase change of the channel signal. Accordingly, the indicator signal can carry data that indicates the rate of phase change of the channel signal.

The process variable identification component 320 reduces the amount of delay that needs to be created by the delay waveguide 62 because it increases the sensitivity of the indicator signal to the frequency of the channel signal by combining the information from in-phase and quadrature components at any given time. Prior systems attempted to increase this sensitivity by increasing the length of the delay pathway. Because the process variable identification component 320 increases the sensitivity of the indicator signal, the length of the delay pathway can exceed the length of the expedited pathway by a lower amount than could be achieved in prior systems. For instance, the time delay in the pathway to a control component 74 can exceed the time delay in the expedited pathway to the control component 74 by an amount that is greater than or equal to 50 ps and less than or equal to 100 ns. In one example, the length of the delay pathway exceeds the length of the expedited pathway by an amount that is less than 1000 cm, less than 500 cm, or less than 100 cm and is greater than 0.0 cm or 0.4 cm. In one example, the delay pathway and the expedited pathway to the same control component 74 guide light through silicon and the length of the delay pathway exceed the length of the expedited pathway by an amount that is less than 1000 cm and greater than 0.0 cm or 0.4 cm.

FIG. 9A through FIG. 9E illustrate an example of a suitable control component for use as all or a fraction of the control component 74 disclosed in the context of FIG. 1A through FIG. 4. As discussed above, each of the control component 74 receives a delay pathway signal and an expedited pathway signal carrying the same channel. In some instances, a laser source 68 is constructed such that different channel signals each carry a different one of the channels and the different channel signals are each output from a different laser source 68. For instance, FIG. 1B illustrates a possible light source 10 construction where different channel signals are each output from a different laser source 68. In these instances, each of the different control components 74 can be used to control the source of the channel signal that carries the channel received by the control component. For instance, each of the different control components 74 can be included in a feedback control loop that operates the laser sources so as to control the frequency of the channel signal that carries the channel received by the control component and accordingly to control the system output signal carrying the same channel. The electronics can independently operate the feedback control loops and can accordingly independently operate the laser sources within those feedback control loops.

The above LIDAR systems illustrate a single system output signal carrying each of the channels. As a result, each control mechanism can control the frequency versus time pattern of a different one of the single system output signals. However, the LIDAR system can be constructed such that multiple different system output signals carry the same channel. For instance, the LIDAR output signal can be divided into multiple different signals that are each used as the source of a system output signal. In this instance, one or more of the control mechanisms can each control the frequency versus time pattern of multiple different system output signals that each carry the same channel.

The control components disclosed in the context of FIG. 9A through FIG. 9E operate on an in-phase component of a process variable signal and the quadrature component of the process variable signal. However, the control components can be configured to operate on the in-phase component of the process variable signal and can exclude the quadrature component of the process variable signal. As a result, the control components can exclude the second light-combining component 286. Accordingly, the control components can include one light-comber and the delay pathway and expedited pathway to a control component can extend to only one light-combiner in the control component.

Although the LIDAR system is disclosed as having multiple control mechanisms that each includes one of the control components 74, the LIDAR system can include as few as one control mechanism. For instance, the laser sources 68 can be configured such that tuning the frequency of one laser source 68 at a rate $\alpha_t$ tunes the other laser source 68 at the same rate. In this instance, controlling one of the laser source 68 as disclosed above provides the desired tuning for each of the laser sources and accordingly provides each of the system output signals with the desired frequency versus time pattern.

Figure 10:
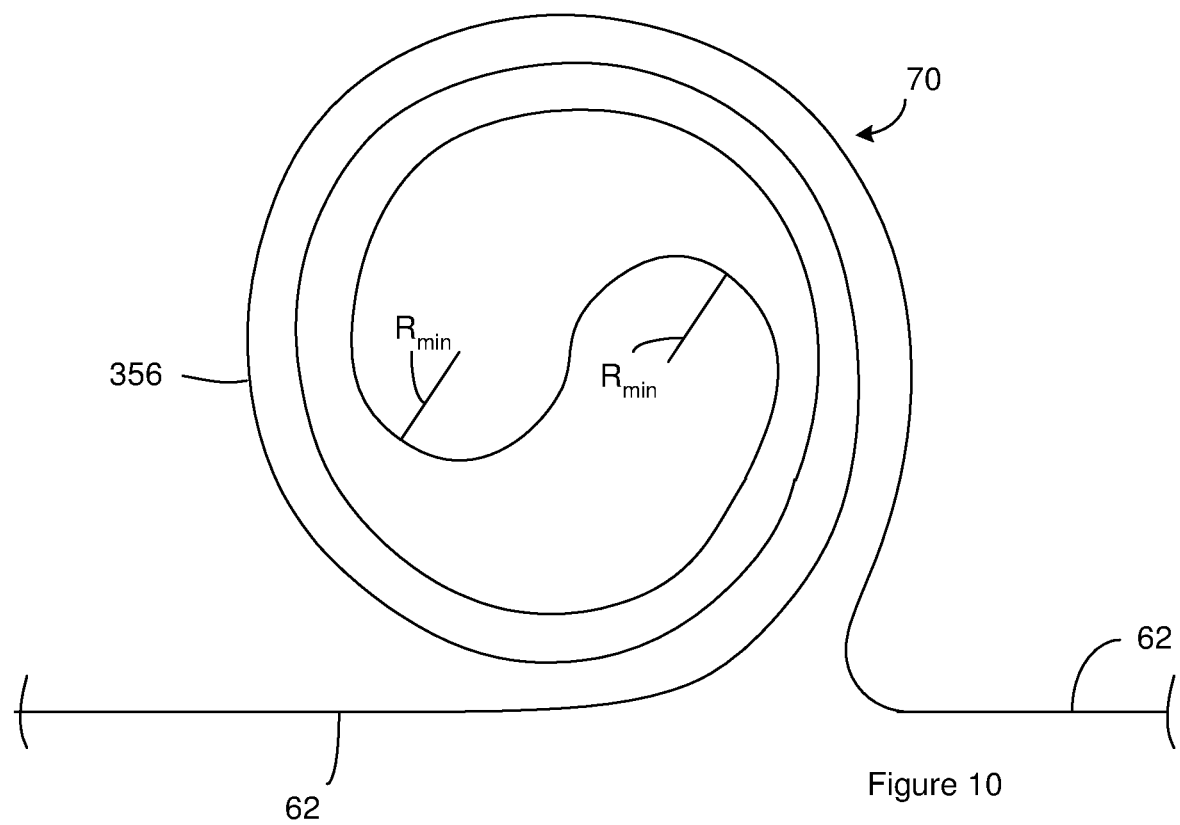
FIG. 10 is a topview of a portion of a waveguide that includes a spiral waveguide.

As noted above, delay waveguides such as a delay waveguide 62 and/or a first delay waveguide 80 can include a delay section 70 that can be used to increase the length of the delay waveguide beyond the length of the expedited waveguide 66. The delay section 70 can represent a spiral arrangement of the delay waveguide 62. The spiral arrangement is selected to reduce the amount of space occupied by longer waveguides such as a delay waveguide 62 and/or a first delay waveguide 80. FIG. 10 illustrates a portion of a delay waveguide 62 or a first delay waveguide 80 having a spiral arrangement that serves as the delay section 70. Near the center of the spiral arrangement, the waveguide turns back upon itself. The spiral configuration is selected such that the portion of the waveguide with the smallest radius of curvature of the waveguide in the spiral arrangement (labeled $R_{min}$ in FIG. 10) has a radius of curvature above a curvature threshold. Suitable curvature thresholds include, but are not limited to, curvature thresholds above or equal to 0.1 mm, 0.25 mm, and 0.5 mm. Although the spiral arrangement is shown in a geometry that approximates a circle, the spiral arrangement can be in other geometries such as shapes that approximate an oval, rectangle or triangle. As a result, the spiral arrangement can include straight waveguide segments and/or substantially straight waveguide segments.

Figure 11A:
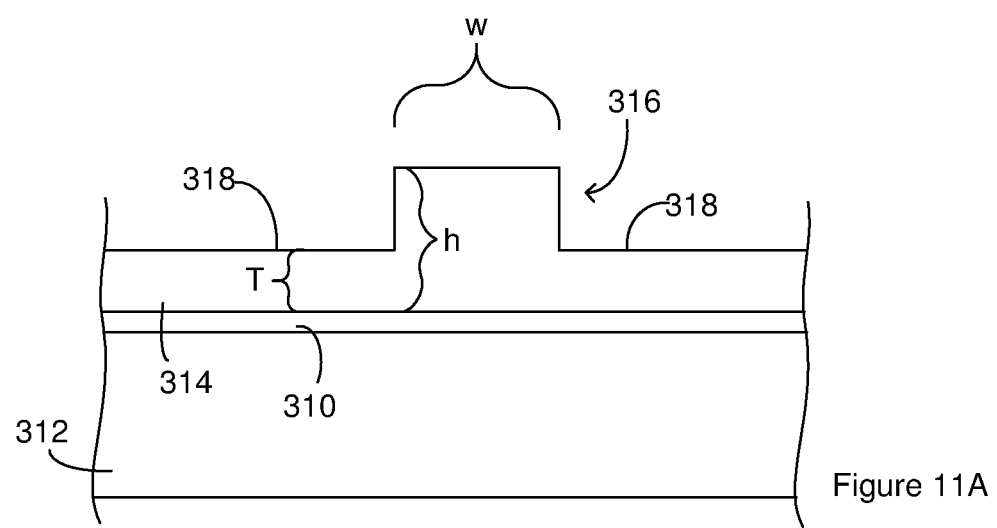
FIG. 11A is a cross-section of portion of a LIDAR chip that includes a waveguide on a silicon-on-insulator platform.

Suitable platforms for the LIDAR chip and the scanning chips include, but are not limited to, silica, indium phosphide, and silicon-on-insulator wafers. FIG. 11A is a cross-section of portion of a chip constructed from a silicon-on-insulator wafer. A silicon-on-insulator (SOI) wafer includes a buried layer 310 between a substrate 312 and a light-transmitting medium 314. In a silicon-on-insulator wafer, the buried layer 310 is silica while the substrate 312 and the light-transmitting medium 314 are silicon. The substrate 312 of an optical platform such as an SOI wafer can serve as the base for the entire LIDAR chip. For instance, the optical components shown on the LIDAR chips of FIG. 1A through FIG. 4 can be positioned on or over the top and/or lateral sides of the substrate 312.

FIG. 11A is a cross section of a portion of a LIDAR chip that includes a waveguide construction that is suitable for use in LIDAR chips constructed from silicon-on-insulator wafers. A ridge 316 of the light-transmitting medium extends away from slab regions 318 of the light-transmitting medium. The light signals are constrained between the top of the ridge 316 and the buried layer 310.

The dimensions of the ridge waveguide are labeled in FIG. 11A. For instance, the ridge has a width labeled w and a height labeled h. A thickness of the slab regions is labeled T. For LIDAR applications, these dimensions can be more important than other dimensions because of the need to use higher levels of optical power than are used in other applications. The ridge width (labeled w) is greater than 1 μm and less than 4 μm, the ridge height (labeled h) is greater than 1 μm and less than 4 μm, the slab region thickness is greater than 0.5 μm and less than 3 μm. These dimensions can apply to straight or substantially straight portions of the waveguide, curved portions of the waveguide and tapered portions of the waveguide(s). Accordingly, these portions of the waveguide will be single mode. However, in some instances, these dimensions apply to straight or substantially straight portions of a waveguide. Additionally or alternately, curved portions of a waveguide can have a reduced slab thickness in order to reduce optical loss in the curved portions of the waveguide. For instance, a curved portion of a waveguide can have a ridge that extends away from a slab region with a thickness greater than or equal to 0.0 μm and less than 0.5 μm. While the above dimensions will generally provide the straight or substantially straight portions of a waveguide with a single-mode construction, they can result in the tapered section(s) and/or curved section(s) that are multi-mode. Coupling between the multi-mode geometry to the single mode geometry can be done using tapers that do not substantially excite the higher order modes. Accordingly, the waveguides can be constructed such that the signals carried in the waveguides are carried in a single mode even when carried in waveguide sections having multi-mode dimensions. The waveguide construction disclosed in the context of FIG. 11A is suitable for all or a portion of the waveguides on LIDAR chips constructed according to FIG. 1A through FIG. 4.

Figure 11B:
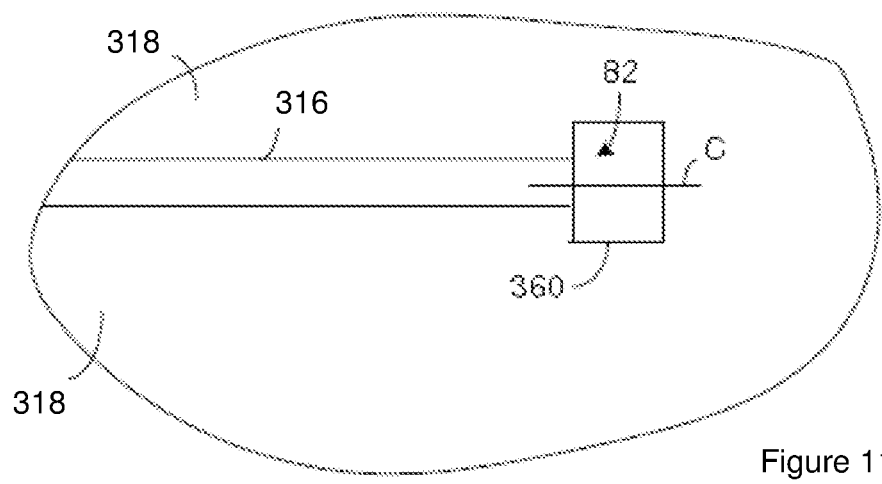
FIG. 11B through FIG. 11D illustrate an example of a return device constructed on a silicon-on-insulator platform and suitable for use on a LIDAR chip constructed according to FIG. 2 and FIG. 4.
Figure 11C:
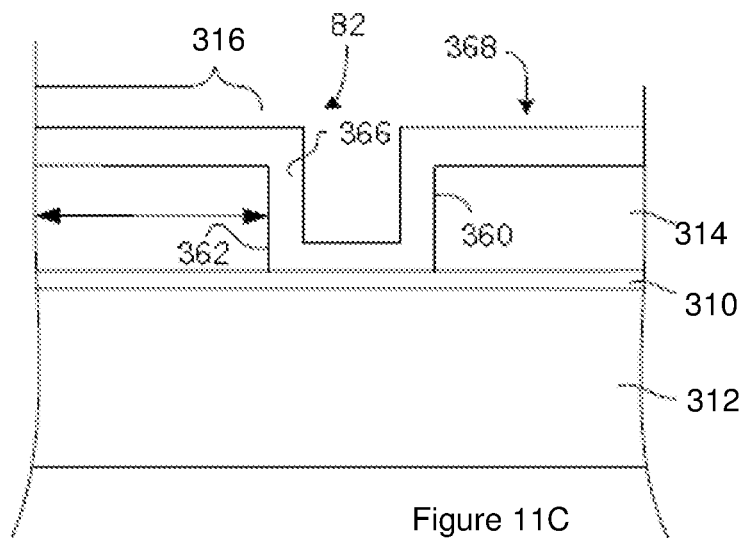
Figure 11D:
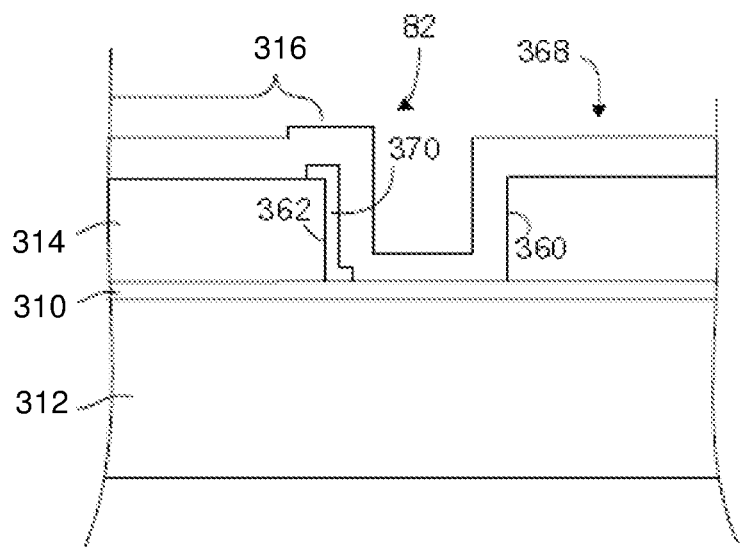

FIG. 11B through FIG. 11D illustrate an example of a return device 82 constructed on a silicon-on-insulator platform and suitable for use on a LIDAR chip constructed according to FIG. 2 and FIG. 4. FIG. 11B is a topview of a portion of a LIDAR chip that has the return device 82. FIG. 11C is a cross section of the return device 82 taken along the line labeled C in FIG. 11B. FIG. 11D is a cross section of the return device 82 taken along the line labeled C in FIG. 11B.

The illustrated return device 82 includes a recess 360 that extends partially or fully through the light-transmitting medium 314. Although the illustrated recess 360 does not extend into the buried layer 310, the illustrated recess 360 can extend into or through buried layer 310. A surface of the recess 360 serves as a return surface 362. The return surface 362 is configured such that at least a portion of the light signal that is incident on the return surface 362 from the light-transmitting medium 314 returns to the light-transmitting medium 314. The mechanism by which the return occurs can be reflection at or by the return surface 362. For instance, a recess medium 366 can be positioned in the recess 360 and in contact with the return surface 362. The recess medium 366 can fill the recess 360 or be a layer of material that contacts the return surface 362. The recess medium 366 can be a fluid or a solid. As shown in FIG. 11C, the recess medium 366 can be a solid that also serves as a cladding 368. In some instances, the recess medium 366 has a lower index of refraction than the light-transmitting medium 314 to cause reflection at the return surface 362. Suitable recess media with an index of refraction lower than the light-transmitting medium 314 include, but are not limited to, air, epoxies, silicon dioxide, and silicon nitride. Suitable recess media with an index of refraction lower than the light-transmitting medium 314 that can also serve as cladding include, but are not limited to, silicon dioxide, and silicon nitride.

In some instances, the recess medium 366 is a medium that causes the outgoing LIDAR signal or input signal to be reflected at the return surface 362. For instance, the recess medium 366 can be a reflective material 370 that contacts the return surface 362. FIG. 11D illustrates a layer of reflective material 370 in contact with the return surface 362. Although FIG. 11D illustrates a cladding positioned such that the cladding is located over the recess medium 366 and extends into the recess 360, the cladding is optional. Suitable reflective materials 370 include, but are not limited to, multi-layer dielectric films including silicon dioxide, hafnium oxide and aluminum oxide, and metals such as aluminum, nickel, and gold. Suitable claddings include, but are not limited to, silicon dioxide, silicon nitride, and aluminum oxide.

As noted above, the splitter 120 can be a wavelength dependent splitter. Suitable wavelength dependent splitters include, but are not limited to, array waveguide gratings, and echelle gratings. FIG. 12A through FIG. 12D illustrate an example of an echelle grating constructed on a silicon-on-insulator platform and suitable for use as the splitter 120 and/or a wavelength dependent splitter in the LIDAR systems. For the purposes of illustration, the echelle grating is illustrated in the context of the splitter 120 on the scanning chip; however, the illustrated echelle grating construction can be employed for a splitter on the LIDAR chip or on the scanning chip.

The scanning chip includes one or more first splitter waveguides 400, second splitter waveguides 402, and a redirection component 404 positioned around a free space region 406. When the echelle grating serves as the splitter 120, the first splitter waveguides can each be one of the alternate waveguides 119 and the second splitter waveguides 402 can each be one of the channel output waveguides 121.

The first splitter waveguides 400 can each guide the switch signal to the free space region 406. The switch signal travels through the free space region 406 to the redirection component 404 and directs light from the switch signal toward the second splitter waveguides 402. As a result, the light from the switch signal travels from the redirection component 404, through the free space region 406 toward the second splitter waveguides 402.

Figure 12A:
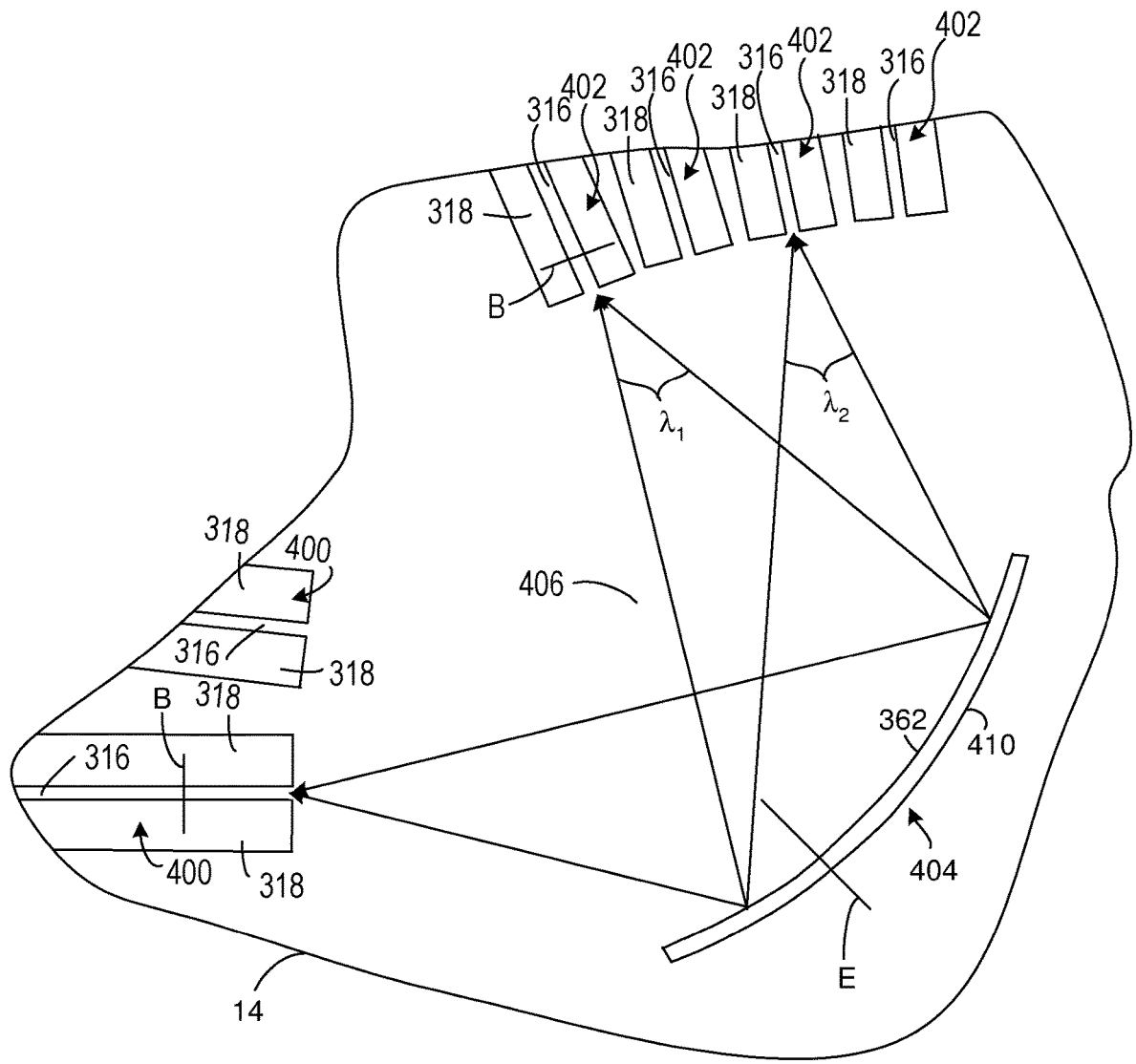
FIG. 12A is topview of a portion of a LIDAR chip that includes an echelle grating.

The redirection component 404 is constructed such that different wavelengths carried in the second signal separate into the channel output signals as they travel away from the free space region 406. For instance, FIG. 12A shows the channel output signals carrying the channels labeled $\lambda_1$, and $\lambda_2$ separating as they travel away from the redirection component 404. The second splitter waveguides 402 terminate at location where a portion of the second splitter waveguide 402 each receives one of the channel output signals. The portion of the second splitter waveguide 402 that each receives one of the channel output signals changes as the first splitter waveguide 400 that carries the switch signal changes.

The echelle grating of FIG. 12A can be operated in the reverse direction as a multiplexer. For instance, the channel output signal labeled $\lambda_A$ can represent the channel return signal carrying channel $\lambda_A$ and the channel output signal labeled $\lambda_B$ can represent the channel return signal carrying channel $\lambda_B$. The channel return signals can travel from the second splitter waveguides 402, through the space region 406 to the redirection component 404. The redirection component 404 can direct light from the channel return signals toward the first splitter waveguides 400. The redirection component 404 is configured such that light from the channel return signals combines to form the assembly return signal. The assembly return signal is received by the first splitter waveguide 400 that output the switch signal.

The echelle grating of FIG. 12A is shown built on a silicon-on-insulator platform; however, other platforms can be used. The first splitter waveguides 400 and/or the second splitter waveguides 402 can be constructed as disclosed in the context of FIG. 11A. For instance, FIG. 11A can represent a cross-section of FIG. 12A taken at any of the lines labeled B in FIG. 12A.

Figure 12B:
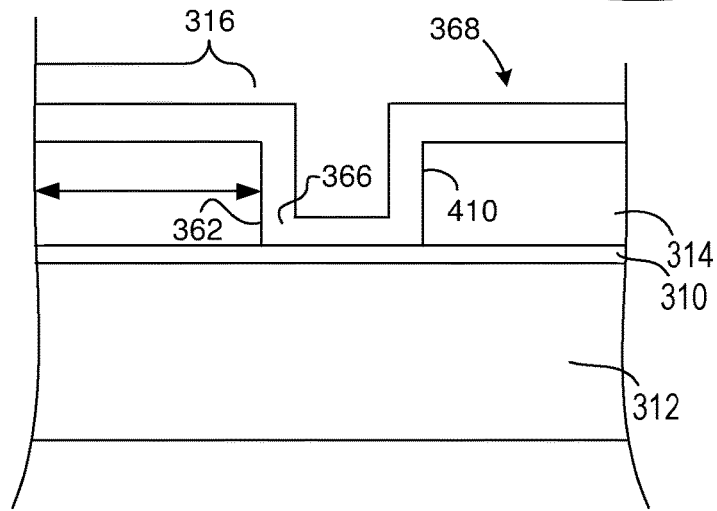
FIG. 12B is a cross section of the echelle grating taken through a redirection component included on the LIDAR chip of FIG. 12A. The cross section is taken along the line labeled E in FIG. 12A.

FIG. 12B is a cross section of the echelle grating taken through the redirection component 404 as illustrated by the line labeled E in FIG. 12A. The illustrated redirection component 404 includes a recess 410 that extends partially or fully through the light-transmitting medium 314. Although the illustrated recess 410 does not extend into the buried layer 310, the illustrated recess 410 can extend into or through buried layer 310. A surface of the recess 410 serves as a return surface 362. The return surface 362 is configured such that at least a portion of the switch signal or the channel return signals that are incident on the return surface 362 from the light-transmitting medium 314 returns to the light-transmitting medium 314. The mechanism by which the return occurs can be reflection at or by the return surface 362. For instance, a recess medium 366 can be positioned in the recess 410 and in contact with the return surface 362. The recess medium 366 can fill the recess 410 or be a layer of material that contacts the return surface 362. The recess medium 366 can be a fluid or a solid. As shown in FIG. 12B, the recess medium 366 can be a solid that also serves as a cladding 416 for all or a portion of the LIDAR chip. In some instances, the recess medium 366 has a lower index of refraction than the light-transmitting medium 314 to cause reflection at the return surface 362. Suitable recess media with an index of refraction lower than the light-transmitting medium 314 include, but are not limited to, air, epoxies, silicon dioxide, and silicon nitride. Suitable recess media with an index of refraction lower than the light-transmitting medium 314 that can also serve as cladding include, but are not limited to, silicon dioxide, and silicon nitride.

Figure 12C:
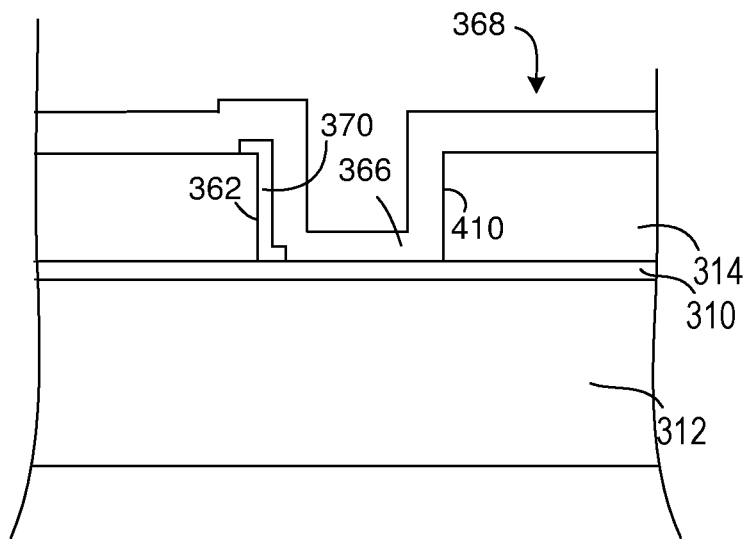
FIG. 12C is a cross section of another embodiment of the echelle grating.

In some instances, the recess medium 366 is a medium that causes the outgoing LIDAR signal or input signal to be reflected at the return surface 362. For instance, the recess medium 366 can be a reflective material 370 that contacts the return surface 362. FIG. 12C illustrates a layer of reflective material 370 in contact with the return surface 362. Suitable reflective materials 370 include, but are not limited to, multi-layer dielectric films including silicon dioxide, hafnium oxide and aluminum oxide, and metals such as aluminum, nickel, and gold. Suitable claddings include, but are not limited to, silicon dioxide, silicon nitride, and aluminum oxide.

Figure 12D:
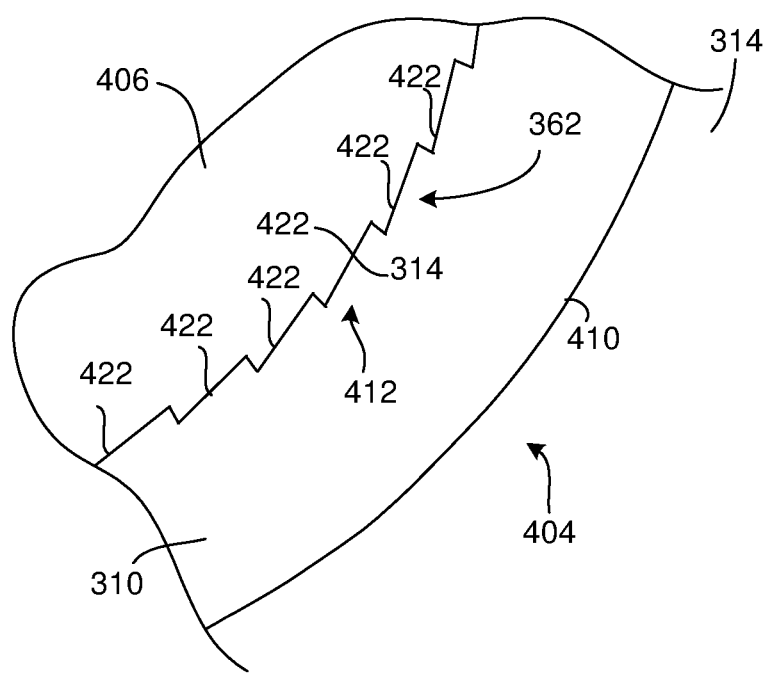
FIG. 12D is a close-up topview of a portion of the return surface.

FIG. 12D is a close-up topview of a portion of the return surface 362 without the recess medium 366 or the reflective material 370 positioned in the recess 410. The return surface 362 is configured to act an optical grating. For instance, the return surface 362 includes multiple grooves 422 arranged such that the redirection component 404 serves as an echelle grating. Suitable groove 422 structures include, but are not limited to, steps. The bandwidth of an optical filter that includes or consists of the echelle grating can be tuned by changing the focal length and/or by changing the grating dimensions.

The free space region 406 can constrain the light signal in one direction. For instance, the free space region 406 of FIG. 12A through FIG. 12D can vertically constrain light signals. In these instances, the light signal can spread in the lateral directions and/or become more focused in the lateral directions. As a result, all or a portion of the free space region 406 can be slab waveguides.

Figure 13:
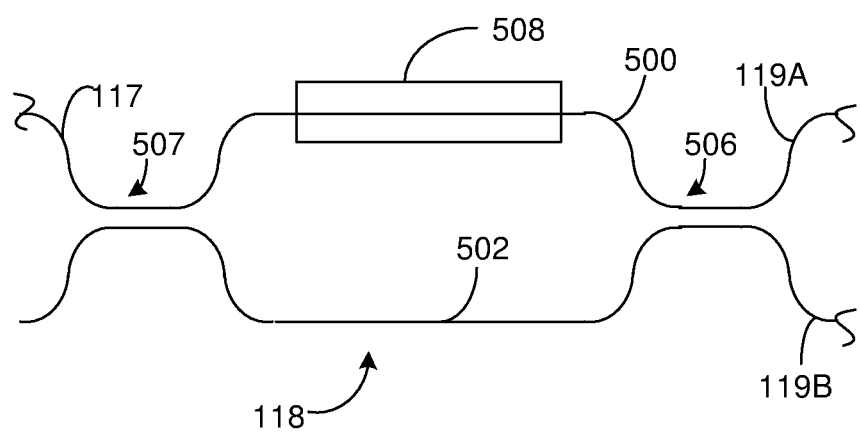
FIG. 13 is a topview of an example of an optical switch.

A variety of optical switches that are suitable for use with the LIDAR system can be constructed on planar device optical platforms such as silicon-on-insulator platforms. Examples of suitable optical switches for integration into a silicon-on-insulator platform include, but are not limited to, Mach-Zehnder interferometers. FIG. 13 is a schematic of a Mach-Zehnder interferometer. The switch includes a first switch waveguide 500 that connects the common waveguide 117 and a first one of the alternate waveguides 119A. A second one of the alternate waveguides 119B is connected to a second switch waveguide 502. The first switch waveguide 500 and the second switch waveguide 502 are included in a first optical coupler 504 and in a second optical coupler 506. A phase shifter 508 is positioned along the first switch waveguide 500 or the second switch waveguide 502 between the first optical coupler 504 and the second optical coupler 506. Suitable phase shifters include, but are not limited to, PIN diodes, PN junctions operated in carrier depletion mode, and thermal heaters.

The electronics can operate the phase shifter so as to change the switch between a pass mode and a switched mode. In the pass mode, the switch signal carried on the common waveguide 117 passes through to the first alternate waveguides 119A. In the switched mode, the switch signal carried on the common waveguide 117 is directed to the second alternate waveguides 119B.

Although the optical switch illustrated in FIG. 13 is suitable for a LIDAR system that directs the switch signal to one of two alternate waveguides 119A, the LIDAR system can direct the switch signal more than two alternate waveguides 119A. In these instances, switches such as the optical switch of FIG. 13 can be cascaded to such that the electronics can direct the switch signal more than two alternate waveguides 119A.

Light sensors that are interfaced with waveguides on a LIDAR chip can be a component that is separate from the chip and then attached to the chip. For instance, the light sensor can be a photodiode, or an avalanche photodiode. Examples of suitable light sensor components include, but are not limited to, InGaAs PIN photodiodes manufactured by Hamamatsu located in Hamamatsu City, Japan, or an InGaAs APD (Avalanche Photo Diode) manufactured by Hamamatsu located in Hamamatsu City, Japan. These light sensors can be centrally located on the LIDAR chip. Alternately, all or a portion the waveguides that terminate at a light sensor can terminate at a facet located at an edge of the chip and the light sensor can be attached to the edge of the chip over the facet such that the light sensor receives light that passes through the facet. The use of light sensors that are a separate component from the chip is suitable for all or a portion of the light sensors selected from the group consisting of the first auxiliary light sensor 218, the second auxiliary light sensor 220, the first light sensor 223, and the second light sensor 224.

As an alternative to a light sensor that is a separate component, all or a portion of the light sensors can be integrated with the chip. For instance, examples of light sensors that are interfaced with ridge waveguides on a chip constructed from a silicon-on-insulator wafer can be found in Optics Express Vol. 15, No. 21, 13965-13971 (2007); U.S. Pat. No. 8,093,080, issued on Jan. 10, 2012; U.S. Pat. No. 8,242,432, issued Aug. 14, 2012; and U.S. Pat. No. 6,108,8472, issued on Aug. 22, 2000 each of which is incorporated herein in its entirety. The use of light sensors that are integrated with the chip are suitable for all or a portion of the light sensors selected from the group consisting of the auxiliary light sensor 218, the second auxiliary light sensor 220, the first light sensor 223, and the second light sensor 224.

A suitable laser source 68 can be a laser chip that is separate from the LIDAR chip and then attached to the LIDAR chip. For instance, a laser source 68 can be a laser chip that is attached to the chip using a flip-chip arrangement. Use of flip-chip arrangements is suitable when a laser source 68 is to be interfaced with a ridge waveguide on a chip constructed from silicon-on-insulator wafer. Alternately, the utility waveguide 12 can include an optical grating (not shown) such as Bragg grating that acts as a reflector for an external cavity laser. In these instances, the laser source 68 can include a gain element that is separate from the LIDAR chip and then attached to the LIDAR chip in a flip-chip arrangement. Examples of suitable interfaces between flip-chip gain elements and ridge waveguides on chips constructed from silicon-on-insulator wafer can be found in U.S. Pat. No. 9,705,278, issued on Jul. 11, 2017 and in U.S. Pat. No. 5,991,484 issued on Nov. 23, 1999; each of which is incorporated herein in its entirety. When the laser source 68 is a gain element or laser chip, the electronics 62 can change the frequency of the channel signal by changing the level of electrical current applied to through the gain element or laser cavity.

Suitable electronics 62 can include, but are not limited to, an electronic controller that includes or consists of analog electrical circuits, digital electrical circuits, processors, microprocessors, digital signal processors (DSPs), Field Programmable Gate Arrays (FPGAs), computers, microcomputers, or combinations suitable for performing the operation, monitoring and control functions described above. In some instances, the electronic controller has access to a memory that includes instructions to be executed by the electronic controller during performance of the operation, control and monitoring functions. Although the electronics are illustrated as a single component in a single location, the electronics can include multiple different components that are independent of one another and/or placed in different locations. Additionally, as noted above, all or a portion of the disclosed electronics can be included on the chip including electronics that are integrated with the chip.

The above LIDAR systems include multiple optical components such as a LIDAR chip, LIDAR adapters, light source, light sensors, waveguides, and amplifiers. In some instances, the LIDAR systems include one or more passive optical components in addition to the illustrated optical components or as an alternative to the illustrated optical components. The passive optical components can be solid-state components that exclude moving parts. Suitable passive optical components include, but are not limited to, lenses, mirrors, optical gratings, reflecting surfaces, splitters, demultiplexers, multiplexers, polarizers, polarization splitters, and polarization rotators. In some instances, the LIDAR systems include one or more active optical components in addition to the illustrated optical components or as an alternative to the illustrated optical components. Suitable active optical components include, but are not limited to, optical switches, phase tuners, attenuators, steerable mirrors, steerable lenses, tunable demultiplexers, tunable multiplexers.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. A LIDAR system, comprising:
a scanning chip configured to steer a direction that system output signals travel away from the LIDAR system such that each of the system output signals concurrently travels away from the LIDAR system to a different sample region in a field of view of the LIDAR system, each of the system output signals carrying a different channel, each of the channels being at a different wavelength,
the scanning chip including a switch and alternate waveguides, the switch being configured to direct a switch signal to any one of the alternate waveguides, the switch signal carrying each of the channels;
the scanning chip including a splitter configured to receive the switch signal from the switch and divide the switch signal into multiple channel output signals such that each of the channel output signals carries a different one of the channels,
the scanning chip including one more redirection components configured to receive the channel output signals and to direct the channel output signals such that a direction that each of the channel output signals travels away from the one more redirection components changes in response to a change in the alternate waveguide which receives the switch signal,
each of the system output signals including light from a different one of the channel output signals;
a LIDAR chip that is separate from the scanning chip and configured to generate composite signals that are each beating at a beat frequency, generating each of the composite signals including combining a comparative signal and a reference signal that carry the same channel,
each of the comparative signals including light from a different one of multiple system return signals, each of the system return signals carrying a different one of the channels,
each of the system return signals including light from one of the system output signals after reflection of the system output signals by an object in the field of view,
each of the reference signals including light that was not reflected by the object in the field of view;
an adapter configured to separate a LIDAR output signal from an assembly return signal,
the adapter including a circulator configured to receive the LIDAR output signal from the LIDAR chip and configured to output the LIDAR output signal such that the LIDAR output signal output from the LIDAR adapter serves as an assembly output signal,
a portion of the assembly output signal being received at the optical switch and serving as the switch signal,
the circulator configured to receive the assembly return signal,
the LIDAR output signal including light that was not reflected by the object in the field of view;
the assembly return signal including light from the LIDAR output signal and from each of the system return signals, and
each of the system output signals including light from the LIDAR output signal; and
electronics configured to use the beat frequencies to generate LIDAR data that indicates one or more items selected from a group consisting of a radial velocity between the LIDAR system and the object and a distance between the LIDAR system and the object.

2. The system of claim 1, wherein the LIDAR chip and the scanning chip each includes waveguides and the adapter excludes waveguides.

3. The system of claim 2, wherein the LIDAR chip and the scanning chip each includes a photonic integrated circuit and the adapter includes discrete components.

4. The system of claim 1, wherein the assembly output signal and the assembly return signal travel the same optical pathway between the adapter and the scanning chip.

5. The system of claim 4, wherein the assembly output signal carries each of the channels and the assembly return signal carries each of the channels.

6. The system of claim 4, wherein the optical pathway includes free space such that the assembly output signal and the assembly return signal travel through free space when traveling on the optical pathway.

7. The system of claim 4, wherein the LIDAR chip is solid state, the scanning chip is solid state, and the adapter is solid state.

8. The system of claim 4, wherein the LIDAR chip includes a utility waveguide configured to guide an outgoing LIDAR signal that carries each of the channels, each of the reference signals and each of the comparative signals include light from the outgoing LIDAR signal.

9. The system of claim 1, wherein the one more redirection components is a lens.

10. The system of claim 1, wherein a direction that each of the system output signals travels away from the LIDAR system changes in response to changes in the alternate waveguide which receives the switch signal.

11. The system of claim 1, wherein the one or more redirection components are configured such that the channel output signals travel away from the one or more redirection components at different transmission angles, the transmission angles being measured relative to the one or more redirection components.

12. The system of claim 1, wherein the splitter includes multiple first splitter waveguides and multiple second splitter waveguides, the splitter configured to receive the switch signal on one of the first splitter waveguides, and the splitter configured to output the channel output signals on a portion of the second splitter waveguides.

13. The system of claim 12, wherein the portion of the second splitter waveguides on which the channel output signals are output changes in response to a change in the first splitter waveguide that receives the switch signal.

14. The system of claim 13, wherein the portion of the second splitter waveguides on which the channel output signals are output changes in response to a change in the alternate waveguide which receives the switch signal.

15. The system of claim 13, wherein each of the alternate waveguides serves as one of the first splitter waveguides.

16. The system of claim 13, wherein the splitter is a wavelength dependent demultiplexer.

17. The system of claim 1, wherein each of the channel output signals had a different angle of incidence on the one or more redirection components.

18. The system of claim 17, wherein the different angle of incidences changes in response to the change in the alternate waveguide which receives the switch signal.

19. The system of claim 1, wherein the adapter is configured to receive the LIDAR output signal from the LIDAR chip and is configured to receive the assembly return signal from the scanning chip.

20. The system of claim 19, wherein the scanning chip is configured to receive the assembly output signal from the adapter.

* * * * *